US009864809B2

(12) United States Patent
Travieso et al.

(10) Patent No.: US 9,864,809 B2
(45) Date of Patent: Jan. 9, 2018

(54) DYNAMIC LANGUAGE TRANSLATION OF WEB SITE CONTENT

(75) Inventors: Enrique Travieso, Coconut Creek, FL (US); Eugenio Alvarez, Coconut Creek, FL (US); Charles Whiteman, Coconut Creek, FL (US); Adam Rubenstein, Coconut Creek, FL (US); William Fleming, Coconut Creek, FL (US)

(73) Assignee: MOTIONPOINT CORPORATION, Coconut Creek, FL (US)

( * ) Notice: Subject to any disclaimer, the term of this patent is extended or adjusted under 35 U.S.C. 154(b) by 0 days.

(21) Appl. No.: 13/182,080

(22) Filed: Jul. 13, 2011

(65) Prior Publication Data
US 2012/0017146 A1  Jan. 19, 2012

Related U.S. Application Data

(60) Provisional application No. 61/363,804, filed on Jul. 13, 2010.

(51) Int. Cl.
*G06F 17/00* (2006.01)
*G06F 17/30* (2006.01)
(Continued)

(52) U.S. Cl.
CPC ........ *G06F 17/3087* (2013.01); *G06F 17/211* (2013.01); *G06F 17/218* (2013.01);
(Continued)

(58) Field of Classification Search
CPC .................................................... G06F 17/275
(Continued)

(56) References Cited

U.S. PATENT DOCUMENTS

| 4,599,612 A | 7/1986 | Kaji et al. |
| 5,075,850 A | 12/1991 | Asahioka et al. |

(Continued)

FOREIGN PATENT DOCUMENTS

| EP | 0867815 | 9/1998 |
| EP | 1 130 523 A2 | 9/2001 |

(Continued)

OTHER PUBLICATIONS

Bian, G. et al, Cross-Lingual Information Access to Multilingual Collection on the Internet, JASIS, vol. 51, No. 3, pp. 281-296 ("Bian") Jan. 1, 2002.

(Continued)

*Primary Examiner* — Stephen Hong
*Assistant Examiner* — Gregory Vaughn
(74) *Attorney, Agent, or Firm* — Pillsbury Winthrop Shaw Pittman LLP

(57) ABSTRACT

Methods, systems, and computer readable medium for facilitating selection of a preferred language associated with a website. In one example, information including information relating to a user is first received via the communication platform. The received information is then automatically analyzed to estimate a preferred language in which the user likely uses to view content from the website. A selector is displayed with an available selection of a language that most closely matches the estimated preferred language to allow the user to specify the user's preferred language with respect to the website. The user's preferred language is stored, and the user is redirected to the website in the user's preferred language.

10 Claims, 31 Drawing Sheets

(51) Int. Cl.
  *G06F 17/28* (2006.01)
  *G06F 17/21* (2006.01)
  *G06F 17/22* (2006.01)
  *H04L 29/08* (2006.01)
  *G10L 15/00* (2013.01)
  *G06F 17/27* (2006.01)

(52) U.S. Cl.
  CPC ...... *G06F 17/2247* (2013.01); *G06F 17/2288* (2013.01); *G06F 17/289* (2013.01); *G06F 17/2827* (2013.01); *G06F 17/2836* (2013.01); *G06F 17/2872* (2013.01); *G06F 17/3089* (2013.01); *G06F 17/30554* (2013.01); *G06F 17/30882* (2013.01); *G06F 17/30887* (2013.01); *G06F 17/30893* (2013.01); *G06F 17/30899* (2013.01); *H04L 67/02* (2013.01); *G06F 17/275* (2013.01); *G10L 15/005* (2013.01)

(58) Field of Classification Search
  USPC ................ 715/200, 205, 234, 255, 264, 265
  See application file for complete search history.

(56) References Cited

U.S. PATENT DOCUMENTS

| | | | |
|---|---|---|---|
| 5,608,622 A | 3/1997 | Church | |
| 5,724,593 A | 3/1998 | Hargrave, III et al. | |
| 5,802,539 A | 9/1998 | Daniels et al. | |
| 5,835,192 A | 11/1998 | Roffman et al. | |
| 5,855,020 A | 12/1998 | Kirsch | |
| 5,864,852 A | 1/1999 | Luotonen | |
| 5,944,790 A * | 8/1999 | Levy ............... G06F 17/30905 | |
| | | | 707/E17.121 |
| 5,966,685 A | 10/1999 | Flanagan et al. | |
| 5,974,372 A | 10/1999 | Barnes et al. | |
| 5,987,402 A | 11/1999 | Murata | |
| 5,991,710 A | 11/1999 | Papineni | |
| 6,065,026 A | 5/2000 | Cornelia | |
| 6,073,143 A | 6/2000 | Nishikawa et al. | |
| 6,112,240 A | 8/2000 | Pogue et al. | |
| 6,119,078 A | 9/2000 | Kobayakawa et al. | |
| 6,122,666 A | 9/2000 | Beurket et al. | |
| 6,161,082 A | 12/2000 | Goldberg et al. | |
| 6,163,765 A | 12/2000 | Andric et al. | |
| 6,163,785 A | 12/2000 | Carbonell et al. | |
| 6,219,818 B1 | 4/2001 | Frievald | |
| 6,286,006 B1 | 9/2001 | Bharat et al. | |
| 6,338,033 B1 | 1/2002 | Bourbonnais et al. | |
| 6,345,243 B1 | 2/2002 | Clark | |
| 6,347,316 B1 | 2/2002 | Redpath | |
| 6,349,275 B1 | 2/2002 | Schumacher et al. | |
| 6,349,276 B1 | 2/2002 | McCarley | |
| 6,356,894 B2 | 3/2002 | Nosohara | |
| 6,360,273 B1 | 3/2002 | Beurket et al. | |
| 6,366,894 B1 | 4/2002 | Everett et al. | |
| 6,393,389 B1 | 5/2002 | Chanod et al. | |
| 6,418,402 B1 | 7/2002 | King et al. | |
| 6,446,036 B1 | 9/2002 | Bourbonnais et al. | |
| 6,480,894 B1 | 11/2002 | Courts et al. | |
| 6,526,416 B1 | 2/2003 | Long | |
| 6,526,426 B1 * | 2/2003 | Lakritz ............... G06F 17/2258 | |
| | | | 704/8 |
| 6,601,108 B1 | 7/2003 | Marmor | |
| 6,604,101 B1 | 8/2003 | Chan et al. | |
| 6,623,529 B1 * | 9/2003 | Lakritz ............... G06F 17/2288 | |
| | | | 707/E17.109 |
| 6,657,022 B2 | 12/2003 | Williams et al. | |
| 6,662,233 B1 | 12/2003 | Skarpness et al. | |
| 6,665,642 B2 | 12/2003 | Kanevsky et al. | |
| 6,667,751 B1 | 12/2003 | Wynn | |
| 6,691,279 B2 | 2/2004 | Yoden et al. | |
| H2098 H * | 3/2004 | Morin ............................... 704/2 | |
| 6,738,827 B1 | 5/2004 | Abir | |
| 6,826,593 B1 | 11/2004 | Acharya et al. | |
| 6,857,022 B1 | 2/2005 | Scanlan | |
| 6,859,820 B1 | 2/2005 | Hauduc et al. | |
| 6,869,820 B2 | 3/2005 | Chen | |
| 6,959,318 B1 | 10/2005 | Tso et al. | |
| 6,964,014 B1 | 11/2005 | Parish | |
| 6,980,953 B1 | 12/2005 | Kanevsky et al. | |
| 6,985,850 B1 | 1/2006 | Scanlan | |
| 6,993,471 B1 | 1/2006 | Flanagan et al. | |
| 6,993,473 B2 | 1/2006 | Cartus | |
| 6,996,520 B2 | 2/2006 | Levin | |
| 7,016,977 B1 | 3/2006 | Dunsmoir et al. | |
| 7,020,601 B1 | 3/2006 | Hummel et al. | |
| 7,058,626 B1 | 6/2006 | Pan et al. | |
| 7,110,937 B1 | 9/2006 | Lei et al. | |
| 7,110,938 B1 | 9/2006 | Cheng et al. | |
| 7,113,960 B2 | 9/2006 | Goldfuss, Jr. et al. | |
| 7,130,792 B2 | 10/2006 | Tokieda et al. | |
| 7,139,696 B2 | 11/2006 | Tokieda et al. | |
| 7,139,898 B1 | 11/2006 | Nemirovsky et al. | |
| 7,149,964 B1 | 12/2006 | Cottrille et al. | |
| 7,168,040 B2 | 1/2007 | Yamamoto et al. | |
| 7,207,005 B2 * | 4/2007 | Lakritz ............... G06F 17/2258 | |
| | | | 709/203 |
| 7,216,072 B2 | 5/2007 | Kasai et al. | |
| 7,234,110 B2 | 6/2007 | Sumitomo | |
| 7,308,399 B2 | 12/2007 | Fallen-Bailey et al. | |
| 7,383,320 B1 | 6/2008 | Silberstein et al. | |
| 7,389,221 B1 | 6/2008 | Pearson et al. | |
| 7,412,374 B1 | 8/2008 | Seiler et al. | |
| 7,418,390 B1 | 8/2008 | Jokipii | |
| 7,441,184 B2 | 10/2008 | Frerebeau et al. | |
| 7,509,318 B2 | 3/2009 | Shaath et al. | |
| 7,512,532 B2 | 3/2009 | Kimpara | |
| 7,512,712 B2 | 3/2009 | Kim et al. | |
| 7,536,640 B2 | 5/2009 | Zhang et al. | |
| 7,543,189 B2 | 6/2009 | Fichter et al. | |
| 7,580,960 B2 | 8/2009 | Travieso et al. | |
| 7,584,216 B2 | 9/2009 | Travieso et al. | |
| 7,607,085 B1 | 10/2009 | Lassesen | |
| 7,612,712 B2 | 11/2009 | LaMance et al. | |
| 7,627,479 B2 | 12/2009 | Travieso et al. | |
| 7,627,817 B2 | 12/2009 | Travieso et al. | |
| 7,634,728 B2 | 12/2009 | Kraft | |
| 7,657,640 B2 | 2/2010 | Decime | |
| 7,681,127 B2 | 3/2010 | Thurston | |
| 7,711,682 B2 | 5/2010 | Zhang | |
| 7,716,038 B2 | 5/2010 | Flanagan et al. | |
| 7,807,085 B2 | 10/2010 | Tsuji et al. | |
| 7,877,251 B2 | 1/2011 | Kumaran et al. | |
| 7,933,857 B2 | 4/2011 | Komiya | |
| 7,958,446 B2 | 6/2011 | Seitz et al. | |
| 7,974,832 B2 | 7/2011 | Furuuchi et al. | |
| 8,090,885 B2 * | 1/2012 | Callaghan et al. ............. 710/72 | |
| 8,131,585 B2 | 3/2012 | Nicholas et al. | |
| 8,145,472 B2 | 3/2012 | Shore et al. | |
| 8,181,157 B2 * | 5/2012 | Ericsson et al. ............. 717/123 | |
| 8,244,519 B2 | 8/2012 | Bicici | |
| 8,249,854 B2 * | 8/2012 | Nikitin et al. .................... 704/2 | |
| 8,249,858 B2 * | 8/2012 | Bodin et al. ...................... 704/2 | |
| 8,346,536 B2 | 1/2013 | Jiang | |
| 8,352,570 B2 | 1/2013 | Saxena | |
| 8,478,579 B2 | 7/2013 | Chin | |
| 8,489,980 B2 | 7/2013 | Lakritz | |
| 8,515,729 B2 | 8/2013 | Tomko et al. | |
| 8,588,397 B2 * | 11/2013 | Murakami ............... H04M 3/38 | |
| | | | 379/265.09 |
| 8,606,606 B2 | 12/2013 | Anderson | |
| 8,606,607 B2 | 12/2013 | Torres-Rocca | |
| 8,635,205 B1 | 1/2014 | Kang et al. | |
| 8,661,094 B2 | 2/2014 | Refuah et al. | |
| 8,683,329 B2 | 3/2014 | Tang et al. | |
| 8,799,307 B2 | 8/2014 | Chin et al. | |
| 2001/0012991 A1 | 8/2001 | Kimpara et al. | |
| 2001/0012992 A1 | 8/2001 | Kimpara et al. | |
| 2001/0029455 A1 | 10/2001 | Chin et al. | |
| 2001/0037192 A1 | 11/2001 | Shimamoto et al. | |
| 2002/0002452 A1 | 1/2002 | Christy et al. | |
| 2002/0019839 A1 | 2/2002 | Shiu | |

(56) References Cited

U.S. PATENT DOCUMENTS

| | | |
|---|---|---|
| 2002/0065946 A1 | 5/2002 | Narayan |
| 2002/0078136 A1 | 6/2002 | Brodsky et al. |
| 2002/0083068 A1 | 6/2002 | Quass et al. |
| 2002/0091509 A1 | 7/2002 | Zoarez et al. |
| 2002/0111787 A1 | 8/2002 | Knyphausen et al. |
| 2002/0123879 A1 | 9/2002 | Spector |
| 2002/0133523 A1 | 9/2002 | Ambler et al. |
| 2002/0165885 A1 | 11/2002 | Kumhyr et al. |
| 2002/0188670 A1 | 12/2002 | Stringham |
| 2003/0004703 A1 | 1/2003 | Prabhakar et al. |
| 2003/0028889 A1 | 2/2003 | McCoskey et al. |
| 2003/0046058 A1 | 3/2003 | Stuckler et al. |
| 2003/0084401 A1 | 5/2003 | Abel et al. |
| 2003/0105621 A1 | 6/2003 | Mercier |
| 2003/0115552 A1 | 6/2003 | Jahnke et al. |
| 2003/0120478 A1 | 6/2003 | Palmquist |
| 2003/0140316 A1* | 7/2003 | Lakritz ............ G06F 17/2258 715/201 |
| 2003/0154071 A1 | 8/2003 | Shreve |
| 2003/0187587 A1 | 10/2003 | Swindells et al. |
| 2003/0204573 A1 | 10/2003 | Beck et al. |
| 2004/0049374 A1 | 3/2004 | Breslau et al. |
| 2004/0102946 A1 | 5/2004 | Shahabuddin et al. |
| 2004/0102956 A1 | 5/2004 | Levin |
| 2004/0128616 A1 | 7/2004 | Kraft |
| 2004/0167768 A1 | 8/2004 | Travieso et al. |
| 2004/0167784 A1 | 8/2004 | Travieso et al. |
| 2004/0168132 A1 | 8/2004 | Travieso et al. |
| 2004/0194018 A1 | 9/2004 | Abir |
| 2004/0267803 A1 | 12/2004 | Zhou et al. |
| 2005/0283473 A1 | 12/2005 | Rousso et al. |
| 2006/0200766 A1 | 9/2006 | Lakritz |
| 2006/0271349 A1 | 11/2006 | Scanlan |
| 2007/0033520 A1 | 2/2007 | Kimzey et al. |
| 2007/0255554 A1 | 11/2007 | Cai |
| 2008/0046231 A1 | 2/2008 | Laden et al. |
| 2008/0162114 A1 | 7/2008 | Torres-Rocca |
| 2008/0168049 A1 | 7/2008 | Gao et al. |
| 2008/0172218 A1 | 7/2008 | Suzuki |
| 2009/0004703 A1 | 1/2009 | Schroff |
| 2009/0125477 A1* | 5/2009 | Lu et al. ............ 707/1 |
| 2009/0132230 A1 | 5/2009 | Kanevsky et al. |
| 2009/0138379 A1* | 5/2009 | Scheman ............ 705/27 |
| 2009/0144612 A1 | 6/2009 | Ishii et al. |
| 2009/0158137 A1 | 6/2009 | Ittycheriah |
| 2009/0234633 A1 | 9/2009 | Chao-Suren et al. |
| 2009/0307123 A1* | 12/2009 | Gershon ............ 705/37 |
| 2009/0307584 A1* | 12/2009 | Davidson et al. ............ 715/257 |
| 2010/0070843 A1 | 3/2010 | Duym |
| 2010/0107114 A1 | 4/2010 | Zachial |
| 2010/0235762 A1 | 9/2010 | Laiho |
| 2010/0313255 A1 | 12/2010 | Khuda |
| 2011/0113320 A1* | 5/2011 | Neff ............ G06Q 10/10 715/230 |
| 2011/0137973 A1 | 6/2011 | Wei |
| 2011/0209073 A1* | 8/2011 | Larson et al. ............ 715/760 |
| 2011/0209131 A1 | 8/2011 | Hohenstein et al. |
| 2011/0282645 A1 | 11/2011 | Khuda |
| 2011/0307240 A1* | 12/2011 | Kogan et al. ............ 704/2 |
| 2011/0307243 A1* | 12/2011 | Miller et al. ............ 704/4 |
| 2012/0017146 A1 | 1/2012 | Travieso |
| 2014/0019249 A1 | 1/2014 | Nicholas |

FOREIGN PATENT DOCUMENTS

| | | |
|---|---|---|
| EP | 1 288 793 A1 | 3/2003 |
| EP | 1 302 867 A2 | 4/2003 |
| GB | 2 359 644 A | 8/2001 |
| JP | 10134052 A | 5/1998 |
| KR | 10-1998-0055170 | 7/2000 |
| KR | 20000039748 A | 7/2000 |
| WO | 9957651 | 11/1999 |
| WO | 0005660 A1 | 2/2000 |
| WO | WO 00/05660 | 2/2000 |
| WO | WO 01/80036 | 12/2001 |
| WO | WO 01/93089 | 12/2001 |
| WO | 02067139 A1 | 8/2002 |
| WO | 02071259 A1 | 9/2002 |
| WO | WO 02/73464 | 9/2002 |

OTHER PUBLICATIONS

Office Action dated Apr. 21, 2015 in U.S. Appl. No. 13/182,118.
Office Action dated Apr. 22, 2015 in U.S. Appl. No. 13/944,356.
Office Action dated Feb. 9, 2015 in U.S. Appl. No. 13/182,120.
"History of Assima Multilingual Suite", Assima Multilingual Suite History of AMS, CATS 1 & 2, 1995-1999, pp. 1-10.
"On-the-fly, Proxy-Based Localization & Customization." NetMask.it! System and Documentation: Netmask E-Mar Internet Technologies. May 30, 2002, pp. 1-36.
"Web Globalization Solutions/Overview", Idiom, Inc., Web Globalization Solutions, 2000, pp. 1-2.
"Extending your business to the world", Globalization and localization services—TheOne Technology Group, Apr. 2001, pp. 1-34.
"Frequently Asked Questions", Globalization and localization services—TheOne Technology Group, Apr. 2001, pp. 1-3.
"SDL WebFlow the quickest way to update your website in anyone's language", Web Archive, Jan. 2001, pp. 1-111, Version 3.0.
"Strategy Technology and Services for Managing a Global Web Presence", Idiom, Inc. Web Globalization Solutions, 1999, pp. 1-388.
"The One Globalization & Language Translations Partners with SINA.com to Launch "Sina Translation" Which Will Deliver Web Pages in English and Chinese", Globalization and Localization Services, TheOne Technology Group, 2001, pp. 1-2.
"WebBudget 3 XT", Aquino Software, Aug. 6, 2002, pp. 1, 4-5, 7, 13, 16, 20-22, 24, 29, 32, 35-36, 38-44, 48-49, 74, 78-79, 90, 95, 100-101, 103, 139-142.
Affidavit of Christopher Butler. Recurring World Lingo reference. May 18, 2012, pp. 1-9.
AKERS, "LogoVista E to J Internet Plus 4.0 Provides Real-Time Web Translations", Oct. 19, 1998, p. 1.
Bennett, Winfield et al. "The LRC Machine Translation System." Computational Linguistics. vol. 11/ No. 2-3. Apr.-Sep. 1985, pp. 1-11.
Birchall et al., "Web gurus help retailers find a common language", FT.com Financial Times, Sep. 3, 2008, pp. 1-2.
Chalabi, "Sakhr Arabic-English Computer-Aided Translation System", AMTA, 1998, LNAI 1529, pp. 518-521, Springer-Verlag Berlin Heidelberg, 1998.
Cheng, Susan. Live from Japan—an e-commerce site gets a makeover for Asia, ("Live from Japan"). Language International. Oct. 1999, pp. 1-4.
Database System Concepts, by Henry Korth and Abraham Silberschatz, pp. 283, and 286-289 (1986).
Global by Design: Web Globalization News & Analysis; Dec. 2005, pp. 1-31, www.bytelevel.com/glabalbydesign.
Idiom Globalization e-business, Idiom, Inc., 2000, pp. 1-202
Idiom WorldServer in 20 Questions, Language International, Oct. 2001, pp. 26-29, vol. 13, No. 5.
Langewis, Chris. PowerBuilder Article—http://pbdj.sys-con.com/node/106829. PowerBuilder Journal. Mar. 1, 2002, pp. 1-6.
Lindsay, Machine Translations—An Important Part of your Internet Strategy, Cultivate Interaction, Oct. 2000, pp. 1-3.
LogoVista Online Help, archived by web.archive.org on or before Feb. 19, 2002, pp. 21, 35, 37, 44, 211, 213, 305, 354, 368, 371, 418-419, 422-423, 428, 430.
Multilingual Computing & Technology, The Annual Guide from Multilingual Computing & Technology: Multilingual Content Management, #45 Supplement, Jan./Feb. 2002, pp. 1-25.
Multilingual Web Browsing with WorldLingo Tools, Press Release, Mar. 13, 2000, p. 1.
Notice of Allowance for U.S. Appl. No. 12/508,198, dated Sep. 22, 2011.
Notice of Allowance for U.S. Appl. No. 13/096,464, dated Sep. 19, 2012.
Office Action dated Apr. 19, 2012 in U.S. Appl. No. 95/001,916.

(56) References Cited

OTHER PUBLICATIONS

Office Action dated Apr. 27, 2012 in U.S. Appl. No. 95/001,918.
Office Action dated Apr. 5, 2012 in U.S. Appl. No. 95/001,917.
Office Action dated Aug. 29, 2013 in U.S. Appl. No. 13/182,118.
Office Action dated Mar. 12, 2014 in U.S. Appl. No. 13/182,059.
Office Action dated Mar. 4, 2014 in U.S. Appl. No. 13/182,118.
Office Action dated May 18, 2012 in U.S. Appl. No. 95/001,919.
Office Action dated Nov. 30, 2012 in U.S. Appl. No. 13/182,118.
Office Action dated Oct. 2, 2008 in U.S. Appl. No. 10/784,868.
Office Action dated Oct. 21, 2011 in U.S. Appl. No. 13/096,464.
Office Action dated Nov. 22, 2011 in U.S. Appl. No. 12/609,778.
Os, "Multilingual WEB sites: Best practice, guidelines and architectures", Project Report, EURESCOM, 2000, pp. 1-31.
Search Report dated Dec. 5, 2013 in EP Application No. 13004292.2.
Search Report dated Nov. 28, 2013 in EP Application No. 13004263.3.
Search Report dated Nov. 28, 2013 in EP Application No. 13004264.1.
Search Report dated Nov. 28, 2013 in EP Application No. 13004288.0.
Search Report dated Nov. 28, 2013 in EP Application No. 13004291.4.
SYSTRAN Information and Translation Technologies, Systran Desktop Products Comparison Chart, 2002, pp. 1-2.
Texin et al., "Using Jujitsu to Globalize Web Applications", 24th Internationalization and Unicode Conference, Atlanta, GA, Sep. 2003, pp. 21-22, 25, 27.
Web Site Translation, WorldLingo Products and Services, 2001, pp. 1-6.
WizArt Software, WizTom for the Web, http://web,archive.org/web/20030608140001/http:/wizart.comien/products/web/wiztom_forthe_web.shtml, Jun. 8, 2003, pp. 1-4.
WizArt Software—Localization Software for your Business, WizTom Multilingual Database, 2002, pp. 1-7.
WizArt WizTom 3.0 Documentation from WizTom build 3.20.1246, released Dec. 20, 2001, pp. 1, 3-6, 10-11, 20, 22-23, 27-28, 38-39, 45, 48, 51-56, 61-62, 65, 73-75, 78-80, 87, 96, 99-100, 102-103, 105-107, 110-111, 113-115, 117, 119-123, 125-128, 134, 136-137, 147, 157, 167-168, 175.
WizArt WizTom description archived by web.archive.org on or before Feb. 19, 2003, pp. 1, 3-6, 10-11, 20, 22-23, 27-28, 38-39, 45, 48, 51-56, 61-62, 65, 73-75, 78-80, 87, 96, 99-100, 102-103, 105-107, 110-111, 113-115, 117, 119-123, 125-128, 134, 136-137, 147.
WizTom for the Web Version 3 Installation Guide Windows Platform documentation ("WizTom Installation Guide"). Jul. 23, 2003, pp. 1, 9, 11.
WizTom for the Web, WizArt Software—Localization Software for Your Business, 2002, pp. 1-4.
World Lingo Translation Tools ("WorldLingo") http://web.archive.org/web/20010405082721/http://www.worldlingo.com/products_services/website_translator.html Apr. 5, 2001, pp. 1-3.
WorldServer 2 White Paper, Idiom, Inc., 2000, pp. 1-19.
WorldServer 2/Software, Idiom, Inc., 2000, pp. 1-2.
WorldServer for Vignette/Software, Idiom, Inc., 2000, pp. 1-2.
WorldService Methodology/Services, Idiom, Inc., 2000, pp. 1-2.
Yunker, "MotionPoint Benefits from Rush to Develop Localized Web Sited for US Hispanics", Web Globalization Report Card, Web Globalization, Mar. 2007, pp. 1-2.
Office Action dated Aug. 14, 2014 in U.S. Appl. No. 13/182,139.
Notice of Allowance dated Nov. 19, 2014 in U.S. Appl. No. 13/182,120.
Office Action dated Aug. 12, 2014 in U.S. Appl. No. 13/944,356.
"Global Readiness Assessment/Strategy", Idiom, Inc., Web Globalization Solutions, 2000, pp. 1-2.
Office Action dated May 1, 2015 in U.S. Appl. No. 13/182,139.
Office Action dated Oct. 19, 2015 in U.S. Appl. No. 13/182,118.
D. Brandon, Jr, "Localization of Web Content," The Journal of Computing in Small Colleges, vol. 17, No. 2, Dec. 2001, pp. 329-343.
Office Action dated Dec. 7, 2016 in U.S. Appl. No. 14/817,343.
Office Action dated Mar. 8, 2017 in U.S. Appl. No. 14/932,025.
Office Action dated Apr. 5, 2017 in U.S. Appl. No. 14/173,430.
Office Action dated Mar. 27, 2017 in U.S. Appl. No. 14/322,016.
Communication pursuant to Article 94(3) EPC dated Jul. 21, 2016, received in European Application No. 11735940.6.
Communication pursuant to Article 94(3) EPC dated Jul. 21, 2016, received in European Application No. 13004292.2.
Communication pursuant to Article 94(3) EPC dated Jul. 21, 2016, received in European Application No. 13004263.3.
Communication pursuant to Article 94(3) EPC dated Jul. 21, 2016, received in European Application No. 13004291.4.
Communication pursuant to Article 94(3) EPC dated Jul. 21, 2016, received in European Application No. 13004264.1.
Communication pursuant to Article 94(3) EPC dated Jul. 21, 2016, received in European Application No. 13004288.0.
Office Action dated Sep. 7, 2017 in U.S. Appl. No. 15/252,810.
Notice of Allowance dated Aug. 23, 2017 in U.S. Appl. No. 14/817,343.
Office Action dated Oct. 13, 2017 in U.S. Appl. No. 14/322,016.

* cited by examiner

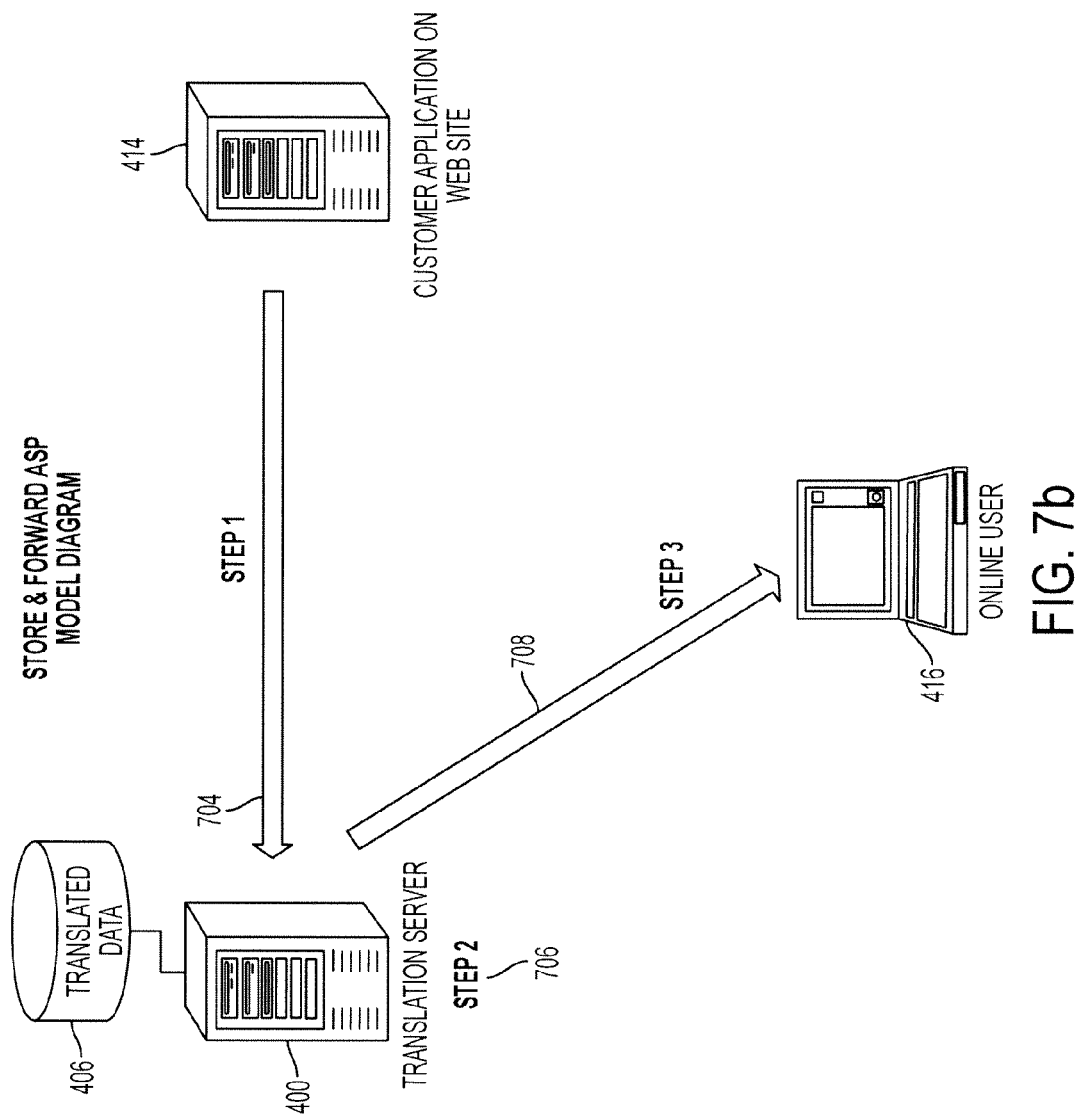

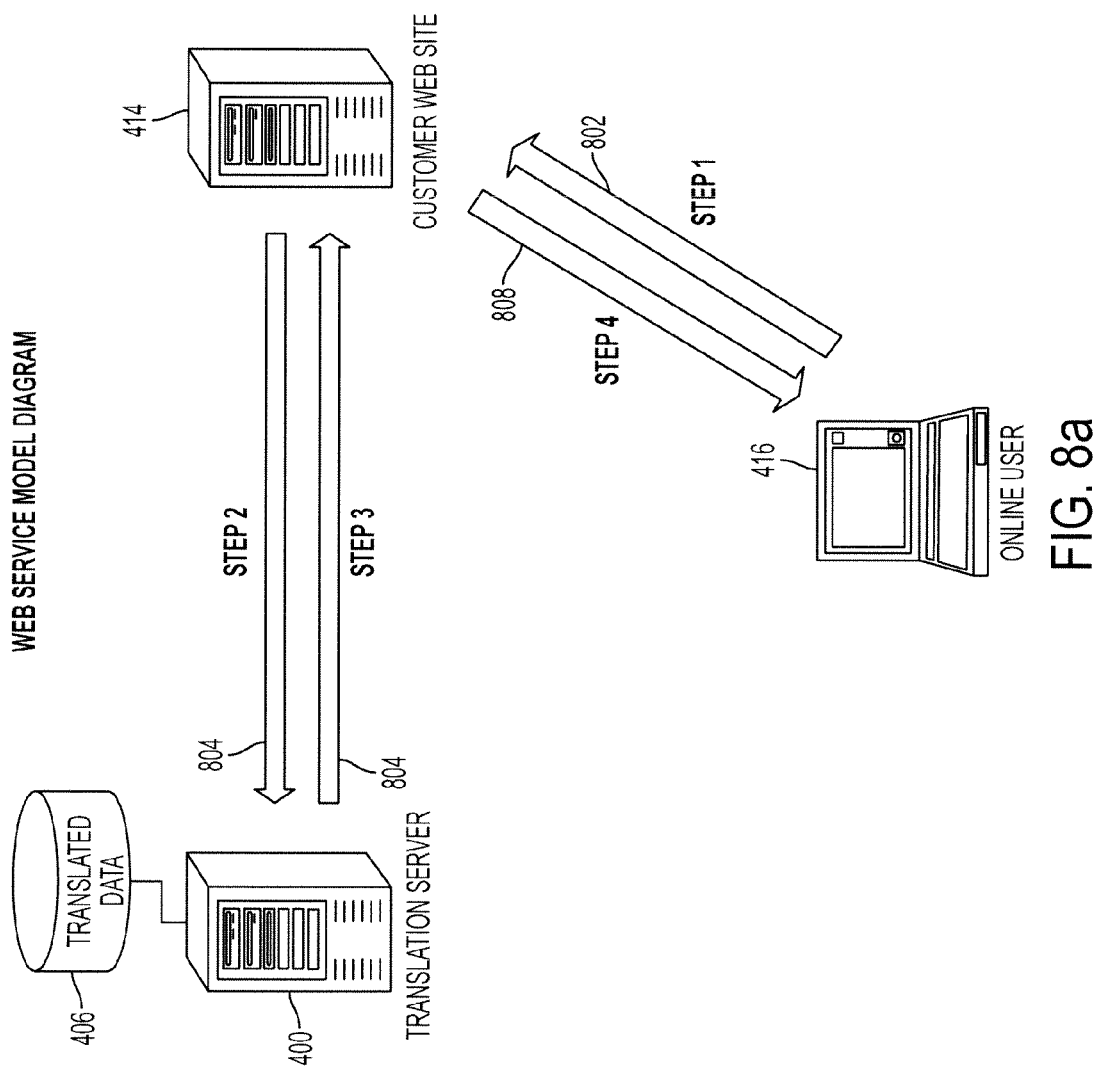

FIG. 9

File Translation Preview

Customer ID: 6
Customer: Gunster

Original File ID: 1912
File URL: http://www.gunster.com/images/main_logo.grf ——1006

Current Status: Active
Select Status: ○ Translated  ○ Cont. Proofed  ○ Proofed  ● Active  Number of Words: 3

Original Caption: Gunster Yoakley On-line
Translated Caption: Gunster Yoakley en Linea Upload Translated File: [Browse...]  ☐ Delete Translated File Original File:

GunsterYoakley
ATTORNEY AT LAW

1002

Translated File:

GunsterYoakley
ABOGADO EN LA LEY

1004

[Upload]  [Done]  [Cancel]

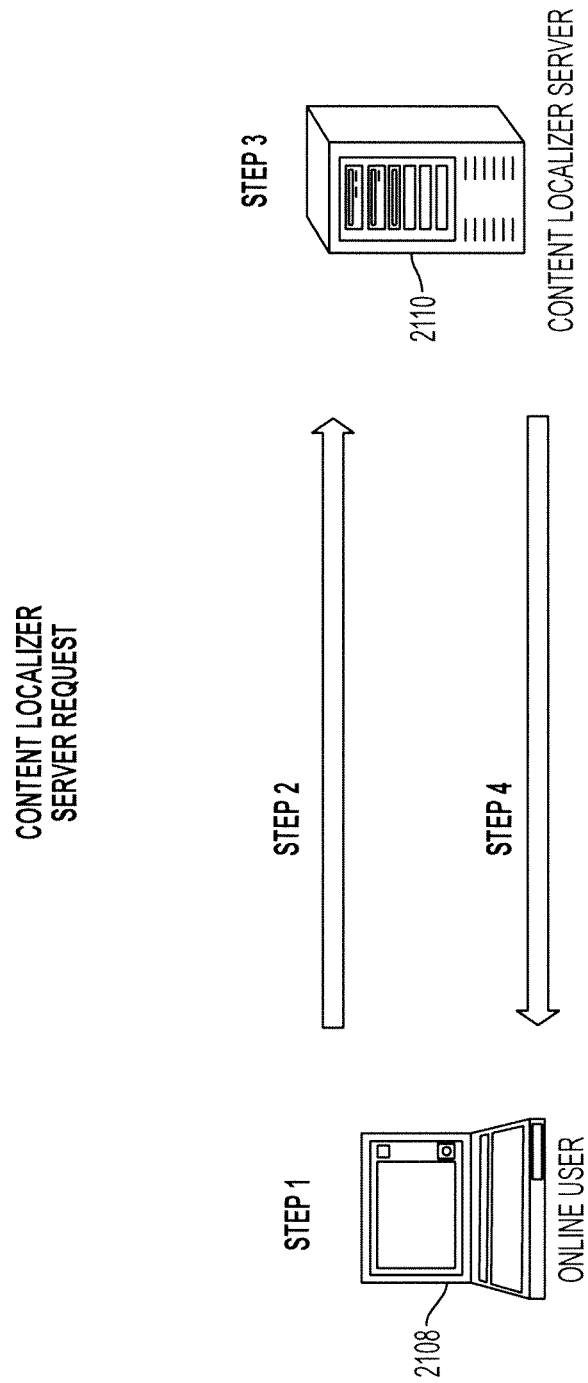

DYNAMIC LANGUAGE TRANSLATION OF WEB SITE CONTENT

CROSS-REFERENCE TO RELATED APPLICATIONS

The present invention claims priority of U.S. Provisional Patent Application No. 61/363,804, filed Jul. 13, 2010, the contents of which are incorporated herein in their entirety.

TECHNICAL FIELD

The present teaching generally relates to Internet applications, and more particularly relates to translation of web content.

BACKGROUND

The Internet and the world-wide web have allowed consumers to complete business transactions with organizations or individuals located across continents from the comfort of their own desk. In an increasingly global marketplace, it is becoming imperative for businesses/organizations to provide web site content in multiple languages in order to expand their customer base beyond their home countries. In addition, as the demographics of a country change to include foreign language speakers, it is increasingly important to communicate with existing customers and/or potential customers in their native language. For example, several large U.S. retailers have announced that serving the Hispanic segment is now a very high priority. Some U.S. retailers have even hired Hispanic advertisement agencies to start marketing to the Hispanic market in their native language—Spanish.

Traditionally, an organization that wants to translate its web site to another language can choose from several techniques, each having significant drawbacks. One technique involves purchasing machine translation technology. Machine translation is sometimes useful to get a rough idea as to the meaning of the content on a web site, but it is far from ideal. For most organizations, this type of translation, although convenient, is not practical because the quality of the translation from machines is simply not good enough to be posted on their web sites.

Another technique involves managing the translation process by deploying human translators and either maintaining multiple web sites for each language, or re-architecting the existing web site back-end technology to accommodate multiple languages. This requires significant resources in terms of time and cost, including a high level of complexity and duplication of effort. In addition, dynamic and e-commerce sites present other challenges as well, as the information to be translated resides in multiple places (e.g., a Structured Query Language database, static Hyper Text Markup Language pages and dynamic Hyper Text Markup Language page templates) and each translated site interfacing with the same e-commerce or back-end engine. Further, as a web site undergoes changes, it is important to handle ongoing maintenance properly. Although, this approach may yield superior translations that are suitable for professional web sites of large organizations, it is at a great cost. Most organizations simply do not have, or do not want to invest in, the resources necessary to handle this task internally.

For example, FIG. 1 is a block diagram illustrating the system architecture of a conventional web site. The web site of FIG. 1 is presented in a first language, such as English. FIG. 1 shows a web server 112 connected to the Internet 116 via a web connection. A public user 118, such as a person using a computer with a web connection, can access the web server 112 via the Internet 116 and download information, such as a web page 114, from the web server 112 for viewing. The web server 112 is operated by programming logic 110, comprising instructions on how to retrieve, serve, and accept information for processing. The web server 112 further has access to a database 102 for storing information, as well as Hyper Text Markup Language (HTML) template files 104, graphics files 106 and multimedia files 108, all of which constitute the web site served by web server 112.

FIG. 2 is a block diagram illustrating the system architecture of a conventional web site presented in two languages. The web site of FIG. 2 is presented in a first language, such as English (as shown above for FIG. 1) and in a second language, such as Spanish. FIG. 2 shows the web server 112 and the other English language components described in FIG. 1, including the database 102 of information, the HTML template files 104, graphics files 106, multimedia files 108 and programming logic 110. FIG. 2 further shows the public user 118 accessing the web server 112 via the Internet 116 and downloading information, such as a web page 202 in English or Spanish language.

FIG. 2 also includes components related to providing web content in Spanish language. For example, FIG. 2 (has Spanish language components, including a database 208 of information, HTML template files 214, graphics files 216, multimedia files 210 and programming logic 212. These Spanish language components are managed by a multi-lingual content manager 206, which manages requests for information in the dual languages. FIG. 2 further shows that the web server 112 is re-engineered to serve multiple sets of content in different languages.

As can be seen in the difference between FIG. 1 and FIG. 2, the deployment of the Spanish language components 204 and multi-lingual content manager 206 of FIG. 2 requires a significant expenditure of effort and resources. Further, the deployment requires re-engineering the web server 112, adding to the time and cost associated with the deployment. Additionally, once the Spanish language components 204 have been established, continuous synchronization with changes in the English language components results in a recurring cost.

Therefore a need exists to overcome the problems with the prior art as discussed above.

SUMMARY

Briefly, in accordance with the present teaching, disclosed is a system, method and computer readable medium in association with facilitating selection of a preferred language associated with a website.

In one example, a method, implemented on a computer having at least one processor, storage, and a communication platform for facilitating selection of a preferred language associated with a website. Information including information relating to a user is first received via the communication platform. The received information is then automatically analyzed to estimate a preferred language in which the user likely uses to view content from the website. A selector is displayed with an available selection of a language that most closely matches the estimated preferred language to allow the user to specify the user's preferred language with respect to the website. The user's preferred language is stored, and the user is redirected to the website in the user's preferred language.

In another example, a method, implemented on a computer having at least one processor, storage, and a communication platform for facilitating selection of a preferred language associated with a website. Information including information relating to a user is first received via the communication platform. The received information is then analyzed to determine a second language that the user likely prefers to view the web page in. If the second language differs from the first language, a selector is displayed with an available selection of a language that most closely matches the second language to allow the user to specify the user's preferred language with respect to the website. The specified user's preferred language is stored, and the user is redirected to the web page in the specified user's preferred language.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

FIG. 7(b) is a block diagram depicting an exemplary process in an ASP model of the translation server when the content to be translated is not present on the web site or is not delivered to the user via the web site, according to one embodiment of the present teaching;

FIG. 8(a) is a block diagram depicting an exemplary serving process in a web service model of the translation server, according to one embodiment of the present teaching;

FIG. 9 is a screenshot of an exemplary WebCATT interface used for viewing web content for translation, in one embodiment of the present teaching;

FIG. 10 is a screenshot of an exemplary WebCATT interface used for viewing a translatable image along with a corresponding translation, in one embodiment of the present teaching;

FIG. 11 is a screenshot of an exemplary WebCATT interface used for editing a translatable segment of text, in one embodiment of the present teaching;

FIG. 12 is a screenshot of an exemplary WebCATT interface used for viewing a translation queue, in one embodiment of the present teaching;

FIG. 25 is a block diagram depicting an exemplary process of the Content Localizer Server request and the response, according to one embodiment of the present teaching.

DETAILED DESCRIPTION

The methods, systems, and medium, disclosed in accordance with present teaching, overcome problems with the prior art by providing an efficient and easy-to-implement system and method for dynamic language translation of a web site.

Overview

Figure 3:
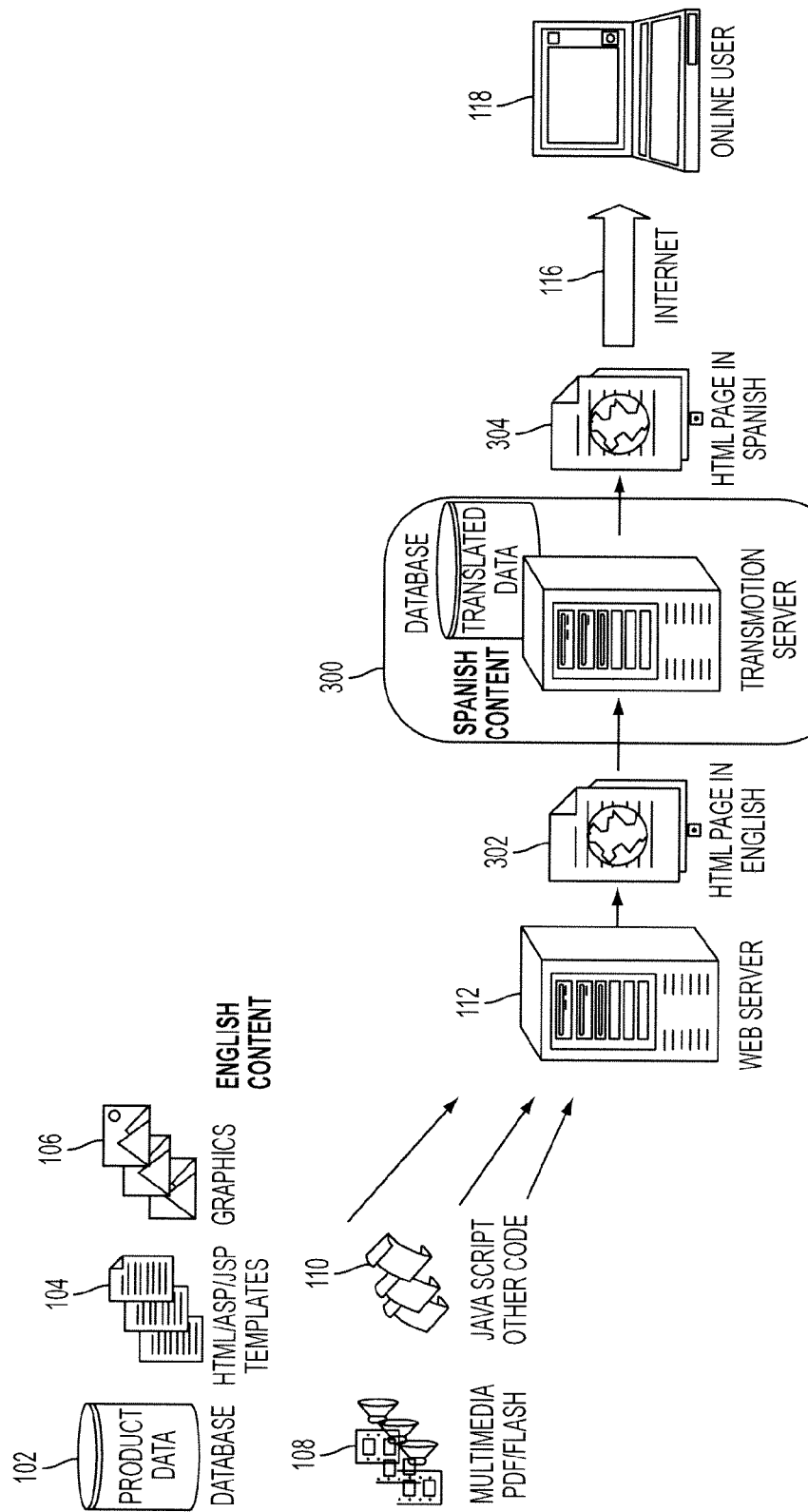
FIG. 3 is a block diagram illustrating an exemplary system architecture of a web site presented in two languages, in one embodiment of the present teaching.

FIG. 3 is a block diagram illustrating an exemplary system architecture of a web site presented in two languages, according to one embodiment of the present teaching. The web site shown in FIG. 3 may be presented in a first language, such as English, and a second language, such as Spanish. FIG. 3 shows the web server 112 may be connected to the Internet 116 via a web connection. A public user 118 may access the web server 112 via the Internet 116 and download information, such as a web page, from the web server 112 for viewing. The user 118 may utilize a client application, such as a web browser, on a client computer to connect to the web site of via the network 116. Once connected to the web site, the user 118 may browse through the products or services offered by the web site by navigating through its web pages.

In this example, the web server 112 is operated by programming logic 110, and the web server 112 further has access to a database 102 of information, as well as HTML template files 104, graphics files 106 and multimedia files 108, all of which constitute the English components of the web site served by web server 112.

FIG. 3 further includes a translation server 300 situated apart from and existing independently from the web server 112. The translation server 300 may embody the main functions of the present teaching, including the provision of a web site in a secondary language, such as Spanish. The translation server 300 may provide the secondary language components of a base web site, which is provided by web server 112, without requiring integration with the base web site or re-configuring or re-engineering of the web server 112.

Figure 1:
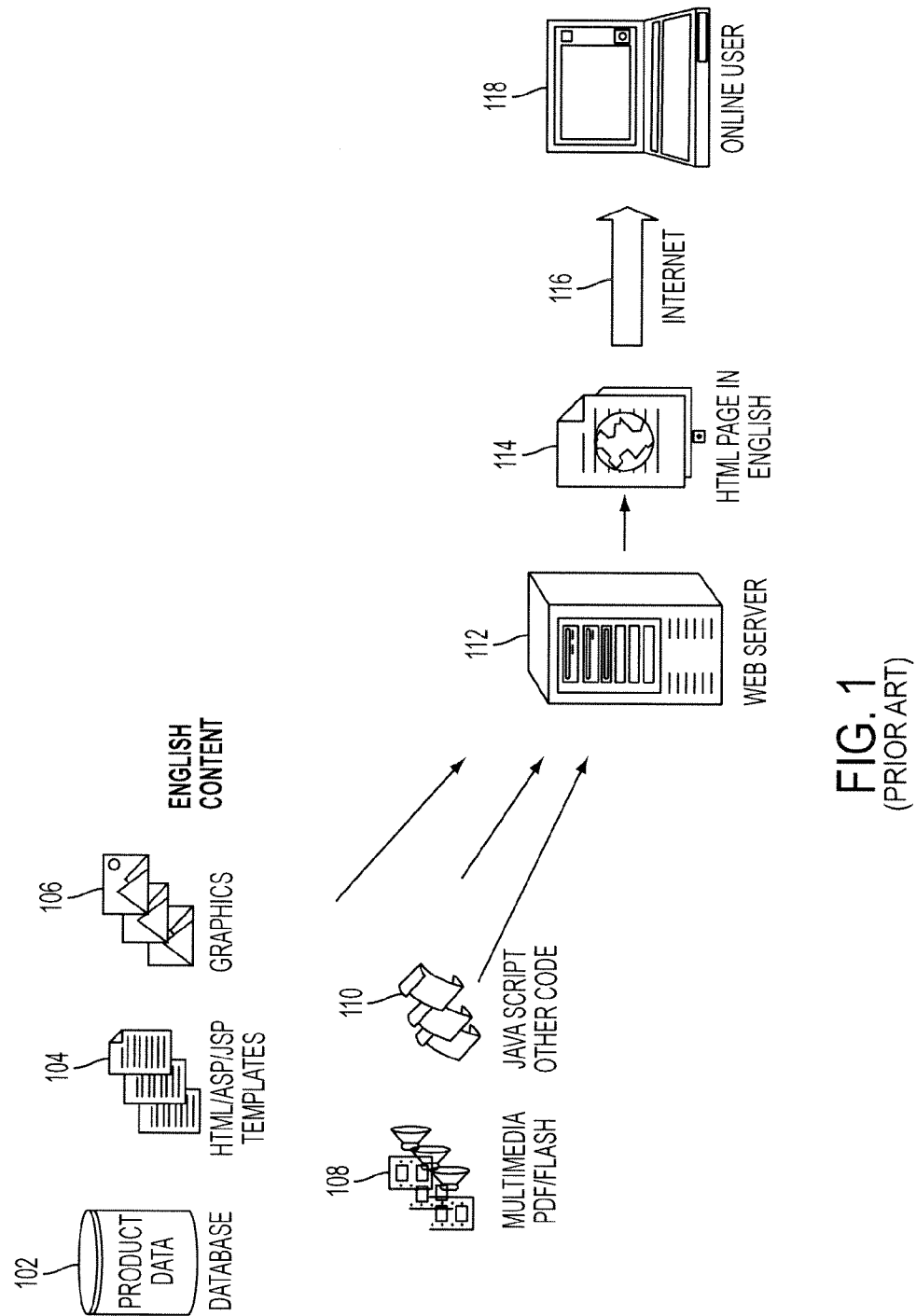
FIG. 1 is a block diagram illustrating the system architecture of a conventional web site.
Figure 2:
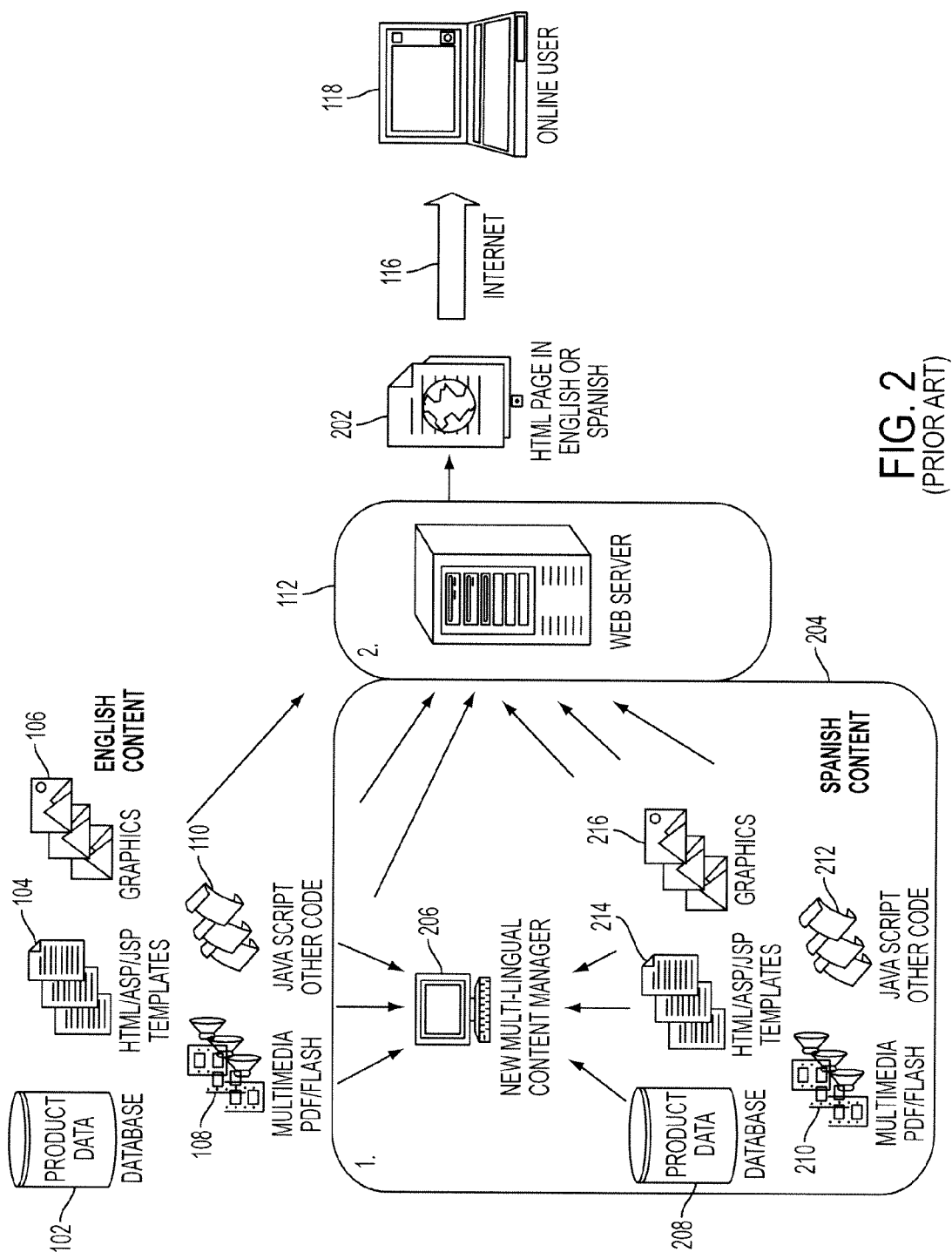
FIG. 2 is a block diagram illustrating the system architecture of a conventional web site presented in two languages.

As can be seen in the difference between FIG. 2 and FIG. 3, the deployment of the secondary language components FIG. 3 requires a significantly reduced expenditure of time and resources than the deployment of FIG. 2. Further, in this example, the deployment of FIG. 3 does not require the re-engineering of the web server 112. Additionally, once the secondary language components have been established by the translation server 300, they are automatically kept synchronized with the English language components of the base web site. Thus, the system of the present teaching reduces the amount of time, effort and resources that are required to deploy a secondary language web site.

Figure 4:
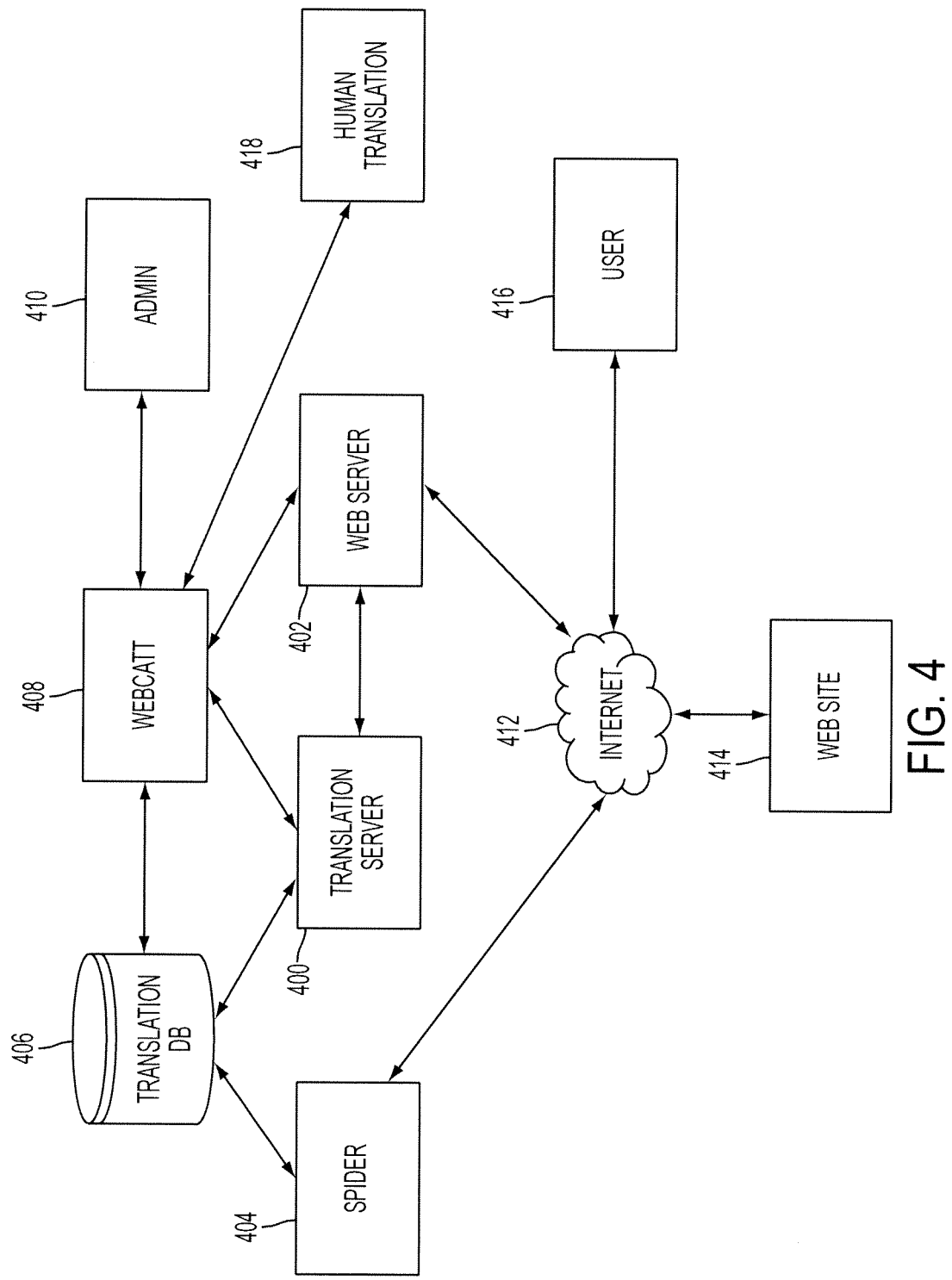
FIG. 4 is a block diagram illustrating an exemplary system architecture of the present teaching, in one embodiment of the present teaching.

FIG. 4 is a block diagram illustrating an exemplary system architecture of the present teaching, in one embodiment of the present teaching. FIG. 4 presents an alternative point of view of the system architecture of the present teaching. FIG. 4 shows a web site 414 representing a web site in a first language such as English that is connected to the Internet 412 via a web connection. FIG. 4 further shows a user 416 that utilizes a web connection to the Internet 412 to browse and navigate the web pages served by the web site 414.

FIG. 4 further shows a translation server 400, corresponding to the translation server 300 of FIG. 3, and a translation database 406 for use by the translation server 400 for storing translated components during the serving of web pages in a secondary language, such as Spanish. This process is described in greater detail below. Also shown in FIG. 4 is the Web Computer Aided Translation Tool (WebCATT), which is a tool for aiding a human 418 or an admin 410 in translating the components of a web site in a first language. Further shown is a spider 404 for use in synchronizing, analyzing and sizing a web site 414. The translation server 400, WebCATT tool 408 and spider 404 may be connected to a web server 402, which is the conduit through which all web actions of the above tools are channeled. The translation server 400, WebCATT tool 408 are described in greater detail below.

In an embodiment of the present teaching, the computer systems of translation server 400, WebCATT tool 408, spider 404 and web server 402 are one or more Personal Computers (PCs) (e.g., IBM or compatible PC workstations running the Microsoft Windows 95/98/2000/ME/CE/NT/XP/VISTA/7 operating system, Unix, Linux, Macintosh computers running the Mac OS operating system, ANDROID, or equivalent), Personal Digital Assistants (PDAs), tablets, smart phones, game consoles or any other information processing devices. In another embodiment of the present teaching, the computer systems of translation server 400, WebCATT tool 408, spider 404 and web server 402 are server systems (e.g., SUN Ultra workstations running the SunOS operating system or IBM RS/6000 workstations and servers running the AIX operating system).

In one embodiment of the present teaching, Internet network 412 is a circuit switched network, such as the Public Service Telephone Network (PSTN). In another embodiment of the present teaching, the network 412 is a packet switched network. The packet switched network includes a wide area network (WAN), such as the global Internet, a private WAN, a local area network (LAN), or any combination of the above-mentioned networks. In another embodiment of the present teaching, network 412 is a wired network, a wireless network, a broadcast network or a point-to-point network. In another embodiment of the present teaching, network 412 is a communication path among different processes within the same physical hardware or memory space. In another embodiment of the present teaching, network 412 is a combination of any of the above-mentioned networks.

Translation Server
Introduction

The translation server 400 is the application responsible for the conversion of web pages in one language to that in another language. The translation server 400 may parse each incoming HTML page into translatable components, substitute each incoming translatable component with an appropriate translated component, and return the translated web page back to the online user 416. Page conversion may be performed on the fly each time an online user 416 requests a page in the second or alternate language. In one embodiment, when a web page is received for conversion, the translation server 400 will translate the page if enough translated content is available to meet a customer specified translation threshold. If this is not the case, then the page will be returned in the first or original language.

A translatable component may include any one of a text segment, an image file with text to be translated, a multimedia file with text or audio to be translated, a file with text to be translated, a file with image with text to be translated, a file with audio to be translated, a file with video and with at least one of text and audio to be translated, or any other suitable file. A text segment may be a single word, a short phrase, a sentence, a paragraph or multiple paragraphs, or any other suitable segment.

In this example, the page conversion process follows seven major steps, some of which may be optional. In a first step, for each text segment encountered, if a translation is available, the text segment may be replaced with the translated text segment. If no translation is available, either the text remains in the original language or a machine translation may be performed on the fly, depending on the customer's preference. In a second step, for each linked file (images, PDF files, Flash movies, etc.) encountered if a translated file is available, the HTML link tag may be rewritten so that it points to the translated file. If a translated file is not available, the original link tag may be left untouched. In a third step, any relative Universal Resource Locator (URL) found in the page may be converted to an absolute URL. This step may be necessary if the resolution of the relative URLs in the user agent (e.g., a browser) requires adjustment.

In a fourth step, each JavaScript block may be parsed to identify translatable components, such as text or images, requiring translation. In a fifth step, each link to another web page may be rewritten so that the original URL is redirected to the translation server 400. For example, when an online user clicks on a rewritten link, the request then goes directly to the translation server 400, and the page is in turn translated. This step may be necessary if resolution of relative URLs in the user agent (e.g., a browser) requires adjustment. This feature, which keeps the user in the alternate language as they browse the site, is called "implicit navigation".

In a sixth step, for each directive tag or attribute found, an appropriate instruction may be performed. In a seventh step, the translation server 400 may automatically schedule the web page for translation by placing it in the WebCATT 408 translation queue, in the event that an available translation cannot be found for one or more text segments or linked files in the page.

Figure 5:
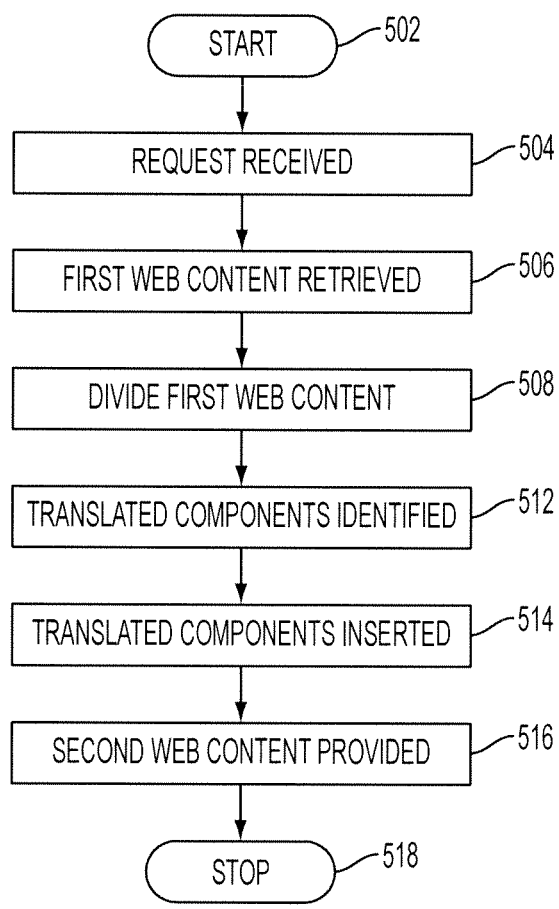
FIG. 5 is an operational flow diagram depicting an exemplary process of the translation server, according to one embodiment of the present teaching.

FIG. 5 is an operational flow diagram depicting an exemplary process of the translation server 400, according to one embodiment of the present teaching. The operational flow diagram in FIG. 5 depicts how the translation server 400 responds to a user request for a web page in a secondary language. The operational flow diagram of FIG. 5 begins with step 502 and flows directly to step 504.

In step 504, the translation server 400 may receive a request from a user 416 on a web site 414, the web site 414 having a first web content in a first language, such as English. The request, such as but not limited to an HTTP request or a Simple Mail Transfer Protocol (SMTP) request, may call for a second web content in a second language, such as Spanish. The second web content may be a human translation, machine translation, or human edited machine translation in a second language of the first web content. The first language includes any one of English, French, Spanish, German, Portuguese, Italian, Japanese, Chinese, Korean, Arabic, and any other suitable language, and the second language is different than the first language and includes any one of English, French, Spanish, German, Portuguese, Italian, Japanese, Chinese, Korean, Arabic, and any other suitable language.

In step 506, the translation server 400 may retrieve the first web content from the web site 414. In step 508, the translation server 400 may divide the first web content into one or more translatable components.

In step 512, the translation server 400 may identify one or more translated components of the second web content corresponding to one or more translatable components of the first web content. In step 514, the translation server 400 may arrange or put the translated components of the second web content to preserve a format that corresponds to the first web content, including, for example, putting tags that are not visible in the first web content. In step 516, the translation server 400 may provide the second web content in response to the request that was received. In step 518, the control flow of FIG. 5 stops.

Figure 6A:
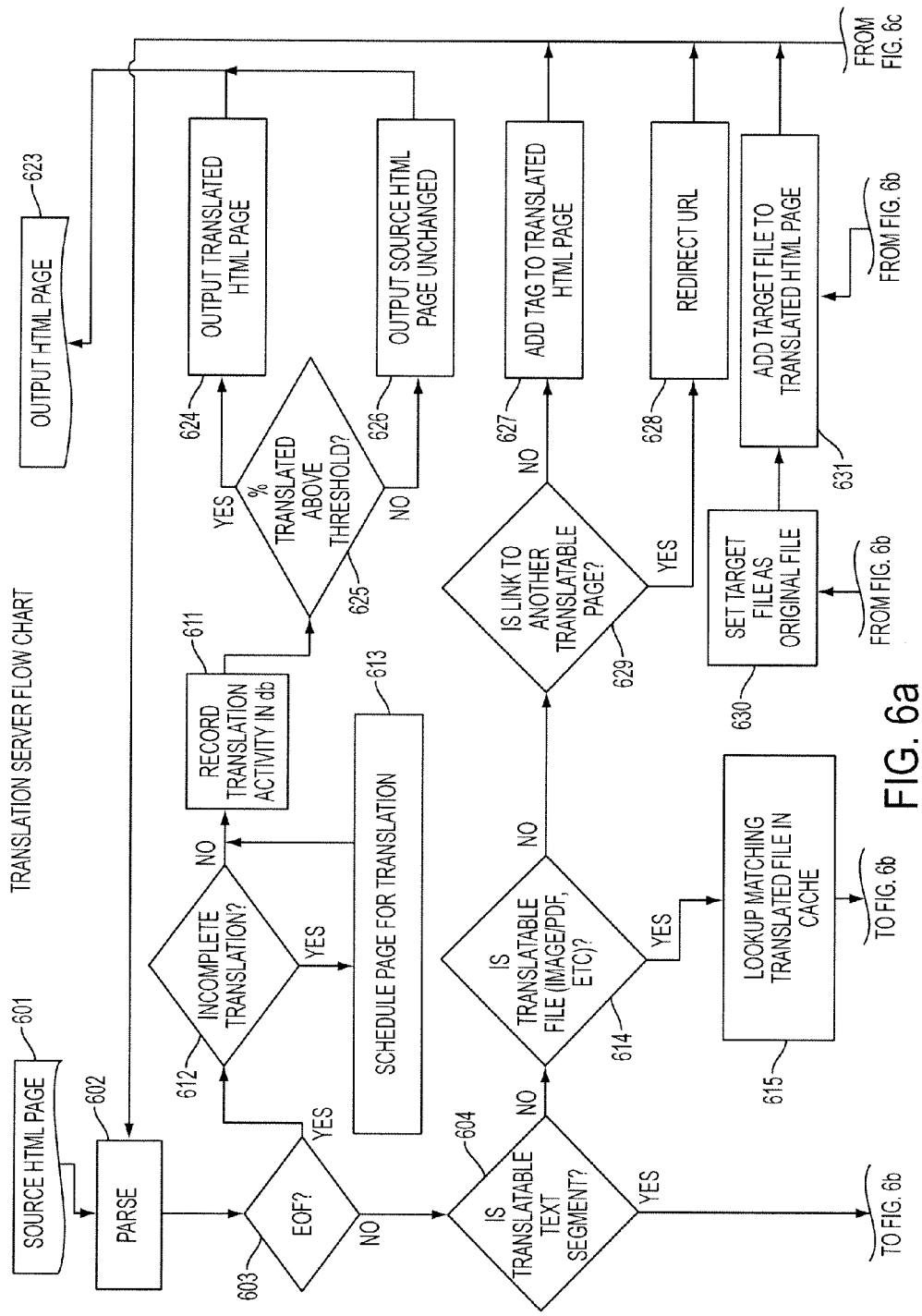
FIG. 6 is an operational flow diagram depicting an exemplary serving process of the translation server, according to one embodiment of the present teaching.
Figure 6B:
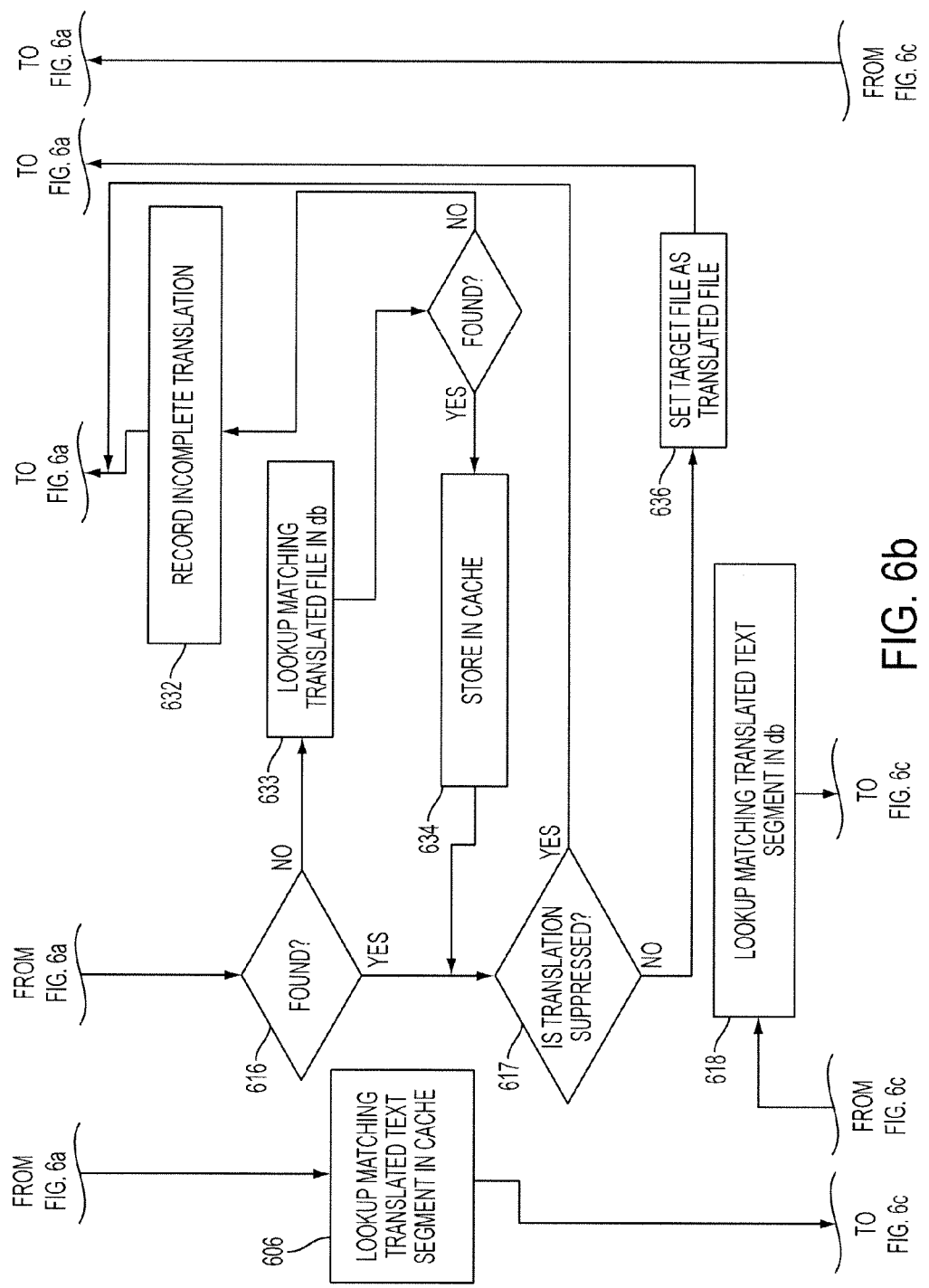
Figure 6C:
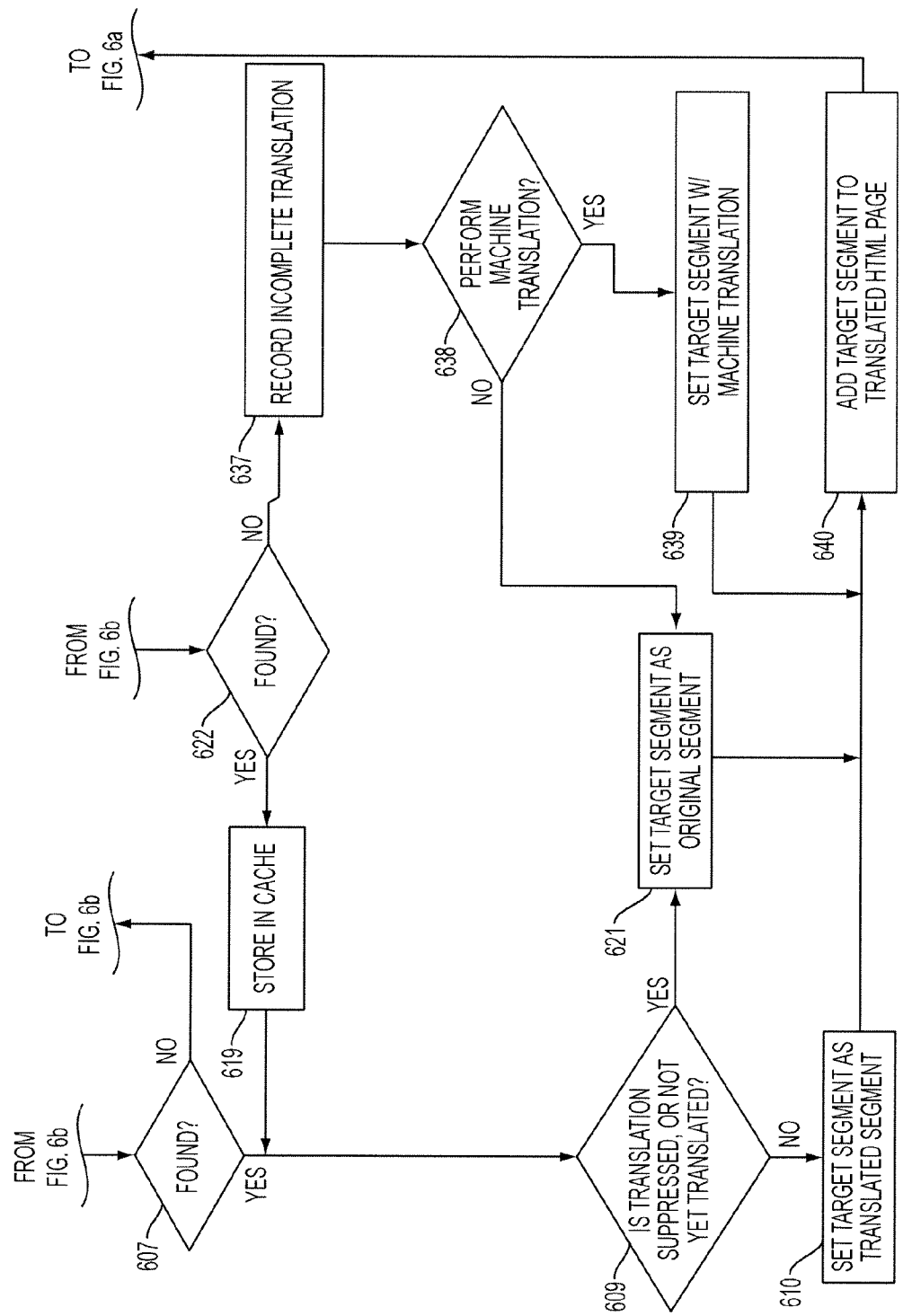

FIG. 6 is an operational flow diagram depicting an exemplary serving process of the translation server 400, according to an embodiment of the present teaching. The operational flow diagram of FIG. 6 depicts the process of the translation server 400 of providing a web page in a secondary language in response to a user request and provides more details of steps 508-514 of FIG. 5. The operational flow diagram of FIG. 6 begins with step 601 and flows directly to step 602.

Step 601 begins with a source HTML page or first web content of step 506 of FIG. 5. In step 602, at least one portion of the first web content may be parsed into translatable components. In step 603, it may be determined whether the end of the file of the first web content is reached. If it is affirmative, then control flows to step 612. Otherwise, control flows to step 604. In step 604, it may be determined whether the translatable component that was parsed in step 602 is a text segment. If it is affirmative, then control flows to step 606. Otherwise, control flows to step 614.

In step 606, a matching translated text segment may be looked up in a cache. In step 607, it may be determined whether the matching translated text segment is found in the cache. If it is affirmative, then control flows to step 609. Otherwise, control flows to step 618. In step 609, it may be determined whether translation of the text segment is suppressed or not yet translated. If it is affirmative, then control flows to step 621. Otherwise, control flows to step 610.

In step 610, the matching translated text segment may be set as a target segment. In step 621, the current text segment may be set as the target segment. In step 640, the target segment may be added to the output web content, or second web content (i.e., the translated HTML page or the output HTML page). In step 623, the second web content may be output for provision to the user requesting the web page.

In step 612, it may be determined whether there is an incomplete translation of the current web page, i.e., the first web content. If it is affirmative, then control flows to step 613. Otherwise, control flows to step 611. In step 613, the current web page may be scheduled for translation. In step 611, the translation activity performed by the translation server 400 in servicing the current web page may be recorded in the translation database 406. In step 625, it may be determined whether the percentage of the current web page, i.e., the first web content, translated is above a threshold. If it is affirmative, then control flows to step 624. Otherwise, control flows to step 626. In step 624, the second web content or translated HTML page may be output for provision to the user requesting the web page. In step 626, the current web page or first web content may be output unchanged for provision to the user requesting the web page.

In step 614, it may be determined whether the translatable component parsed in step 602 is a translatable file, such as a PDF file, an image file, etc. If it is affirmative, then control flows to step 615. Otherwise, control flows to step 629. In step 629, it may be determined whether the translatable component parsed in step 602 is a link to another translatable page. If it is affirmative, then control flows to step 628. Otherwise, control flows to step 627. In step 627, a tag may be added to the translated HTML page to indicate a link (this is described in greater detail below). In step 628, the link may be modified to redirect the URL (this is described in greater detail below).

In step 615, a translated file corresponding to the translatable file may be looked up in a cache. In step 616, it may be determined whether the translated file was found. If it is affirmative, then control flows to step 617. Otherwise, control flows to step 633. In step 633, the translated file may be looked up in the translation database 406. In step 635, it may be determined whether the translated file was found. If it is affirmative, then control flows to step 634. Otherwise, control flows to step 632. In step 634, the translated file that was found may be stored in the cache. In step 632, an incomplete translation may be recorded in the translation database 406.

In step 630, the original file may be set as the target file. In step 631, the target file may be added to the translated HTML page.

In step 617, it may be determined whether translation is suppressed for the translatable file. If it is affirmative, then control flows to step 630. Otherwise, control flows to step 636. In step 636, the translated file may be set as the target file. In step 618, a matching translated text segment may be looked up in the translation database 406. In step 622, it may be determined whether the matching translated text segment is found in the database. If it is affirmative, then control flows to step 619. Otherwise, control flows to step 637. In step 619, the translated segment that was found is stored in the cache. In step 637, an incomplete translation may be recorded in the translation database 406.

In step 638, it may be determined whether a machine translation of the text segment can be performed. If it is affirmative, then control flows to step 639. Otherwise, control flows to step 621. In step 639, the machine translation may be set as the target segment.

ASP Model

The translation server 400 can be presented in a variety of models. For example, in the Application Service Provider (ASP) model, the translation server 400 may convert full web pages or script files at a time and deliver them directly to the online user 416. Under this model, all links in a web page may be redirected through the translation server 400.

Clicking on a link in a translated page results in the user agent (e.g., a browser) request being sent to the translation server 400. The translation server 400 in turn may request the original language page from the original language web server 414, convert it to the alternate language, and send it back to the user 416.

Figure 7A:
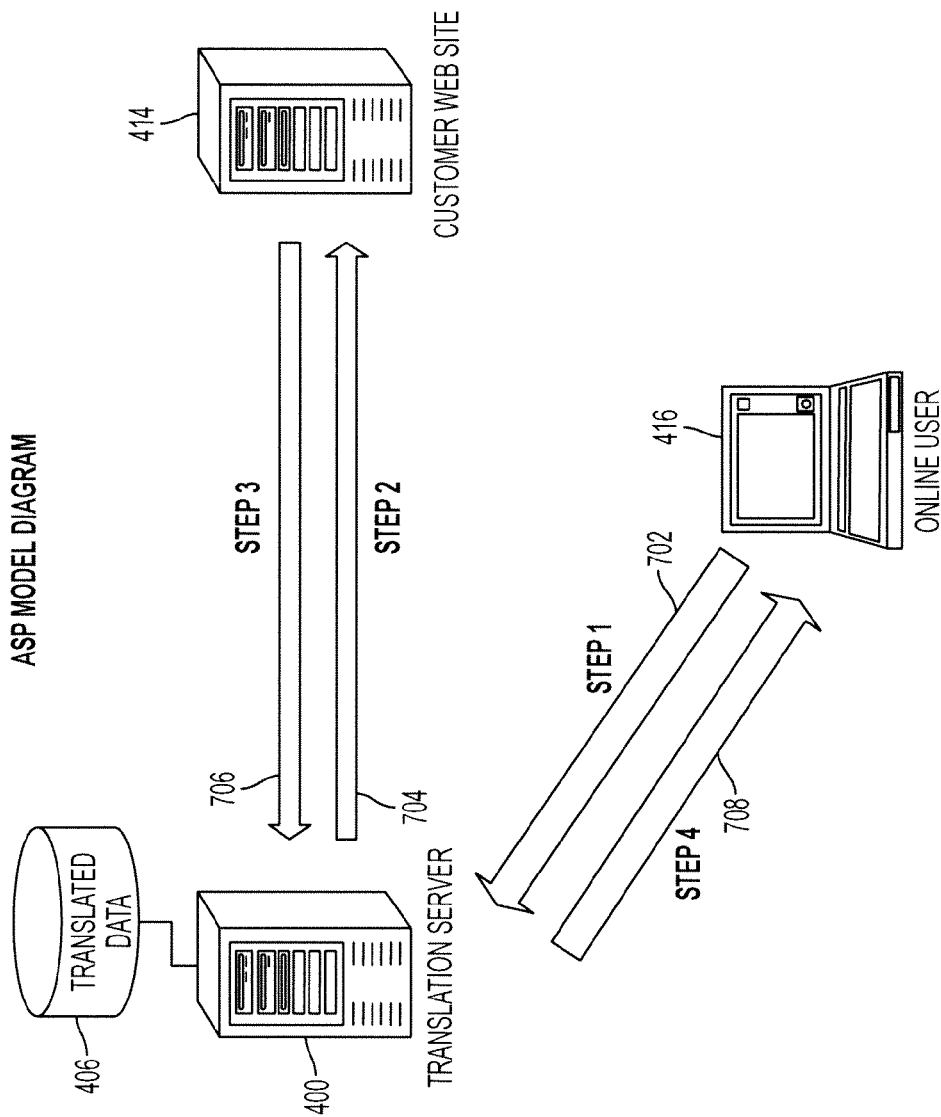
FIG. 7(a) is a block diagram depicting an exemplary serving process in an ASP model of the translation server, according to one embodiment of the present teaching.

FIG. 7(a) is a block diagram depicting an exemplary serving process in an ASP model of the translation server 400, according to one embodiment of the present teaching. In a first step 702, the user 416 may click on a link of a web page in a first language on the web site 414. The link points to a page to be translated. The translation server 400 may receive the request and process it. In a second step 704, the translation server 400 may forward the request to the web site 414, and in a third step 706, the web site 414 may provide the page to the translation server 400 for translation. In a fourth step 708, the translation server 400 may translate the page using the translations in the translation database 406 and send the translated page to the user 416.

FIG. 7(b) is a block diagram depicting an exemplary translation process of the translation server based on an ASP model when the content to be translated is not present on the customer web site 414 or is not delivered to the user via web site 414, according to an embodiment of the present teaching. The content to be translated in this embodiment includes, but is not limited to, electronic mails and/or other types of messages (e.g., messages that use protocols and services such as SMTP, SMS and MMS). In a first step 704, an application (e.g., an electronic mail application or a text message application) running on web site 414, may send a request to the Translation Server 400 for translation of text content generated or delivered by the application. In a second step 706, if a translation is not found for all or a part of the message, the Translation Server 400 may optionally store the content to be translated and schedule it for translation. In a third step 708, the Translation Server 400 may send the translated content to the user 416. In one example, step 3 may take place some time after step 2.

Web Service Model

In the web service model, the translated content may not be delivered directly to the online user 416. Instead, the customer's web site server 414 may issue the request for translation to the translation server 400, which acts as a web translation service. Under this model, the translation server 400 can convert full pages or just specific text segments and/or files. When directly translating text segments or files, multiple translation requests can be issued, one per segment or file, or multiple segments and files can be translated in a single batched request.

FIG. 8(a) is a block diagram depicting an exemplary serving process in a web service model of the translation server 400, according to an embodiment of the present teaching. In a first step 802, the user 416 may click on a link of a web page in a first language on the web site 414. The link points to a page to be translated. The web site server 414 may receive the request and processes it. In a second step 804, the web site 414 may provide the page to the translation server 400 for translation. In a third step 806, the translation server 400 may provide the translated page to the web site 414. In a fourth step 808, the web site 414 may send the translated page to the user 416.

Figure 8B:
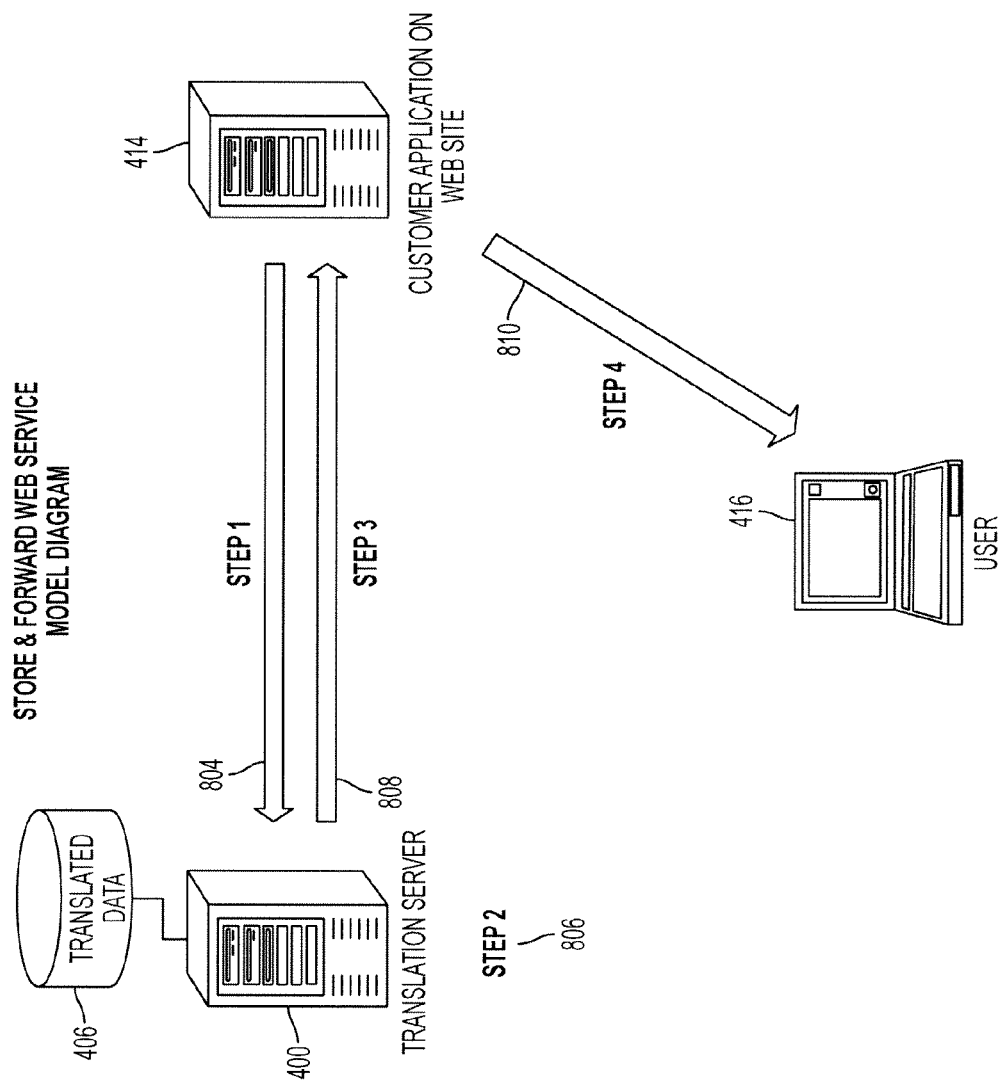
FIG. 8(b) is a block diagram depicting an exemplary serving process in a web service model of the translation server when the content to be translated is not present on the web site or is not delivered to the user via the web site, according to one embodiment of the present teaching.

FIG. 8(b) is a block diagram depicting an exemplary serving process in a web service model of the translation server when the content to be translated is not present on the web site 414 or is not delivered to the user via the web site 414, according to an embodiment of the present teaching. The content to be translated in this operational mode includes, but is not limited to, electronic mails and other types of text messages (e.g., ones that use protocols and services such as SMTP, SMS and MMS). In a first step 804, a customer application (e.g., an electronic mail application or a text messaging service application) running on web site 414, may send content to be translated (e.g., an email or a message) to the Translation Server 400 for translation. In a second step 806, if a translation is not found for either all or a part of the content to be translated, the Translation Server 400 may optionally store the content and schedule it for translation. In a third step 808, the Translation Server 400 may send the translated content back to the customer application running on web site 414. In one example, step 3 may take place some time after step 2. In a fourth step 810, the customer application may send the translated content back to the user 416.

Hosting and Management

The hosting and management model may define who deploys and manages the hardware and operating system software in which the software components of the present teaching reside. There are two hosting and management models: hosted & managed, and managed only. Alternately, the software can be directly to the customer, and the customer is responsible for both the hosting and management.

The hosted and managed model may be a fully outsourced model in which one entity hosts the service and all translated data. Under this model, one entity may deploy the translation server 400 and WebCATT 408 software on its own hardware. All hardware and software may be provisioned and maintained by this entity, so the customer web site 414 has no responsibility for any hardware or software related to the service. In this model, the hosting entity may be responsible for: 1) provisioning, installing, configuring and maintaining all hardware, including communication to the Internet 412, 2) installing, configuring and maintaining all operating system, web server and database server software, 3) installing, configuring and managing on an ongoing basis the translation server 400 and WebCATT 408 software, and 4) maintaining staff and subcontractors that use the Web-CATT 408 software to perform the translations that maintain the alternate language site in sync with the original language site.

In the managed only model, the translation server 400 and WebCATT 408 software may be installed on the customer web site's hardware. In this model the customer web site 414 may be responsible for: 1) provisioning, installing, configuring and maintaining all hardware, including communication to the Internet 412, and 2) installing, configuring and maintaining all operating system, web server and database server software. The managing entity may be responsible for: 1) installing, configuring and managing on an ongoing basis the translation server 400 and WebCATT 408 software, and 2) maintaining staff and subcontractors that use the WebCATT 408 software to perform the translations that maintain the alternate language site in sync with the original language site.

Dedicated vs. Shared Servers

The components of the present teaching can be deployed in dedicated or shared server environments. In a shared environment multiple customer web sites may share the same hardware. In a typical scenario, multiple translation servers 400 may be installed in the same web server 402, which connects to a database server containing the database 406 of translated data. A single WebCATT 408 software installation may also be shared by multiple customers. This setup is cost efficient and can be used for small and medium size sites with low-to-moderate web site traffic.

In a dedicated environment all hardware may be dedicated to one customer web site 414. This may be necessary for large organizations with heavy web site traffic and large amounts of text to be translated. In this case, either a single web server 402 or a cluster of web servers may be dedicated to the customer. The database server normally may also be dedicated to the customer. Dedicated servers may be used to assure guaranteed bandwidth for the customer and simplify keeping track of bandwidth usage for management and billing purposes.

Parsing & Translation

The system of the present teaching may not save or maintain translated pages, except, e.g., in temporary caches for the purpose of improving response performance. Although, this may be useful for sites with static content, it becomes unmanageable for sites whose content is generated dynamically from database information in response to a user's request. Instead, the present teaching may be designed to store only those components within a web page that require translation, i.e., translatable components.

Parsing is the process of breaking-up an HTML page submitted for translation into its translatable and non-translatable components. Non-translatable components simply pass through the system unchanged (except for URLs that need rewriting). Translatable components are processed and replaced by their translated counterparts if available. There are generally two types of translatable components in a web page: text segments and files. A translatable component may include any one of a text segment, an image file with text to be translated, a multimedia file with text or audio to be translated, a file with text to be translated, a file with image with to be translated, a file with audio to be translated and a file with video and with at least one of text and audio to be translated.

A text segment is a chunk of text on a page. A text segment can range from a single word to a paragraph or multiple paragraphs. A file is any type of external content that resides on a file, is linked from within the page, and may require translation. Typical types of linked files found in web pages include, but are not limited to, images, PDF files, MS Word documents, and Flash movies.

Below is an example of a very simple HTML page:

```
<html><head><title>Widget Product Information</title></head>
<body>Widget <b>Model# 123</b>
<p>This widget is very useful for many chores around the house.
<p><img src="img/widget_picture.gif" alt="Product photo">
<p><a href="http://www.abcwidgets.com">Click here to return to the
home page</a></body></html>
```

The above example page may be parsed into the following six text segments: 1) 'Widget Product Information', 2) 'Widget', 3) 'Model #123', 4) 'This widget is very useful for many chores around the house.', 5) 'Product photo', and 6) 'Click here to return to the home page'. The above example page would further be parsed into the following one file: img/widget_picture.gif.

By default the parsing system may break-up text segments taking into consideration the surrounding HTML tags in the page. In the above example, the sentence 'Widget Model #123' was broken-up into two segments because there was an HTML bold tag (<b>) in the middle of it. However, the parsing system may be flexible and allow defining, which HTML tags are formatting tags that do not break up text segments. So, if we define the bold tag as a formatting tag, then the example page would instead be parsed into the following five text segments: 1) 'Widget Product Information', 2) 'Widget <b>Model #123</b>', 3) 'This widget is very useful for many chores around the house.', 4) 'Product photo', and 5) 'Click here to return to the home page'.

The bold tags now became part of the second text segment, allowing the translator to place them in the correct location in the alternate language. For example, translating the text segment 'Widget <b>Model#123</b>' to Spanish will result in flipping the order of the 'Widget' and 'Model' words within the sentence. Since the bold tag is part of the text segment, it can be moved to still bold the word 'Model', as shown: <b> Modelo No. 123</b> de Artefacto Below is an example of how the example page is converted to Spanish by the translation server 400:

```
<html><head><title>Información del Artefacto</title></head>
<body>
<b>Modelo No. 123</b> del Artefacto
<p>Este artefacto es muy útil para todo tipo de trabajos en la casa.
<p><img src="http://espanol.abcwidgets.com/img/ ES_24.gif"
alt="Foto del Producto">
<p><a href="http://espanol.abcwidgets.com">Haga clic aqui para
regresar a la pagina principal</a></body></html>
```

In order to convert the page, the translation server 400 may perform several changes to the page. Each text segment may be replaced with a corresponding translation. It is noted that the text of the image description ('Product photo') placed in the 'all' attribute of the image tag may be recognized as a text segment and translated. The translation server 400 can recognize text segments inside attributes of HTML tags, such as the text in buttons of a form.

Further, the URL of the image tag may be replaced to point to a translated image file. The translation server 400 may only execute this action if a translated file has been defined (since many images do not have text and thus do not require translation), otherwise it may not change the URL of the image (except to make the URL absolute if necessary).

In this example, it is assumed that the 'ES_24.gif' image file was defined in WebCATT 408 as the translation for the 'widget_picture.gif' file.

The URL of the home page link may be rewritten from 'http://www.abcwidgets.com' to 'http://espanol.abcwidgets.com' in order to redirect it to the translation server 400. When the online user clicks on the 'Click here to return to the home page' link, the request may go directly to the translation server 400, and the home page may also be translated. This process is called "implicit navigation", and it is explained in more detail below.

Implicit Navigation

Implicit navigation is a translation server 400 feature that keeps an online user 416 in the alternate language as he/she browses a web site. Implicit navigation can be made automatically because the domain name of a translated site may be different from the domain name of the original language site, or if necessary may be implemented by rewriting the URLs in the applicable links inside a page as the page is being translated, so they are redirected to the translation server 400. As a result, not only is the page translated, but also all applicable links to other translated pages within the page may be modified when needed if necessary, so that when the consumer clicks on the linked page, the translation is available.

To rewrite a link, the translation server 400 may change the domain name in the original URL with the domain name of the translation server 400. When a rewritten link is clicked, the request may go to the translation server 400, which computes the original URL to be translated based on the path and/or its internal mappings and request the page to be translated from this URL. The translation server 400 then may convert the page received to the alternate language and deliver the translated page to the consumer directly.

The scope of implicit navigation can be pre-defined by domain and/or URL patterns. In a typical scenario, only pages being served from a specific domain(s) may be translated. In the ABC Widgets example, if the implicit navigation domains are defined as abcwidgets.com and abcwidgets.net, then only URLs within those two domains will be rewritten. If a more granular translation is required, such as when translating only part of a web site, then URL patterns can be used. For example, if ABC Widgets wishes not to translate the careers and investor relations sections of their site, then the following two example Exclude URL patterns could be used: 1) abcwidgets.com/careers/ and 2) abcwidgets.com/investor/.

Any URLs for pages residing within the above two paths may not be rewritten and thus never translated. On the other hand, if ABC Widgets wishes only to translate its online product catalog, then the following example Include URL pattern could be used: abcwidgets.com/catalog/.

In that case, only pages residing within the abcwidgets.com/catalog/ path are rewritten and thus translated. Include and Exclude URL patterns may be combined to better define the scope of the translation. Implicit navigation can also be controlled from within the HTML to be translated through the use of directive tags or directive attributes. These are explained in detail in below.

URL Translation and Optimization

The system according to the present teaching enables translation and optimization of URLs in order to improve the ranking of the translated pages on search engine indexes. In the case that the original URLs on the customer web site 414 contain words or phrases in the first language that may be relevant or optimized for search engines, such words and phrases can be translated by the Translation Server 400 into the second language to derive translated URLs on the translated web site. This allows the translated web site in the second language to maintain the search engine URL optimization of the customer web site 414.

In some embodiments, to achieve such URL translation, the original URL, representing the web content in the first language, is processed to identify translatable URL component(s) and for each such translatable URL component, a translated URL component can be obtained through translation into the second language, so that such a translated URL component can be used to replace the corresponding translatable URL component in the original URL. A translated URL may then be derived once the relevant translatable URL component(s) is replaced with corresponding translated URL component(s). In some embodiments, the translated URL components can be stored for future re-use. This URL translation process can be applied to both search engine optimized URLs or other URLs that have not been search engine optimized However, quite often, dynamic and e-commerce websites use URLs that are not search engine optimized. It is common for e-commerce sites to use cryptic, generic or repetitive page names combined with parameters. Below is an example of such a URL which displays information about SONY'S product BRAVIA 46" LCD HDTV:
http://www.abcwidgets.com/site/
olspage.jsp?skuId=9276286&productCategoryId=abcat0101001
&type=product&id=1218073534751&session=12345

Search engines, such as GOOGLE, place a great emphasis on keywords found on a URL versus keywords found within the content of a page. As a result, it would be beneficial for websites to place search keywords in the actual URL of the page and minimize the use of other, e.g., cryptic parameters. However, due to the restrictions of e-commerce engines and/or the great difficulty associated with changing the URL structure of a website, this is rarely done.

The system according to the present teaching provides a solution to this problem by generating search engine optimized URLs in the second language that map to the customer web site's 414 non-optimized original URLs. For example, on a Spanish site the above ABC Widgets SONY BRAVIA 46" LCD HDTV original URL can be translated into:
http://espanol.abcwidgets.com/televisiones-sony-bravia-xbr-clase-46-1080p-240 hz-lcd-hdtv-kdl-46xbr9/?session=12345

The above translated URL is optimized to contain keywords that include the category, manufacturer, brand model number, and short description of the product in Spanish, which makes the URL optimized for search engines. The Translation Server 400 may optimize an original URL by identifying (disclosed below) search engine relevant content already present on the page in the first language and placing the corresponding content in the second language on the URL of that translated page. For example, below is the HTML content that the ABC Widgets SONY BRAVIA 46" LCD HDTV original URL returns in the first language:

```
<html>
<head>
<title>Televisions - Sony - BRAVIA XBR 46" Class / 1080p / 240Hz /
LCD HDTV - KDL-46XBR9</title>
<meta name="keywords" content="SONY, BRAVIA XBR 46" Class /
1080p / 240Hz / LCD HDTV, KDL-46XBR9, LCD Televisions,
Televisions">
<meta name="description" content="SONY BRAVIA XBR 46" Class /
```

```
1080p / 240Hz / LCD HDTV: 4 HDMI inputs; Ethernet port; black
cabinet; 16:9 aspect ratio">
</head>
<body>
<h1>Sony - BRAVIA XBR 46" Class / 1080p / 240Hz / LCD
HDTV</h1>
<p>Product Description
<p>With 4 HDMI inputs, a USB port and Ethernet connectivity, the Sony
BRAVIA XBR 46" flat-panel LCD HDTV provides an ideal centerpiece
for your multimedia home theater system.
<p>Get access to great Instant Content on this LCD HDTV. Connect to
the Internet and you will have instant access to stream movies, listen to
music and a wide variety of content through your HDTV.
</body>
</html>
```

In the above page, there are several elements that are search engine relevant and which can be placed in the URL for optimization. These elements include the document title, the text within the H1 tags, the meta-description, the meta-keywords and other text within the body. The Translation Server 400 can automatically pick the most relevant element in the page based on which element better describes the content of the page, or such element can be manually predefined. Alternatively, the most relevant element may be determined in a semi-automated manner. For example, the Translation Server 400 may automatically detect candidates of relevant elements, and a human operator may then interact with the Translation Server 400 to select one or more candidates of relevant elements as the most relevant element to be used to generate optimized URL. The human operator may also manipulate or even edit some candidate relevant elements to make them, e.g., capitalized, boldfaced, highlighted, etc. In addition, any arbitrary content in the page can be flagged as the most relevant for URL optimization via the use of Directive Tags.

For instance, in this example, the title of the document is identified as the most search engine relevant element in the page, which is shown again below:

```
<Title>Televisions - Sony - BRAVIA XBR 46" Class / 1080p / 240Hz /
LCD HDTV - KDL-46XBR9</title>
```

Once the most relevant element is identified, the Translation Server 400 may then look for a matching translation of the text of that element in the second language. Translation of this text typically occurs within the normal workflow of the translation of the page. For the given example, the Spanish translation of the above title is:

```
<title>Televisiones - Sony - BRAVIA XBR Clase 46" /1080p / 240Hz /
LCD HDTV - KDL-46XBR9</title>
```

The translation of the title is then converted into a URL friendly format to derive a translated search engine optimized path. In some embodiments, this is done by performing e.g., the following steps:
1. Replacing spaces, underscores and any other characters separating words with dashes or another character that search engines consider as a separator of words in a URL.
2. Removing all characters that are not search engine friendly, such as numbers and symbols.
3. Optionally lowercasing all letters.
4. Optionally shrinking the size to a maximum size at the closest word boundary.
5. Optionally removing or adding a string of text.

For this example, the resulting translated search engine optimized path obtained from the translated title is:
/televisiones-sony-bravia-xbr-clase-46-1080p-240 hz-lcd-hdtv-kdl-46xbr9

The Translation Server 400 may then use the translated search engine optimized path to generate a search engine optimized URL in the second language. In some embodiments, the process to achieve that may start by breaking up the original URL on the customer web site into its origin host, path, and query string elements, as shown below:
 1. Origin Host: http://www.abcwidgets.com
 2. Origin Path: /site/olspage.jsp
 3. Origin-Query-String:
skuId=9276286&productCategoryId=abcat0101001&type=product&id=1218073534751 &session=12345
The query string is then further split into a number of parameters, each of which may be a name=value pair, e.g.,:
 skuId=9276286
 productCategoryId=abcat0101001
 type=product
 id=1218073534751
 session=12345

Each parameter may be examined to determine whether the value of the parameter contributes to an identification that uniquely identifies the content, in this case a product. In the given example, all the parameters, except the session parameter, are considered to contribute to an identification that can uniquely identify the product. A session parameter is specific to a user's session and may change over time. Parameters that contribute to an identification that uniquely identifies the content may be included in the search engine optimized URL and parameters that do not may be excluded. For the given example, the following parameters are either included or excluded:
Included Parameters:
 skuId=9276286
 productCategoryId=abcat0101001
 type=product
 id=1218073534751
Excluded Parameters:
 session=12345

The origin path, together with the included parameters, can be mapped to the translated search engine optimized path, which can then be used in place of the origin path and included parameters. The origin host may be replaced by the host name of the translated site. Finally the excluded parameters may be added back to the translated URL after it has been optimized. For example, the resulting translated search engine optimized URL in the second language is shown below:
http://espanol.abcwidgets.com/televisiones-sony-bravia-xbr-clase-46-1080p-240 hz-lcd-hdtv-kdl-46xbr9?session=12345

As mentioned before, the search engine optimized path can also be obtained from another part of the document instead of the title. This can include the H1 header, a meta-description, or any arbitrary content in the page identified by specific Directive Tags.

In this example, if the search engine optimized path is obtained from the H1 header, then the resulting translated SEO optimized URL would be:
 http://espanol.abcwidgets.com/sony-bravia-xbr-clase-46-1080p-240 hz-lcd-hdtv?session=12345

Below is an example where arbitrary content in the page is defined as the most search engine relevant for URL optimization via exemplary "mp_trans_seo_url_title" Directive Tags. In this example, the tags are used around the product description:
Product Description
<!—mp_trans_seo_url_title_start—>
<p> With 4 HDMI inputs, a USB port and Ethernet connectivity, the Sony BRAVIA XBR 46" flat-panel LCD HDTV provides an ideal centerpiece for your multimedia home theater system.
<!—mp_trans_seo_url_title_end—>
With the above tags, the resulting translated search engine optimized URL becomes:
http://espanol.abcwidgets.com/con-4-entradas-hdmi-un-puerto-usb-y-conectividad-ethernet-la-television-sony-bravia-xbr-46-flat-panel-lcd-hdtv-le-brinda-un-perfecto-centro-de-atencion-para-su-sistema-de-teatro?session=12345

When the Translation Server 400 receives a request containing a search engine optimized URL, the Translation Server 400 may automatically convert the search engine optimized URL into the equivalent non-optimized original URL representing the customer web site based on the above described mappings in order to retrieve the actual content for translation. To convert the translated URL back to the original URL, in some embodiments, the Translation Server 400 looks up the translated optimized path in the database and finds the corresponding origin path and included parameters. It then replaces the translated optimized path with the origin path and adds the included parameters to the query string.

To aid this process, in some embodiments, an identifier that uniquely identifies the mapping in the database may be added to the translated search engine optimized URL. For example, if the origin path and the included parameters are mapped to the translated search engine optimized path in the database using an identifier, e.g., a numeric identifier, then this identifier can be added to the translated search engine optimized URL. Using such an identifier in the translated search engine optimized URL improves the performance in looking up the mapping, making the lookup operation resilient to changes in the translated text incorporated in the URL. Below is an example that shows a numeric identifier of 100 added to the end of the translated search engine optimized URL in the second language:
http://espanol.abcwidgets.com/televisiones-sony-bravia-xbr-clase-46-1080p-240 hz-lcd-hdtv-kdl-46xbr9/100/?session=12345

In the above example, even if the translation for "televisions" is changed from "televisiones" to "tvs" in the database, the use of an identifier (rather than the translated text) to lookup the mapping ensures that the correct origin path and parameters are correctly retrieved from the database. The identifier in the URL may also be encoded to reduce the required space needed for the URL.

E-Commerce Database Language Enabling

The system of the present teaching may enable users to access the same original language e-commerce database in multiple languages. Since the translation server 400 may process web pages after they have left the customer web site 414, but before they reach the user 416, it may not affect a web server's e-commerce technology. As a result, the same web site 414 can be accessed in multiple languages, and all users may access the same e-commerce database simultaneously.

For example, an auction web site can allow users in different countries to bid on the same item. Each user can view the site and bid on the item in his/her native language. Since all bids from the different countries are actually hitting the same web site and the same e-commerce engine through the translation server, all bids occur in real time, and each user can see in real-time what all the other users in all other countries are bidding.

Text Segment Locking

Occasionally, the meaning of a word or phrase may change depending on the context in which it's being used. It is also possible that the translation itself may vary depending on the context or placement of a text segment, even if the original meaning does not change. As a result, it may be necessary to specify multiple translations for the same word or phrase, one for each usage context. The system of the present teaching allows translators to do this by providing the ability to "lock" text segments together. When two or more text segments are locked together they may be used only when the exact translation sequence is followed.

For example, the translation to Spanish of the text segment "Virtual Brochures" can vary, depending on where it is used. Below is this segment used in an English HTML sentence: <b>Virtual Brochures</b> are great. The corresponding translation to Spanish is: <b> Los Folletos Virtuales</b> son excelentes. Another example of a segment used in an English HTML sentence: There are many great <b>Virtual Brochures</b>. The corresponding translation to Spanish is: Hay muchos excelentes <b>Folletos Virtuales</b>

For this example, it is assumed that the HTML bold (<b>) tag is not defined as a formatting tag and, therefore, forces each sentence above to be broken up into two text segments each. As a result, the phrase "Virtual Brochures" becomes a separate text segment that requires a different translation for each case. Using the text segment locking feature in Web-CATT 408, the translator locks the "Los Folletos Virtuales" translated segment with the "son excelentes" translated segment in the first sentence, and the "Hay muchos excelentes" translated segment with the "Folletos Virtuales" translated segment in the second sentence.

At conversion time, when the translation server 400 encounters the "Virtual Brochures" segment in the first sentence, it looks up a corresponding translated segment and gets back two potential matches: "Los Folletos Virtuales" and "Folletos Virtuales". It then proceeds to look up a translated segment for the next segment "are great" and gets back "son excelentes". Since "son excelentes" is locked to "Los Folletos Virtuales", the translation server 400 is able to determine that "Los Folletos Virtuales" is the correct translation to the previous segment "Virtual Brochures".

Form Posting

The translation server 400 may transparently handle form submissions via GET or POST methods. This means that all form data may be forwarded to the original URL that processes the form and that the response page may be converted to the alternate language.

JavaScript/VBScript Handling

The translation server 400 is capable of translating text segments and files located inside JavaScript code, VBScript code, CSS code, XML, AJAX messages, AMF code and many other complex web based technologies and formats by parsing the code or message and recognizing translatable components.

Translation of content inside files, such as JavaScript, CSS and VBScript, is also supported. A script included file may be downloaded by the user agent (e.g., a browser) in a separate HTTP request and included in the web page as if it had appeared within the page. Script included files may be handled in the same manner as implicit navigation in standard links within the page. The user agent may request the script included file from the translation server 400, which will compute the URL of the original script included file and request it from its location. The translation server 400 then may read the file, perform the appropriate conversions, and deliver the modified file to the user agent for inclusion in the web page.

JavaScript included files may be specified using the source (src) attribute in the <SCRIPT> tag, as shown:
<script language="javascript" src="menu.js"></script>

Shown is an example of how the above script tag is rewritten so the content inside the JavaScript include file is translated: <script language="javascript" src="http://espanol.abcwidgets.com/menu.js"></script>

Directive Tags and Attributes

Directive tags and directive attributes are special HTML tags and attributes that allow more granular control over the translation, implicit navigation and other translation server behavior within in a web page. Directive tags are special HTML comments tags that are ignored by the user agent (e.g., a browser), but provide specific instructions to the translation server 400. Directive attributes are specially named attributes placed within an HTML tag that are also ignored by the user agent (e.g., a browser), but provide specific instructions to the translation server 400 that apply only to the tag in which the attribute is placed.

Translation control tags and attributes can be used to specify sections on a web page that should not get translated. One application of translation control tags is to delimit personal information, such as a person's name, address, credit card numbers, etc. that may show up in a web page, but which may not need to be processed—it may simply pass through the translation server 400 without being translated or stored—for security and privacy issues.

Following is an exemplary list of directive tags. The directive tag "mp_trans_partial_start & mp_trans_partial_end" signals the start and end of a partial translation section. This tag may be used at the top of a web page in conjunction with section translate tags to selectively translate sections of a page. The directive tag "mp_trans_enable_start & mp_trans_enable_end" signals the start and end of a section to be translated within a partial translation section. All text and files within this section may be translated. The directive tag "mp_trans_disable_start & mp_trans_disable_end" signals the start and end of a section not to be translated when in normal translation mode. The directive tag "mp_trans_machine_start & mp_trans_machine_end" signals that any text segments enclosed within the tags may be machine translated in the event that a human translation is not available.

Following is an exemplary list of directive attributes. The directive attribute "mpdistrans" disables translation of a file or of translatable text in a tag, such as alt, keywords or description meta-tag, or form buttons.

Below is an example of usage of translation control directive tags and attributes:

```
<html><head>
<meta name="description" content="This page description is translated">
<meta mpdistrans name="keywords" content="These keywords are not translated, keyword1, keyword2, keyword3, keyword4, keyword5">
<title>This title is translated</title></head><body>
```

This text and the image widget1.gif below are translated.

```
<img src="img/widget1.gif." alt="This image description is translated">
<p><img mpdistrans src="img/widget2.gif" alt="This image and this
``` description are NOT translated because of the mpdistrans attribute">
<!-- mp_trans_disable_start -->

This text and the image widget3.gif below are NOT translated because they are inside a translation disabled section.

```
<img src="img/widget3.gif.gif" alt="This image description is NOT translated">
<!-- mp_trans_disable_end -->This text is translated.
<!-- mp_trans_partial_start -->This text is NOT translated because it is inside a partially translated section and not specifically designated as translatable content.
<!-- mp_trans_enable_start -->This text is translated because it is inside a partially translated section and it is specifically designated as translatable content.
<!-- mp_trans_enable_end --> This text is NOT translated because it is inside a partially translated section and not specifically designated as translatable content.
<!-- mp_trans_partial_end -->This text is translated.</body></html>
```

Following is an exemplary list of directive attributes for implicit navigation control. The directive attribute "mpnav" enables implicit navigation for listed attributes in the tag. This attribute can be used for tags that do not normally contain URLs, but actually do contain URLs. The directive attribute "mpdisnav" disables implicit navigation for all attributes or only listed attributes of the tag. The directive attribute "mporgnav" forces original navigation for all attributes or only listed attributes of the tag. Original navigation may remove redirection to the translation server if found, otherwise it may leave the link intact. This directive attribute is discussed below with reference to one-link deployment.

Below is an example of usage of implicit navigation control directive attributes.

```
<html><body>ABC Widgets Home Page
<p><a href="widgets.jsp">See all useful widgets</a>
<p><a mpdisnav href="uselesswidgets.jsp">See useless widgets</a>
<p><form action="showwidget.jsp" method="post"><select name="WidgetSel">
<option value SELECTED>Select a widget to view:</option>
<option mpnav="value" value="widget1.jsp">Widget 1</option>
<option mpnav="value" value="widget2.jsp">Widget 2</option>
</select></form></body></html>
```

The translation server 400 may process the above page as follows:

```
<html><body>Pagina Principal de ABC Widgets
<a href="http://espanol.abcwidgets.com/widgets.jsp">Ver artefactos útiles</a>
<p><a mpdisnav href="http://www.abcwidgets.com/uselesswidgets.jsp>Ver artefactos inútiles</a>
<p><form action="http://espanol.abcwidgets.com/showwidget.jsp" method="post">
<select name="WidgetSel">
<option value SELECTED>Escoga un artefacto para verlo:</option>
<option mpnav="value" value="http://espanol.abcwidgets.com/widget1.jsp">Artefacto 1</option>
<option mpnav="value" value="http://espanol.abcwidgets.com/widget2.jsp">Artefacto 2</option>
</select></form></body></html>
```

It can be seen above that implicit navigation was not performed for the anchor (<A>) tag with the mpdisnav attribute. As a result, when the user clicks on the 'Ver artefactos inútiles' link, the uselesswidgets.jsp web page is not redirected to the translation server 400 and therefore, it is not translated. Furthermore, the mpnav attribute placed in the two <OPTION> tags instructed the translation server 400 to perform implicit navigation on the URL specified in the value attribute of each tag.

"One-Link" Deployment

One aspect of the present teaching is to eliminate or minimize the workload of a customer web site's IT department in order to deploy an alternate language web site. One-link deployment may allow a customer to deploy the alternate language web site by simply placing one language-switching link in the home page, navigation menu, or any other appropriate area of the original language site.

In some embodiments, the one-link deployment may be a combination of two features: (1) automatic flipping of the language-switching link, and (2) implicit navigation to maintain the user in the alternate language. Automatic flipping of the language-switching link is specified by using the exemplary mporgnav directive attribute in the language-switching link. The mporgnav directive attribute may instruct the translation server 400 to rewrite the URL to support automatic language switching.

Below is an example of a very simple home page:

```
<html><body>Welcome to the ABC Widgets Home Page
<p><a href="widgets.jsp">Click here to see all widgets we sell</a>
</body></html>
```

In some embodiments, a mirror Spanish language web site may be deployed by placing one link in the home page that redirects the home page to ABC Widget's translation server 400. Below is an example of the above home page with the new language-switching link added:

```
<html><body>Welcome to the ABC Widgets Home Page<p>
<a mporgnav href="http://espanol.abcwidgets.com">Click here to see this site in Spanish</a>
<p><a href="widgets.jsp">Click here to see all widgets we sell</a>
</body></html>
```

When a user clicks the 'Click here to see this site in Spanish' language-switching link, the translation server 400 may return the home page translated, as shown below:

```
<html><body>Bienvenidos a la Pagina Principal de ABC Widgets<p>
<a mporgnav href="http://www.abcwidgets.com">Haga clic aqui para ver este sitio web en Ingles</a><p>
<a href="http://espanol.abcwidgets.com/widgets.jsp">Haga clic aqui para ver todos los artefactos que vendemos</a></body></html>
```

As shown above, in addition to translating the page, the translation server 400 may also rewrite the URL in the language-switching link and perform implicit navigation of all other URLs in the page. The translation server 400 may rewrite the URL in the language-switching link so that the translation server 400 redirection is removed. The exemplary mporgnav directive attribute may be used to instruct the translation server 400 to do this. In addition, the link text 'Click here to see this site in Spanish' may be translated as Haga clic aqui para ver este sitio web en Ingles' (which means 'Click here to see this site in English'). This automatic and simultaneous change of both the URL and the text (or image) in the language-switching link by the translation server 400 is what allows the user to flip back-and-forth between English and Spanish.

Implicit navigation may be also performed in all the links on the page. In the above example home page, it was performed on the widgets.jsp page. As a result, when a user clicks on this rewritten link, the widgets.jsp page is in turn translated and implicit navigation performed on all of its links within the abcwidgets.com domain. This process may be repeated so that the user is always navigating the site in the alternate language.

Customized Content

The translation server 400 may allow delivering customized content according to the language and/or location in which a user is viewing the site. In some embodiments, when the translation server 400 requests a web page for translation, it sends two cookies to the original web server: one for language and another one for the country. The value of the language cookie is a 2 or 3-letter language code in compliance with the ISO 639 standard. The value of the country cookie is a 2-letter country code in compliance with the ISO 3166 standard.

Web site server software can determine if a page is being viewed in an alternate language and/or a different country by checking for these cookies. For example, by checking that the language cookie exists, and that its value is 'ES', a web server can determine that a page is being served in Spanish and customize the content being served, such as showcasing items that appeal more to Hispanics. In addition, if a company maintains operations in multiple countries, then it can use the country cookie to determine the country and show only products sold or shipped to that country.

Internal Search Engine Integration

When an online user 416 who is viewing a web site 414 in an alternate language performs an internal site search, it is natural for the user to enter the search keyword(s) in the alternate language. When the translation server 400 forwards the search keyword(s) to the original web site, the search engine may not be able to find any matching results, or might deliver incorrect results. This occurs because the web server search engine is matching the keyword(s) in the alternate language against a search index of keywords that are in the original language.

The translation server 400 provides a solution to this problem by performing a real-time reverse machine translation on the search keyword(s) and forwarding the keyword(s) to the web server search engine in the original language. Reverse machine translation may be configured so it may be performed only on the specific keyword field(s) of the search form(s) in a web site.

Internet Search Engine Compatibility

The system of the present teaching is compatible with all Internet search engines, such as GOOGLE or ALTAVISTA. These search engines utilize content from both the body and head of the HTML document to index a web page. To ensure transparent compatibility with Internet search engines, the system of the present teaching may translate all applicable text in the head of the document. This includes, but is not limited to the page title, the page description meta-tag, and the keywords meta-tag.

Integration with Machine Translation

In some embodiments, the translation server 400 uses real-time machine translation in the event that a human translation is not (yet) available. In addition, machine translation can be used as input or starting point for human translation or human post-editing. In that case, a human translator or editor post-edits the translation generated by machine translation to improve the translation.

Efficient Caching

In some embodiments, frequently used data is cached in memory to minimize repeated access to the database 406. The translation server 400 may make extensive use of memory caches to improve response performance. This includes, but is not limited to a text segment cache, a file cache, and a page cache.

As discussed herein, the translation server 400 may not require IT integration with an existing web site infrastructure. The present teaching may convert the outbound HTML stream after it has left the client web server 414. Thus, there is no need to re-architect an existing web site or build a separate web site for alternate language. Further, there is no client storage or management of translated data required. Translated data may be managed and maintained by the WebCATT 408 software outside of the web site's database.

The translation server 400 may also work with any client web server hardware and software technology infrastructure. Further, it allows for evolution of the existing client's hardware and software technology infrastructure. Moreover, deployment of the present teaching requires minimal effort as a reduced amount of client IT resources are required. One-link deployment allows the client to place one link on the web site 414 to provide access to the alternate language web site. Therefore, deployment is rapid and cost effective.

WebCATT

The WebCATT (Web Computer Aided Translation Tool) 408 is a web based Graphical User Interface (GUI) application that is used to perform and manage human translations. The tool may be built specifically translation of web content. It can be used by professional translators to translate web site translatable components and by managers to manage the translation process. Since WebCATT 408 is a web-based application that is accessed via the Internet 412, translators and managers can be located in different geographical areas.

WebCATT 408 may be similar to other computer aided translation tools used by professional translation service organizations. WebCATT 408 may support localization, text recognition, fuzzy matching, translation memory, internal repetitions, alignment, and a glossary/terminology database. WebCATT 408 may be designed for web site translation and include other features optimized for web translation, such as What You See Is What You Get (WYSIWYG) HTML previewing and support for image/graphic translation.

WebCATT 408 may organize the translation workload into web pages. A web page may be, for example the HTML, XML, JavaScript, CSS or other type of web content generated by a specific URL address, regardless of whether that content is static (i.e., physically resides in the web server in a file), or dynamic (i.e., the content is generated dynamically by combining information from a database and HTML templates). Dynamic pages that are dependent on session information (i.e., a shopping cart checkout page) may be also supported.

Within a web page there are two types of units of translation that translators work with: text segments and files. A text segment is a chunk of text on the page. A text segment can range from a single word to a paragraph or multiple paragraphs. A file is any type of external content that resides on a file, is linked from within the page, and may require translation. Typical types of files found in web pages include, but are not limited to, images, PDF files, MS Word documents, and Flash movies. A file may be translated by uploading a replacement file that has all text and/or sounds translated.

Figure 9:
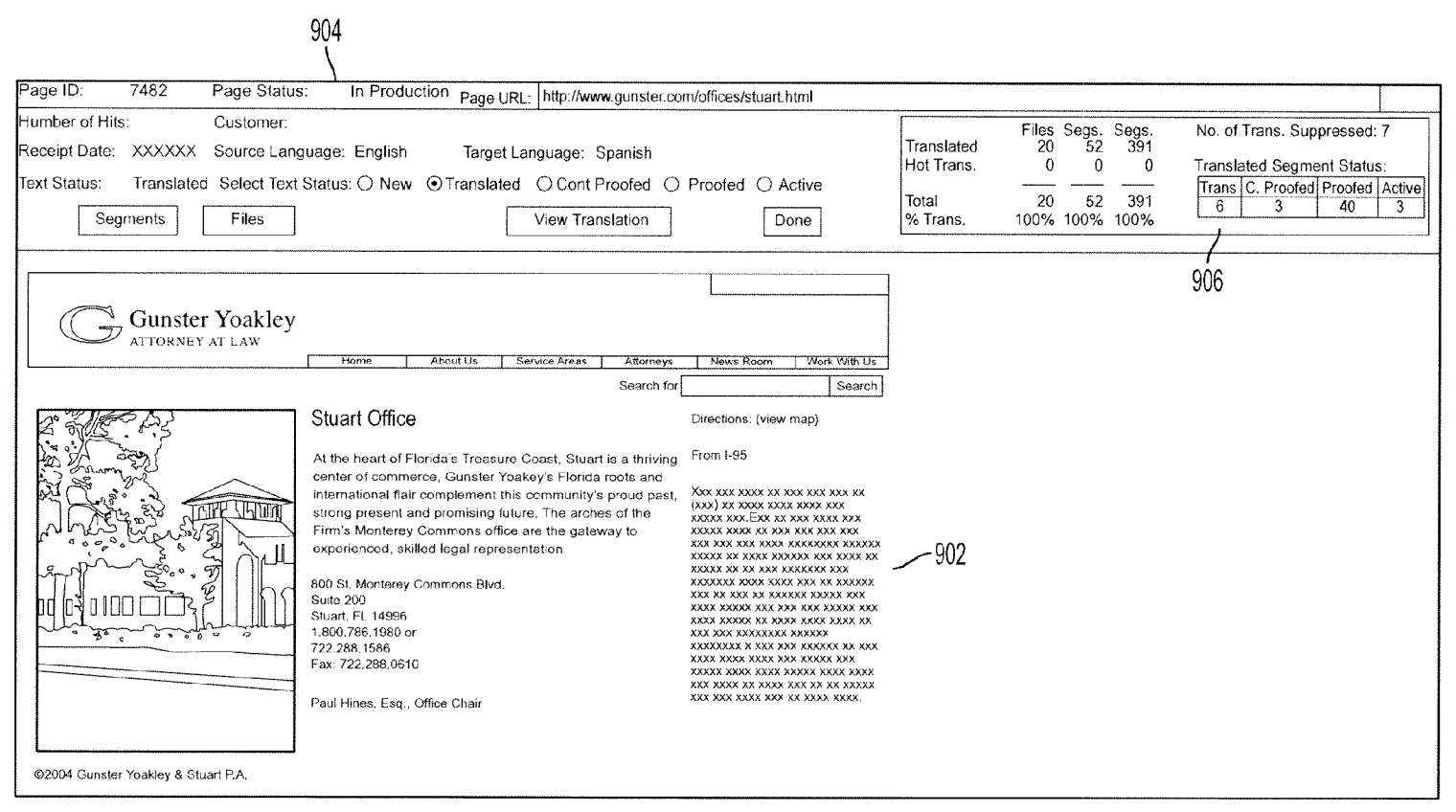

FIG. 9 is a screenshot of an exemplary WebCATT interface used for viewing the content of a web page, in one embodiment of the present teaching. FIG. 9 shows a display area 902 in which a web page including translatable component in a first language (in this case, English) is displayed. Also shown in FIG. 9 is a section 904 including information associated with the web page displayed in display area 902, such as page status, page URL, page ID, etc. Further shown in FIG. 9 is a section 906 including statistics associated with the web site from which the displayed web page is garnered, such as the number of files translated, the number of segments translated, the number of translations suppressed, etc.

FIG. 10 is a screenshot of an exemplary WebCATT interface used for viewing a translatable component along with a corresponding translation, in one embodiment of the present teaching. FIG. 10 shows a display area 1002 in which an original image file translatable component is displayed in a first language (in this case, English). FIG. 10 shows a display area 1004 in which a translated image file is displayed in a second language (in this case, Spanish). Also shown in FIG. 10 is a section 1006 including information associated with the file displayed in display areas 1002-1004, such as file status, file URL, file ID, etc. FIG. 10 shows how WebCATT 408 allows a user to view a translatable component alongside a corresponding translated component for comparison.

Figure 11:
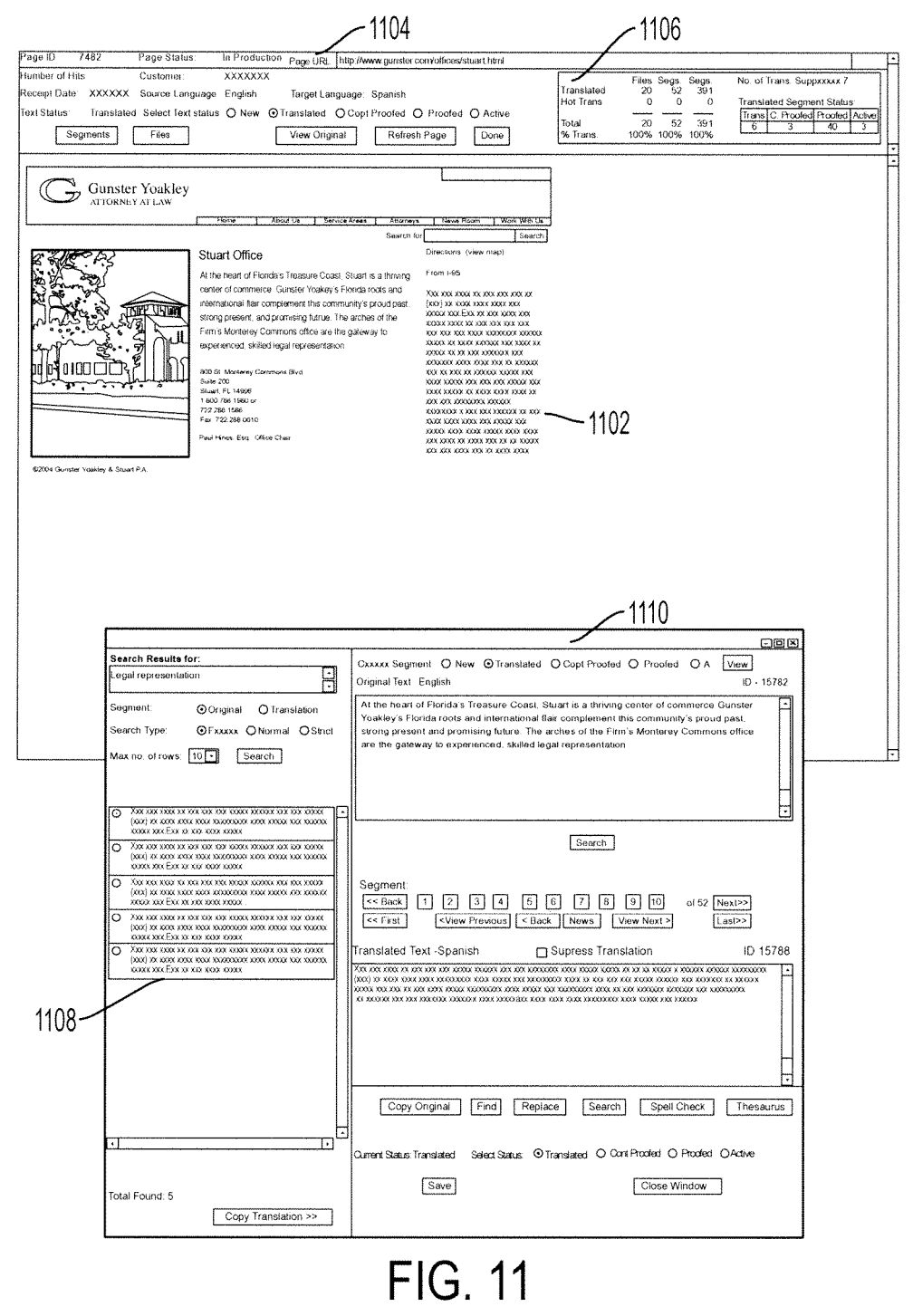

FIG. 11 is a screenshot of an exemplary WebCATT interface used for editing a translatable component, in one embodiment of the present teaching. FIG. 11 shows a display area 1102 in which a web page including a translated component in a second language (in this case, Spanish) is displayed. The display area 1102 provides a WYSIWYG web page preview feature that allows viewing the translated web page as it is being translated. Translations can often result in a significant amount of word growth (e.g., approx. 20% from English to Spanish) or shrinkage, which can result in carefully formatted web page layouts being knocked out of alignment by the longer text. The WYSIWYG page preview feature allows translators to immediately see the translated web pages and quickly make adjustments in word choice in order to maintain the correct alignment and layout of the page when translated.

Also shown in FIG. 11 is a section 1104 including information associated with the web page displayed in display area 1102, such as page status, page URL, page ID, etc. Further shown in FIG. 11 is a section 1106 including statistics associated with the web site from which the displayed web page is garnered, such as the number of files translated, the number of segments translated, the number of translations suppressed, etc. In addition to each of those statistics, a breakdown of translated and not translated components is shown in both units and percentages.

A section 1110 provides a text segment edit form that allows a translator to edit text segments in the order they appear on the page. This form features a fuzzy search feature that automatically shows and sorts existing segment matches in the database. The translator can copy an existing translation from the search results area to use as a starting translation.

A section 1108 provides a file list form that allows a translator to preview all linked files on the page. The list form allows the translator to select all files that do not require translation (e.g., an image with no text) and quickly tag them as such. It also allows a translator to select individual files for translation via the file edit form. File translation may involve uploading a translated file and translating the file text description if present.

The GUI as shown FIG. 11 enables a user to view the plurality of translated components placed into the format derived from the first, or source, content, thereby enabling a user to review how the translated components are rendered in the first content format. The GUI of FIG. 11 further allows a user to highlight any of the plurality of translatable components, which are not yet translated, differently from translated components when previewing the plurality of translated components in the first content format. The GUI of FIG. 11 further allows a user to display text when hovering over a translated component so as to view the first content corresponding to the translated component.

The GUI as shown FIG. 11 further enables a user to select at least one of the translated components when previewing the plurality of translated components in the first content format so as to edit the translated component and store the translated component that has been revised with the corresponding unique identifier. The GUI of FIG. 11 further allows previewing in a multi-user environment so that more than one user can simultaneously view translated components rendered in the first content format.

WebCATT 408 also provides complete management of the translation process. Web pages may be scheduled for translation either automatically by the translation server 400, or manually by a manager via upload of web pages or other type of content to be translated. When a web page is scheduled for translation, it may be placed in the translation queue of a specific customer. Pages to be translated may be scheduled for translation on a priority basis based on pre-defined priority information or using algorithms, such as ones based on the percentage of the page already translated and how often the page is being accessed on the original web server while it's in the translation queue. This allows the most important pages (e.g., most frequently accessed and those with smaller changes) to be translated first.

Once pages are in the queue, a manager can assign them for translation to a specific translator or translation service subcontractor. If assigned to a subcontractor, a subcontractor manager can then assign them to specific translators within the subcontractor organization or even to freelancers that work with them. Proofers can also be assigned. A subcontractor can assign its own proofers to pages and managers can also assign proofers to check the work of translators or subcontractors.

A web page may go through a series of status changes before it is available via the Internet. The status changes follow a translation workflow that allows translation, editing, proofing, and activation. In some embodiments, only active pages may be made available via the Internet.

In addition to the page statuses, the text and files within the page may maintain their own translation status. The status for text segments and files may be maintained both at the page level (i.e., one single overall status for all segments in the page and another one for all files in the page) and individually. The status of text segments and files may change following a translation workflow that allows translation, editing, proofing, and activation Translated segments and files may be available via the Internet only after their status is set to active.

Figure 12:
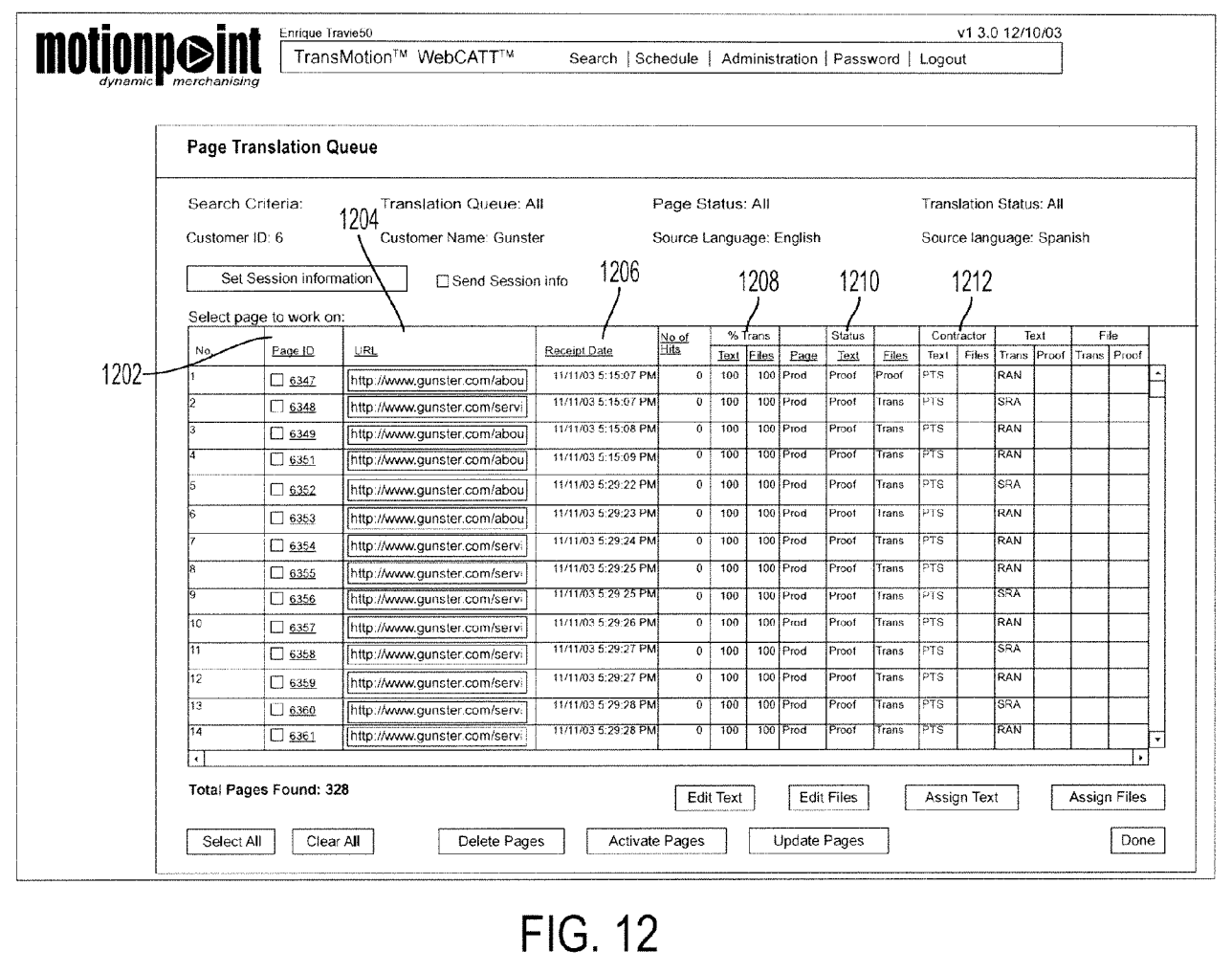

FIG. 12 is a screenshot of an exemplary WebCATT interface used for viewing a translation queue, in one embodiment of the present teaching. FIG. 12 shows a series of columns wherein a unit of information is provided for each page of the web site 414 listed on each row.

FIG. 12 shows a first column 1202 including unique page identifiers. Column 1204 includes a URL for each page. Column 1206 includes receipt data for each page. Column 1208 includes a percentage statistic indicating the percentage of the page that has been translated. Column 1210 indicates a status for each page. Column 1212 indicates the contractor assigned to the page.

Figure 13:
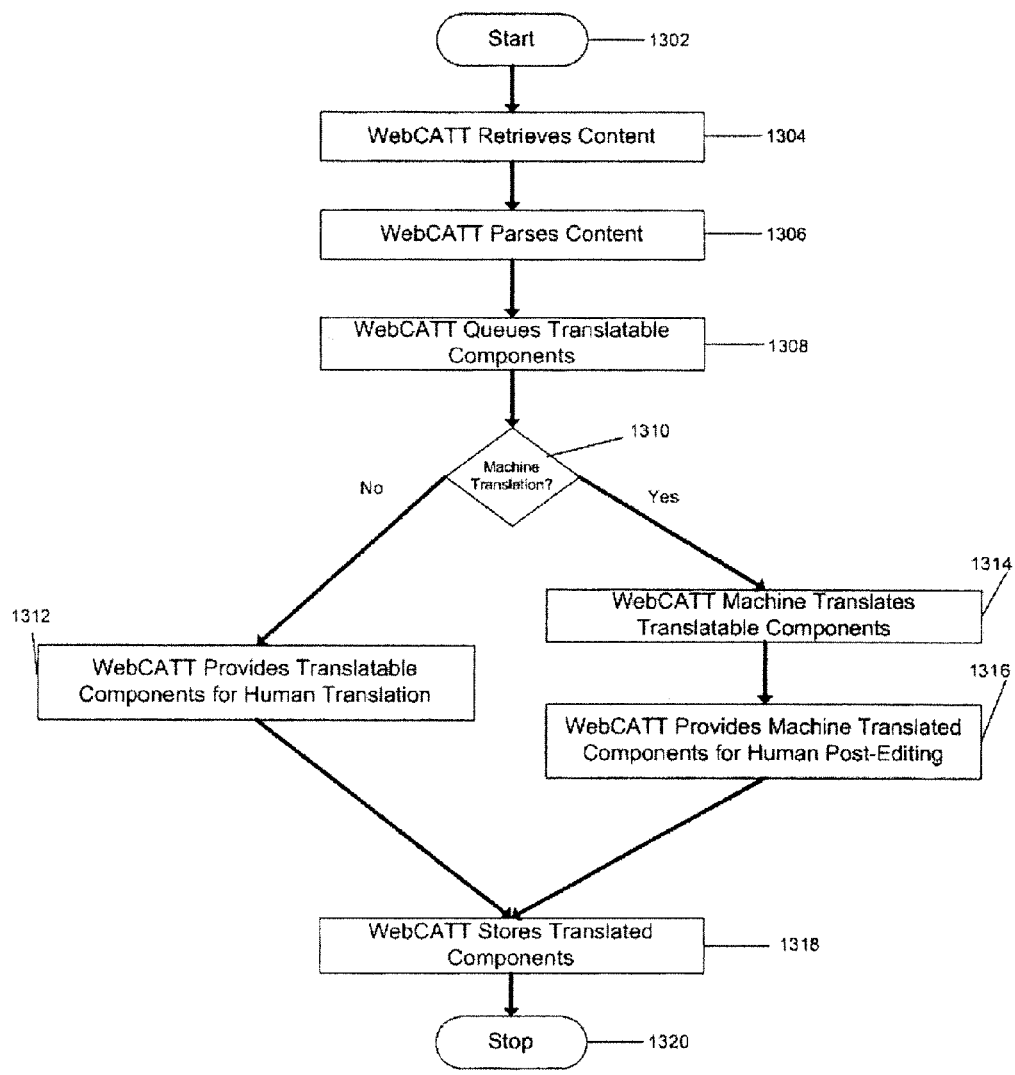
FIG. 13 is an operational flow diagram depicting an exemplary process of WebCATT, according to one embodiment of the present teaching.

FIG. 13 is an operational flow diagram depicting an exemplary process of WebCATT 408, according to an embodiment of the present teaching. The operational flow diagram of FIG. 13 depicts the process by which WebCATT 408, which provides a web based tool for managing language translations of content, queues, and translates components of a web site 414. The operational flow diagram of FIG. 13 begins with step 1302 and flows directly to step 1304.

In step 1304, WebCATT 408 may retrieve a first content, or HTML source page, in a first language from the web site 414. In step 1306, WebCATT 408 may parse the first content into one or more translatable components. In step 1308, WebCATT 408 may queue the translatable components for human translation or human edited machine translation into a second language.

In step 1308, for each of the translatable components it may be determined whether to invoke machine translation. If it is affirmative, then control flows to step 1314. Otherwise, control flows to step 1312. In step 1312, WebCATT 408 may provide a translatable component for human translation into a second language. In step 1314, WebCATT 408 may perform machine translation on a translatable component into a second language. In step 1316, WebCATT 408 may provide the machine translated component for human post-editing. In step 1318, for each of the translatable components, WebCATT 408 may store a translated component corresponding to the translatable component, thereby storing a plurality of translated components In step 1320, the control flow of FIG. 13 stops.

WebCATT 408 allows translators to work directly with live pages off the web site 414 being translated. Thus, the client web site 414 need not send information to the translation server 400 for translation. Furthermore, all web pages in a web site may be automatically entered into the translation work queue by the WebCATT 408 and spider 404, as described in greater detail below.

WebCATT 408 WYSIWYG preview allows translators to see translated web pages, as they would appear on the live web site. This allows the translator to compensate for word growth or shrinkage that knocks a web page layout out of alignment. Furthermore, in some embodiments a translated preview page may be marked-up with special HTML & JavaScript to allow: 1) color coding of all text in the web page so the translator can see what is already translated, what remains to be translated and where the current text segment is located within the page, 2) clicking in text or a file to take the translator to a form to edit the translation for the text or file, and 3) hovering the mouse over a text or file to pop up a window showing the original wording or file.

WebCATT 408 may parse pages into translatable components and translators only work with such translatable components, not a complex group of HTML files. All non-translatable content, such as HTML and script code, may be hidden when using WebCATT 408. WebCATT 408 can be utilized via the ASP model and translators can access it via the web. Translated pages can be delivered via the translation server 400 or saved as static html pages to be sent to client, wherein links among pages are modified so they reference the translated pages.

WebCATT 408 also allows management of the translation process. Multiple user access levels are supported: managers, proofers, translators & sub-contractors. Mangers can assign work in the translation queue to translators, proofers and/or subcontractors. Subcontractor managers can in turn sub-assign work to subcontractor translators and proofers. Managers can activate web pages before the translation server 400 can deliver them.

Trans Scope

A spider is a program that visits web sites and reads their pages and other information in order to create entries for an index such as a search engine index. For example, the major search engines on the Internet all have such a program, which is also known as a "crawler" or a "bot." Spiders are typically programmed to visit web sites that have been submitted by their owners as new or updated. Entire web sites or specific pages can be selectively visited and indexed. Spiders are named because they usually visit many web sites in parallel at the same time, their "legs" spanning a large area of the "web." Spiders can crawl through a web site's pages in several ways.

One way a spider can crawl through a web site is to follow all the hypertext links in each page until all the pages have been read. The spiders for the major search engines on the Internet adhere to the rules of politeness for Web spiders that are specified in a standard for robot exclusion. This standard allows specifying files to be excluded from being indexed. The standard also proscribes a special algorithm for waiting between successive server requests so that the spider doesn't affect web site response time for other users.

The operations of a spider are in contrast with a normal web browser operated by a human that doesn't automatically follow links other than inline images and URL redirection. The algorithm used by spiders to pick which references to follow strongly depends on the spider's purpose. Index-building spiders usually retrieve a significant proportion of the references. The other extreme is spiders that try to validate the references in a set of documents. These spiders usually do not retrieve any of the links apart from redirections.

FIG. 4 shows a spider 404 for use in analyzing and sizing a web site 414. The spider 404 is a tool that crawls specific web sites and performs any of a variety of actions. The spider 404 can crawl a web site in order to populate the WebCATT translation queue with new or updated information. The spider 404 may also gather content statistics that can be used to provide a monetary quote for deployment of the present teaching.

Figure 14:
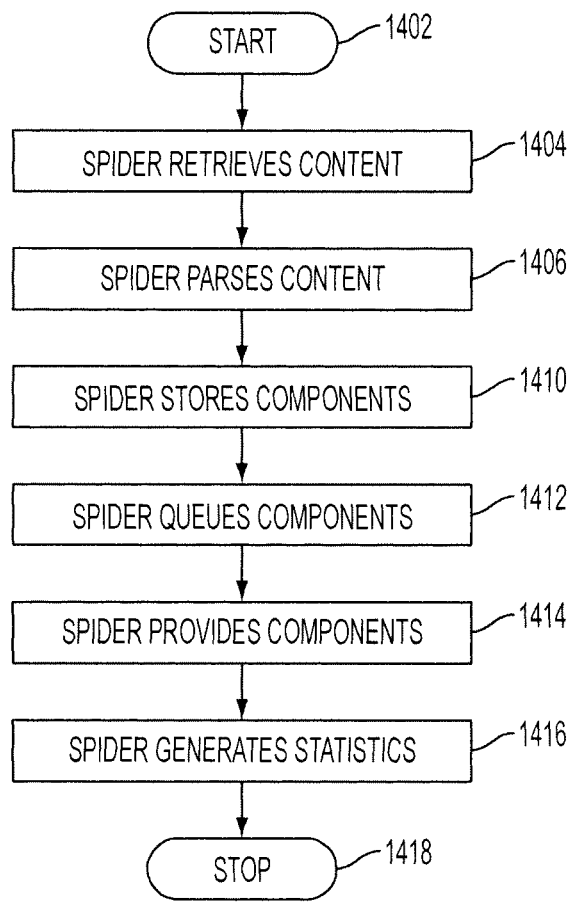
FIG. 14 is an operational flow diagram depicting an exemplary process of the spider, according to one embodiment of the present teaching.

FIG. 14 is an operational flow diagram depicting an exemplary process of spider 404, according to an embodiment of the present teaching. The operational flow diagram of FIG. 14 depicts the process by which spider 404, which provides a web based tool for sizing a web site for language translation, retrieves and indexes translatable components of a web site 414. The operational flow diagram of FIG. 14 begins with step 1402 and flows directly to step 1404.

In step 1404, spider 404 may retrieve a first content, such as an HTML source page, in a first language from the web site 414. The first content in a first language may be for translation into a second content in a second language. The second web content may be a human translation, or machine translation, or human edited machine translation in a second language of the first web content. In step 1406, spider 404 may parse the first content into one or more translatable components. A translatable component may include any one of a text segment, an image file with text to be translated, a multimedia file with text or audio to be translated, a file with text to be translated, a file with image with to be translated, a file with audio to be translated, and a file with video and with at least one of text and audio to be translated.

In step 1410, spider 404 may store the translatable components in the database 406 for human translation, or machine translation, or human edited machine translation into the second language.

In optional step 1412, spider 404 may queue the translatable components for human translation, or machine translation, or human edited machine translation into a second language. In optional step 1414, spider 404 may provide the translatable components to WebCATT 408 for human translation or human edited machine translation into a second language. In step 1416, spider 404 may generate statistics based on the translatable components retrieved from the web site 414. The statistics generated may include, but are not limited to a file count, a page count, a translatable segment count, a unique text segment count, a unique text segment word count, and a word count. The spider 404 can further generate a web page having a link to each file of the web site 414. In step 1418, the control flow of FIG. 14 stops.

The spider 404 can be pre-configured for each customer web site so that the use of directive tags and/or attributes is eliminated or minimized. This minimizes the workload of the customer web site's IT personnel. Further, the spider 404 can be separately pre-defined by domain and/or by URL pattern. This allows specifying sections of a web site to be translated without the need for placing directive tags in each web page.

The spider 404 can be used to update the WebCATT 408 translation work queue. Further, spider 404 can be used to gather statistics about a web site 414 in order to allow estimating the amount of work involved in translating the web site and pricing accordingly. Spider 404 can summarize word counts, segment counts, file counts and page counts of a web site 414. The spider 404 may supplement the functions of WebCATT 408 by saving all unique text segments and file URLs in the database 406 for later translation into a second language. It can further create an HTML page containing links to all files of web site 414, so the files can reviewed for translation at a later time.

The spider 404 can emulate a user agent (e.g., a browser) by saving and returning cookies when crawling a web site 414. Spider 404 can further fill out and submit forms with pre-defined information and is able to establish a session and normalize session ID parameters for e-commerce sites. Spider 404 can further be configured to crawl only specific areas of a web site by defining include/exclude domains and URL patterns. Spider 404 can also be configured to send specific HTTP headers, such as the user-agent (i.e., type of browser). Spider 404 can be executed in a single computer or in distributed mode. In distributed mode, multiple machines work in conjunction to crawl the same web site simultaneously sharing the same database 406.

Trans Sync

Most web sites are continuously updated with new information, but maintaining an alternate language web site up to date presents a challenge when using traditional methods. The system of the present teaching provides various methods to maintain an alternate language web site up to date.

Automatic maintenance involves automated maintenance of the alternate language web site so as to be maintained in synchronization with the original site with no human intervention or little additional effort. Automatic maintenance may be based on the function of the translation server 400 that automatically schedules a web page for translation by placing it in the WebCATT 408 translation queue (described in more detail above) in the event a translation cannot be found for one or more text segments or linked files in the page. Thus, the act of viewing a never-before translated or a modified page in the alternate language enables the scheduling of the web page for translation.

There are several ways to take leverage the auto-scheduling function of the translation server 400. One way involves manual quality assurance review. If a new web page or an updated web page goes through a manual quality assurance process that involves a person reviewing the page before it is released to the live web site, then the quality assurance personnel may simply attempt to view the page in the alternate language during the review process. This will place the new web page in the WebCATT 408 translation queue for translation before the page goes into the production (live) web site.

Another way to take leverage the auto-scheduling function of the translation server 400 involves the spider agent 404. The spider agent 404 can be used to crawl a web site, or just portions of a web site, in the alternate language on a regular basis. Crawling the web site in the alternate language is equivalent to a user viewing the site in the alternate language, and thus results in any new or modified pages being placed in the WebCATT 408 translation queue.

This technique can be used for regularly scheduled updates to a web site, which normally happens after hours. For example, if the ABC Widgets web site modifies its sale offerings twice a week, such as on Mondays and Fridays at 12 AM, then the spider agent 404 can be scheduled to crawl the relevant parts of the site shortly after (e.g., at 12:30 AM) on those days. Around-the-clock translators can then translate the new sale banners so that the alternate language web site is up to date sometime later that morning.

The spider agent 404 can also be used to regularly (e.g., daily) crawl a web site even when changes are not regularly scheduled. This will guarantee that the alternate language site is in sync with the original language site after every crawl and subsequent translation.

Another way to take leverage the auto-scheduling function of the translation server 400 involves user access. Even if no manual quality assurance reviews or scheduled spider agent 404 crawls are performed, the alternate language web site may be still automatically maintained up to date over the long term. This is because the first online user that attempts to view a new or modified page in the alternate language may trigger the placement of that page into the WebCATT translation queue. In that case, the online user may see the page in the original language or may see a partially translated page. However, subsequent users that access the page may see the web page in the alternate language after it has been translated.

In addition to automatic maintenance, the present teaching also supports manual maintenance of the alternate language web site so as to be maintained in synchronization with the original site. New information that needs translation can also be manually placed in the translation queue using WebCATT 408. This can be useful to translate large amounts of data that is available in advance of it being on the live web site 414. For example, if the ABC Widgets web site updates its web site with new product offerings every Thursday morning, and all product information is available by the previous Tuesday, then all new product data can be manually batched into the translation queue using WebCATT 408 as soon as it is available so it is fully translated by the time the new web pages go live. New information that needs translation may also be placed in the translation queue via the web service described in FIG. 8(*a*).

Population of the WebCATT 408 translation queue can be performed either by URL or by content. Population by URL means that translation server 400 stores only the URL of the page in the queue. The content of the URL may be retrieved afterwards when a translator accesses the page to translate it using WebCATT 408. Population by URL can present a problem if the content of the page is dependent on session information, such as a session ID present in a query parameter or stored in a cookie. In that case, the session ID in the query parameter may have expired or the session information stored in the cookie may not be present when viewing the page in WebCATT 408.

In some embodiments, session dependent pages can be handled in different ways. For example, a session dependent page can be handled by replicating the session state via cookies and/or updated session parameters or by populating the page by content. Replicating the session state allows the translator to manually re-acquire a session from the original site by entering the session data in WebCATT 408. Once the session data is entered, it can be used for translating multiple pages. Population by content means that translation server 400 stores the full content of the page in the queue. This avoids the session dependence issue, but can result in outdated content. As a result, population by content may be used only for session dependent pages, and population by URL, which guarantees that the content being translated is the latest content, may be used for all other pages.

Access to the WebCATT 408 translation queue is segmented by customer and prioritized. Pages to be translated may be scheduled for translation on a priority basis based on pre-defined priority information or using algorithms, such as ones based on the percentage of the page already translated and how often the page is being accessed on the original web server while the page is in the translation queue. This allows the most important pages (e.g., most frequently accessed and those with smaller changes) to be translated first.

A file change detection feature can be used to deal with files whose names have been changed. The translation server 400 and WebCATT 408 can match a file to be translated with its translated file by the URL of the original file. However, it is possible for a file to be changed while its name and location remain the same. In that case, it is possible that an outdated translated file is used for the translation.

To overcome this issue, in some embodiments the translation server 400 computes a hash-code or checksum based on the binary content of the file and stores it with the URL. Each time a file is presented for translation or at certain intervals, the translation server 400 or WebCATT 408 may re-compute the hash-code or checksum and compare it against the stored one. If they match, the file has not changed and the existing translated file can be used as replacement. However, if they do not match, the binary content of the file was changed and the existing file translation cannot be used. In that case, the file may be placed in the WebCATT 408 translation queue so it may be re-translated.

Figure 15:
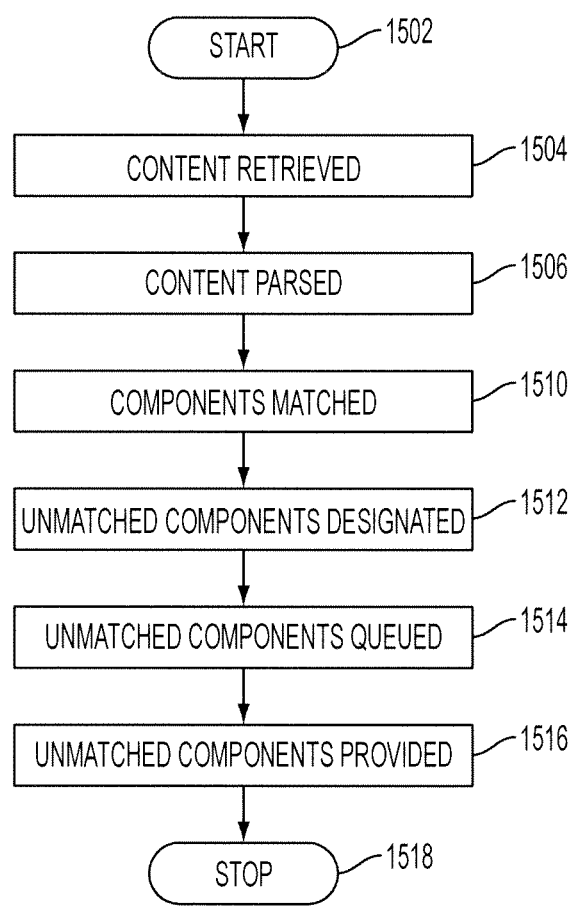
FIG. 15 is an operational flow diagram depicting an exemplary synchronization process according to one embodiment of the present teaching.

FIG. 15 is an operational flow diagram depicting an exemplary synchronization process according to an embodiment of the present teaching. The operational flow diagram of FIG. 15 depicts the automated maintenance process of the alternate language web site so as to be maintained in synchronization with the original web site 414. The operational flow diagram of FIG. 15 begins with step 1502 and flows directly to step 1504.

In step 1504, a first content in a first language, such as an HTML source page, may be retrieved from the web site 414. The first content in a first language may be for translation into a second content in a second language. The second web content may be a human translation, or machine translation, or human edited machine translation in a second language of the first web content. In step 1506, the first content may be parsed into one or more translatable components.

In step 1510, a corresponding translated component of the second web content may be identified or matched for each translatable component of the first web content. If a translatable component of the first web content is not matched to a translated component of the second web content, in step 1512, the translatable component may be designated for translation into the second language. In optional step 1514, the translatable components that weren't matched may be queued for human translation, or machine translation, or human edited machine translation into a second language. In optional step 1516, the translatable components that weren't matched may be provided to WebCATT 408 for translation into a second language. In step 1518, the control flow of FIG. 15 stops.

Preference Selector

Figure 17:
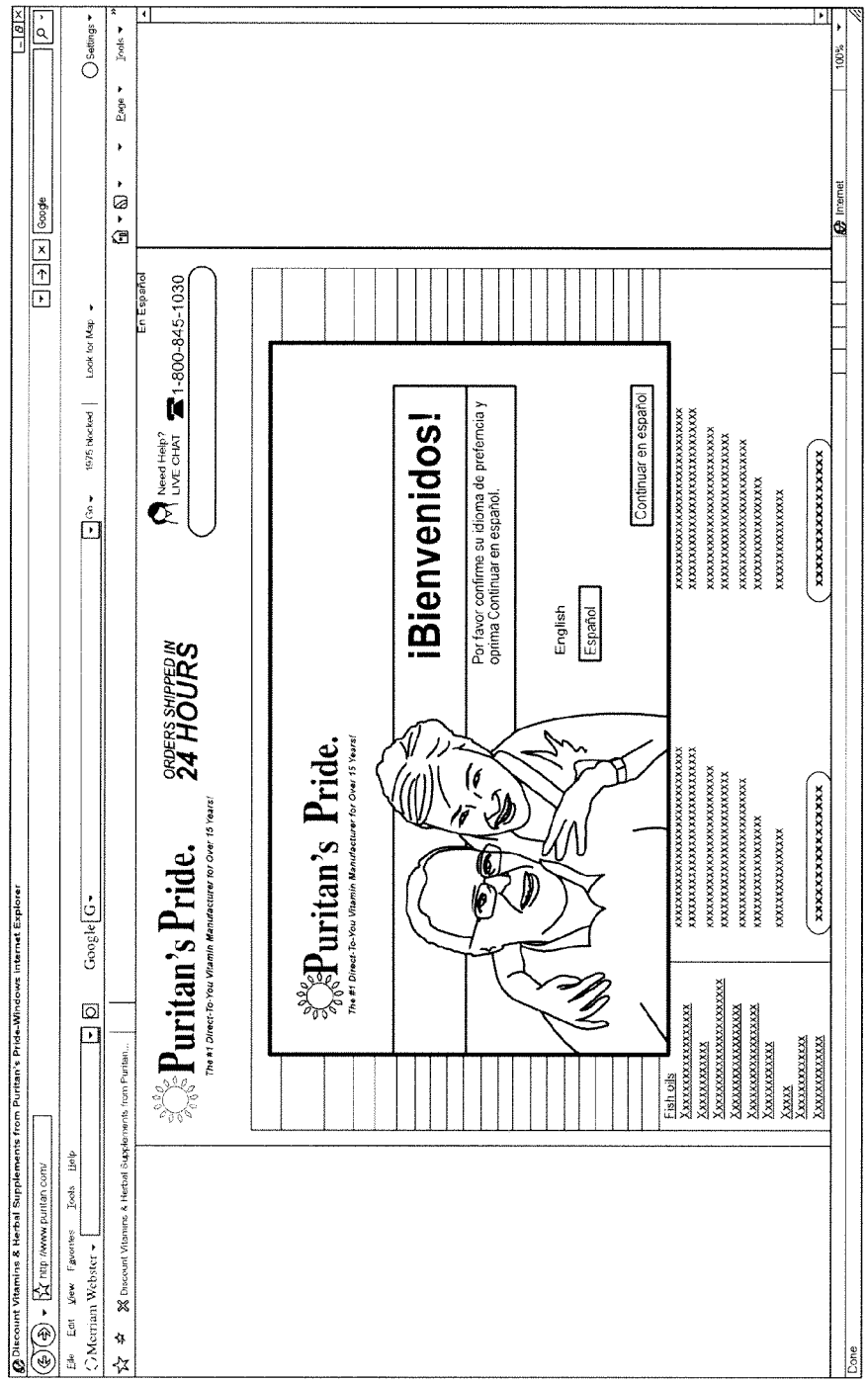
FIG. 17 is a screenshot of an exemplary Preference Selector pop-up window on the user agent (e.g., a browser), according to one embodiment of the present teaching.

A translated website creates value only when a potential customer visits it. Unfortunately, users sometimes fail to notice the alternate language links on the web site 414. Even when users do see these links, they may be reluctant to click because they believe the experience will be inconsistent or inferior to the origin web site 414. The system of the present teaching provides a solution to this problem called Preference Selector, which provides different ways to prompt a user 416, whose likely language, country, or currency preference may not be consistent with the web site's native language, country, or currency, to confirm this likely preference when entering a web site. FIG. 17 is an exemplary screenshot of how Preference Selector may be structured on a user agent (e.g., a browser), in one embodiment of the present teaching. Through Preference Selector, a user 416 on web site 414 can be routed to his/her preferred online experience. As a result, user trust-levels increase and the probability of the user carrying out a transaction on the web site also increases.

In one embodiment of the present teaching, Preference Selector may pop-up only when it has been determined that a user 416 likely prefers to view web site 414 in a language other than the site's native language. Otherwise, Preference Selector may not pop-up. When Preference Selector pops-up and the user 416 selects a preferred preferences, these preferences may be saved in one more cookies on the user's browser. Preference Selector can then automatically redirect the user 416 to the preferred alternate language site when the user visits the site again. In addition to facilitating the initial language selection process, Preference Selector can also be displayed on-demand to change these preferences at any time.

In some embodiments, Preference Selector can use the following information, which may be available in an HTTP request sent by the user agent (e.g., a browser) or via other means (e.g., cookies), as its inputs to control the subsequent operation(s):
  Request URL
  Referrer URL
  User Agent "Accept-language" header
  User Agent language
  User's IP address
  User's geo-location information
  User's demographic information
  User's online activities history information
  User Agent Language cookie, if previously visited the site Preference Selector may be pre-configured with the following information, which may be used to control its operation based on the above inputs:
  List of customer domain names to enable Preference Selector for
  List of languages, countries and/or currencies to enable Preference Selector for
  List of referrer domains for each alternate language (e.g., www.terra.com for Spanish)
  List of referrer TLDs (Top Level Domains) for each alternate language (e.g., ".mx" in "google.com.mx"—GOOGLE Mexico—for Spanish)
  List of referrer subdomains for each alternate language (e.g., "espanol" in "espanol.yahoo.com" for Spanish)
  List of referrer keywords or parameters for each alternate language (e.g., the search term "lavadora"—Spanish for "washer"—in the GOOGLE URL www.google.com/search?hl=en&q=lavadora for Spanish)
  List of languages by country, region, or city
  List of affinity languages. (e.g., a French user may prefer to read Spanish before English)

Preference Selector may be implemented by inserting a link to a Preference Selector JavaScript file in the web site 414. This eliminates or minimizes the effort from the IT personnel of a customer's web site. For instance, the code to be inserted to link to the JavaScript file can be provided to a customer as part of the "One-Link" Deployment language switching link. The Preference Selector JavaScript file may be provided to work in conjunction with server side logic to provide the pop-up and redirection behavior.

Figure 18:
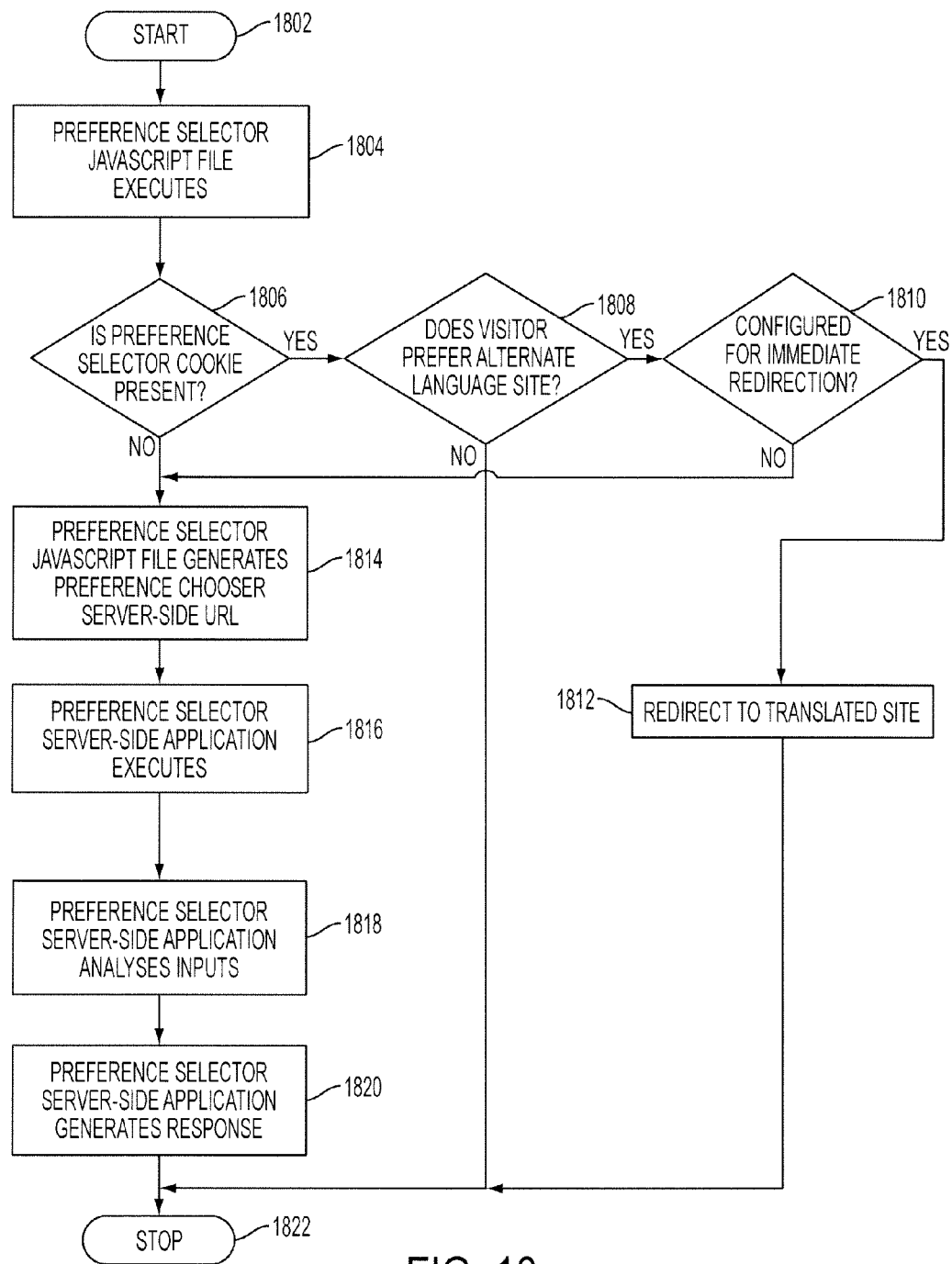
FIG. 18 is an operational flow diagram depicting an exemplary process of loading Preference Selector, according to one embodiment of the present teaching.

FIG. 18 is an operational flow diagram depicting an exemplary process of loading Preference Selector, in one embodiment of the present teaching. The operational flow diagram of FIG. 18 begins with step 1802 and flows directly to step 1804. In step 1804, the user agent (e.g., a browser) may load the Preference Selector JavaScript file and execute its logic. In step 1806, the Preference Selector JavaScript file logic may determine whether the Preference Selector cookie is present for the user 416. If the Preference Selector cookie is present, then control flows to step 1808. Otherwise, control flows to step 1814. In step 1808, the value of the cookie may be inspected to determine whether the user 416 prefers an alternate language site. If it is affirmative, then control flows to step 1810. Otherwise, control flows to step 1822 and the processing stops. In step 1810, a configuration option that specifies immediate redirection may be checked to determine whether a redirection to the preferred translated site is to be performed. If it is affirmative, then control flows to step 1812. Otherwise, control flows to step 1822 and processing stops. In step 1812, a JavaScript client side redirection to the translated site may be performed, and the user 416 may be redirected to the preferred translated site. It is understood that other implementations other than a cookie may also be used to achieve the same function.

In step 1814, the Preference Selector JavaScript file logic may generate the Preference Selector server-side URL to the Preference Selector application and instruct the user agent (e.g., a browser) to request the URL. In step 1816, the Preference Selector server-side application may execute its logic. In step 1818, the Preference Selector server-side application may analyze the inputs provided. In step 1820, the Preference Selector server-side application may generate a response.

Figure 20:
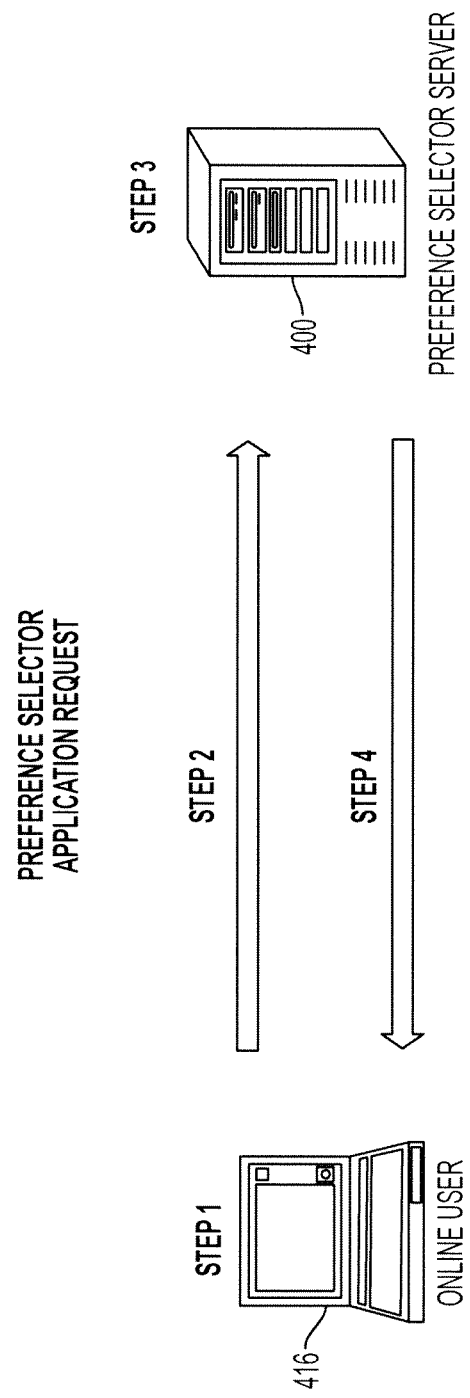
FIG. 20 is a block diagram depicting an exemplary process of the Preference Selector server-side application request and the response, according to one embodiment of the present teaching.

FIG. 20 is a block diagram depicting an exemplary process of the Preference Selector server-side application request and the response, which is also depicted in steps 1814 through 1820 in FIG. 18, in one embodiment of the present teaching. In step 1, the Preference Selector JavaScript file may generate the Preference Selector server-side URL to the Preference Selector Application and instruct the user agent (e.g., a browser) to request the URL. In step 2, the user agent may send the request to Preference Selector Application. Step 2 shows that the request may include the following additional information: (a) the user's IP address and/or geo-location information, (b) the user' demographic information, such as but not limited to ethnic information, (c) the user's online activity history information, such as but not limited to which language the user has been using to send emails, or what kind of products (e.g., books, CD, etc.) the user has been buying and which language those products are associated with, (d) various HTTP request headers, and (e) specific URL parameters. In step 3, the Preference Selector Application may utilize the information included in the request and its pre-configured information to generate a response. The response may include displaying the Preference Selector pop-up, redirecting the user to a translated site, or performing no action. In step 4, the Preference Selector response may be sent back to the user.

Figure 19A:
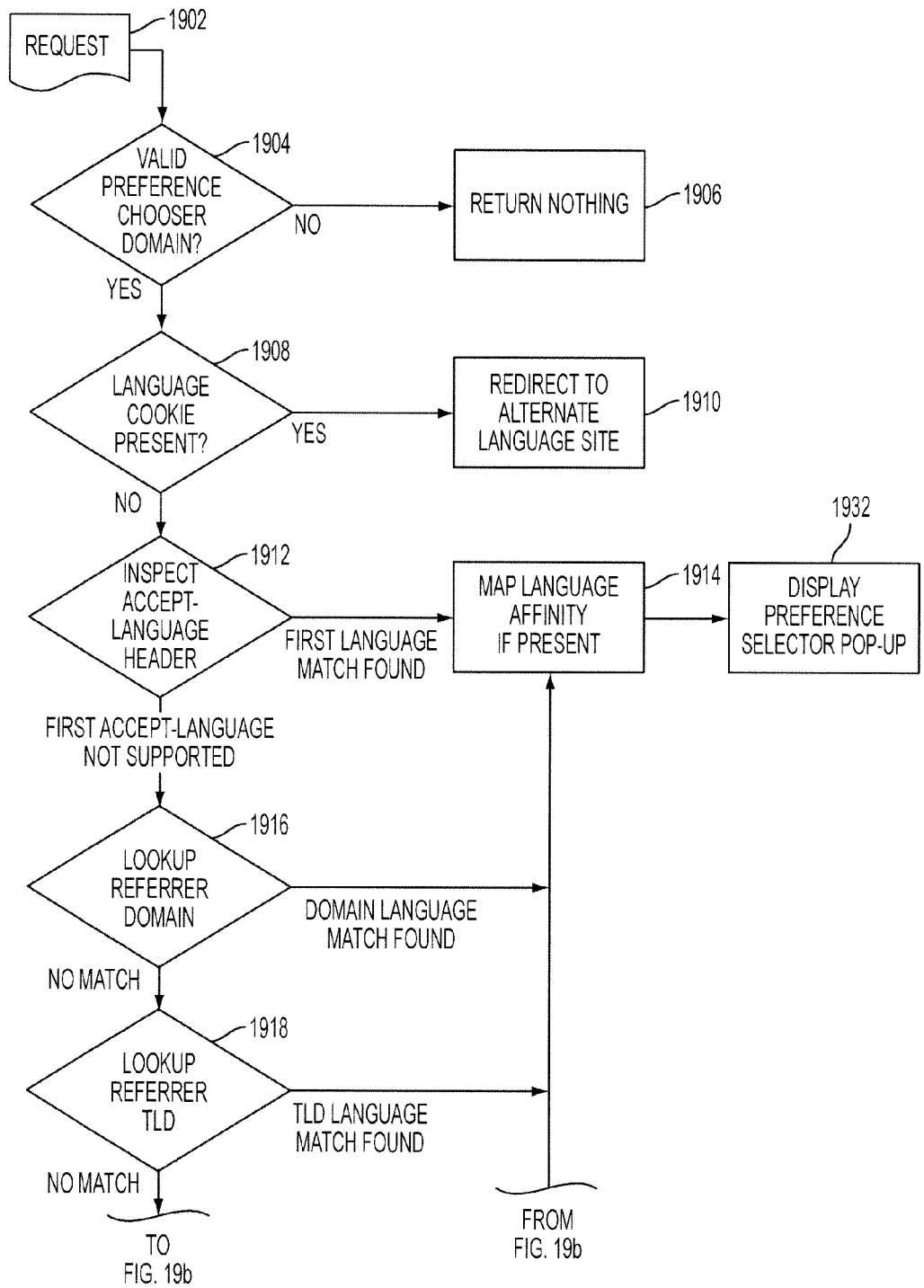
FIG. 19 is an operational flow diagram depicting an exemplary process of the Preference Selector server-side application, according to one embodiment of the present teaching.
Figure 19B:
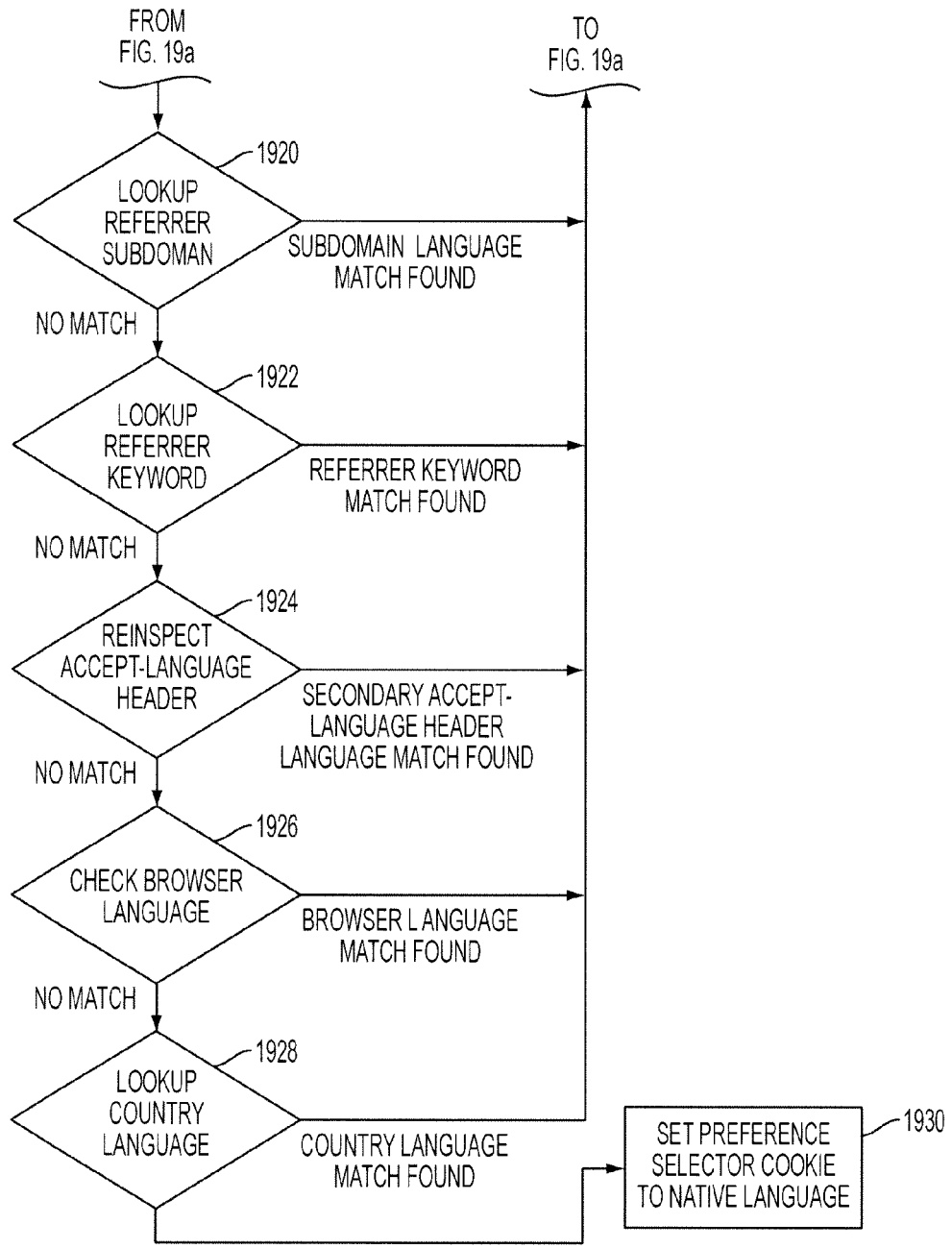

FIG. 19 is an operational flow diagram depicting an exemplary process of the Preference Selector server-side application for analyzing the inputs against the pre-configured information to control its operation and generate a response, in one embodiment of the present teaching. The operational flow diagram of FIG. 19 begins with step 1902 when the application receives the request from the user agent (e.g., a browser) and flows directly to step 1904. In step 1904, it may be determined whether the request comes from a valid Preference Selector domain. If it is affirmative, then control flows to step 1908. Otherwise, control flows to step 1906 and the Preference Selector application may not return any content in this case.

In step 1908, the presence of Preference Selector cookie may be checked and, if present, it may be determined based on the value of the cookie as to whether the user 416 prefers an alternate language site. If it is affirmative, then control flows to step 1910. Otherwise, control flows to step 1912. In step 1910, the Preference Selector application may respond with a server-side redirection to the translated language site.

In step 1912, the value of an Accept-Language user agent request header may be inspected to determine the user's preferred language and locale. If the first (or primary) language listed therein matches with a configured alternate language, then this primary language may be set as the Preference Selector default language and control flows to step 1914. Otherwise, control flows to step 1916.

In step 1914, the Preference Selector default language may be compared against a configured list of affinity languages, and if a match is found, the mapping may be applied and control flows to step 1932. For example, if the Preference Selector default language is French, and there is no French website available, but an affinity language has been defined that maps French to Spanish (because a French user 416 may prefer to read Spanish before English), then the Preference Selector default language is set to Spanish. In step 1932, the Preference Selector application may respond with a Preference Selector pop-up, e.g., a welcome pop-up, using the Preference Selector default language as the default selection in the user interface.

In step 1916, the value of domain name in the referrer user agent request header may be inspected and compared against a configured list of referrer domains to determine whether the user 416 comes from a website in a configured alternate language. If it is affirmative, then the Preference Selector default language is set to that alternate language and control flows to step 1914. For example, if the referrer domain is "www.terra.com", which is a well known Internet portal in Spanish, then the Preference Selector default language is set to Spanish. Otherwise, control flows to step 1918.

In step 1918, the value of the top level domain (TLD) of the domain name in the referrer user agent request header may be inspected and compared against a configured list of TLDs to determine whether the user 416 came from a website in a configured TLD. If it is affirmative, then the Preference Selector default language is set according to the language configured for that TLD and control flows to step 1914. For example, if the referrer domain is "www.google.com.mx", which is GOOGLE's website in Mexico, and the TLD ".mx" is mapped to Spanish, then the Preference Selector default language is set to Spanish. Otherwise, control flows to step 1920.

In step 1920, the value of the subdomain in the domain name in the referrer user agent request header may be inspected and compared against a configured list of subdomains to determine whether the user 416 came from a website in a configured subdomain. If it is affirmative, then the Preference Selector default language is set according to the language configured for that subdomain and control flows to step 1914. For example, if the referrer domain is "espanol.yahoo.com", which is YAHOO's portal website in Spanish, and the subdomain "espanol" is mapped to Spanish, then the Preference Selector default language is set to Spanish. Otherwise, control flows to step 1922.

In step 1922, the value of a keyword or parameter in the in the referrer user agent request header may be inspected and compared against a configured list of keywords or parameters to determine whether the user 416 is using keywords or parameters associated with an alternate language. If it is affirmative, then the Preference Selector default language is set according to the language configured for that keyword or parameter and control flows to step 1914. For example, if the referrer URL is "http://www.google.com/search?hl=en&q=lavadora" and the search term "lavadora" (which is Spanish for "washer") in the URL is recognized as a Spanish keyword, then the Preference Selector default language is set to Spanish. Otherwise, control flows to step 1924.

In step 1924, the value of the Accept-Language user agent request header may be re-inspected to determine the user's secondary language and locale. If a secondary language listed is matched against a configured alternate language, then this secondary language is set as the Preference Selector default language, and control flows to step 1914. Otherwise, control flows to step 1926.

In step 1926, the value of the user agent language may be inspected to determine the user's user agent language. If the user agent language is matched against a configured alternate language, then the user agent language is set as the Preference Selector default language, and control flows to step 1914. Otherwise, control flows to step 1928.

In step 1928, the IP address of the user 416 may be inspected and a geo-location database used to determine the user's geographic location, such as the country, state/region, city, and zip code. If the user's geographic location is matched against a configured mapping of locations to languages, and the language corresponding to the user's location is matched against a configured alternate language, then the location language is set as the Preference Selector default language, and control flows to step 1914. Otherwise, control flows to step 1930.

In addition to the IP address and the geo-location, the user's demographic information and online activity history information may be inspected to determine the user's preferred language. In one embodiment, the demographic information such as the ethnic information may be obtained and inspected. For example, if the user belongs to the Hispanic ethnic group, the preferred language of the user is likely to be Spanish. In another embodiment, the user's online activities may be obtained and inspected. In one example, the language in which the user has been using to send and receive emails may be used to determine the user's preferred language. In another example, the user's online shopping history may be analyzed, for example, the language of the books or CDs that the user has been purchasing. The demographic information and the online activities history information may be obtained from various sources, such as but not limited to cookies, online commercial activities survey agencies, or any suitable sources where the user may supply his/her personal information or preference information (not shown in figures).

When control flows to step 1930, Preference Selector has been unable to find a default alternate language. In step 1930, the Preference Selector cookie may be set with a value for the native language of the site 414. In that case, when the user 416 returns to the site 414, steps 1804, 1806, 1808 and 1822 of FIG. 18 will be executed in succession resulting in the user 416 staying in the native site 414 without receiving the Preference Selector welcome pop-up, or being redirected to an alternate language site.

In another embodiment of the present teaching, the order in which the inputs are checked in the operational flow diagram of FIG. 18 is modified according to configuration information. For example, the referrer search keyword checked in step 1922 can be checked before the domain, TLD, and subdomain of the referrer, which may alter the response. In yet another embodiment of the present teaching, some of the inputs may not be checked.

In another embodiment of the present teaching, Preference Selector does not actually pop-up in a window in front of the native site 414, but instead replaces an existing area in the page.

In another embodiment of the present teaching, Preference Selector allows the user 416 to select a preferred currency and geographic location (i.e., country or region where the user 416 is coming from or wants items shipped to). This is useful for websites that offer international service (e.g., global ecommerce, country specific offers or pricing, etc).

In another embodiment of the present teaching, Preference Selector pops-up for all users to a website, regardless of the value of the Preference Selector inputs. In this case, Preference Selector prompts all users 416 to choose a language, including those users that likely prefer the native language of the site 414. Preference Selector may also prompt all users to choose a preferred currency and/or geographic location.

In another embodiment of the present teaching, Preference Selector shows the user 416 customized content according to one or more of the Preference Selector inputs. For example, Preference Selector can display market specific messaging or offers by language or geographic location. Preference Selector may also show a customized offer when a user 416 came from a specific site (i.e., the referring site), or when the user 416 used specific search keyword(s) to land on the site.

In another embodiment of the present teaching, Preference Selector can redirect the user 416 to different sites depending on one or more of the Preference Selector inputs. For example, a customer may have two sites that offer the same service (e.g., purchasing train tickets), one for European users and the other for all other users coming from outside Europe. Both of these sites are available in a native language and several other alternate languages. Preference Selector may be configured to redirect the user 416 to the applicable language version of the appropriate site, depending on where the user 416 is coming from and the selected preferred language.

In another embodiment of the present teaching, Preference Selector collects data about user 416 behavior and learns about circumstances under which it should pop-up in the future. If a user 416 chooses an alternate language site via Preference Selector, Preference Selector records information on that user 416 that may include (1) the user's IP address and/or geo-location information, (2) the referring site URL and IP address, (3) the country/region of origin of the referring site, (4) the user' demographic information, and (5) the user's online activity history information. If over time a significant number of users coming from the same referring site select the same alternate language via Preference Selector, even if that referring site is not located in a country where that language is commonly used, it is added to Preference Selector's list of referrer sites for which to pop-up Preference Selector with a default selection of that alternate language. If over time a significant number of users located on the same city or region within a country (based on the user's IP address or geo-location information) select the same alternate language via Preference Selector, even if that city/region is not flagged for that alternate language, that city or region is added to Preference Selector's list of locations for which to pop-up Preference Selector with a default selection of that alternate language.

Content Localizer

Translating a web site to another language is an important first step in expanding an organization's reach to new foreign markets. However, in order to make a web site culturally suitable to a desired target audience, it is essential that the web site's content is customized, or localized, according to the culture and requirements associated with the targeted audience. Examples of localization include, for example customizing the format of numbers, dates and times; converting currency in accordance with the custom of the local market; and converting units of measurement in accordance with the custom of the local market. Such formatting and conversion capabilities may be performed by the Translation Server 400 at the time of converting pages from one language to another. In addition, customization can go beyond formatting and conversion in order to provide culturally relevant content to each targeted local market. Such localized content may include, but are not limited to marketing content, product variations, descriptions, and legal language specific to each target local market. The system of the present teaching includes a technology called Content Localizer that enables a web site operator to easily offer content specific to a local market to a user 416.

Content Localizer may comprise two components: a Content Localizer Manager and a Content Localizer Server. The Content Localizer Manager is an application used to define localized content and to manage the process of content localization. The Content Localizer Server is an application responsible for serving the localized content to the user 416. In some embodiments of the present teaching, the Content Localizer Manager is a web based application with a Graphical User Interface (GUI) interface.

Figure 21:
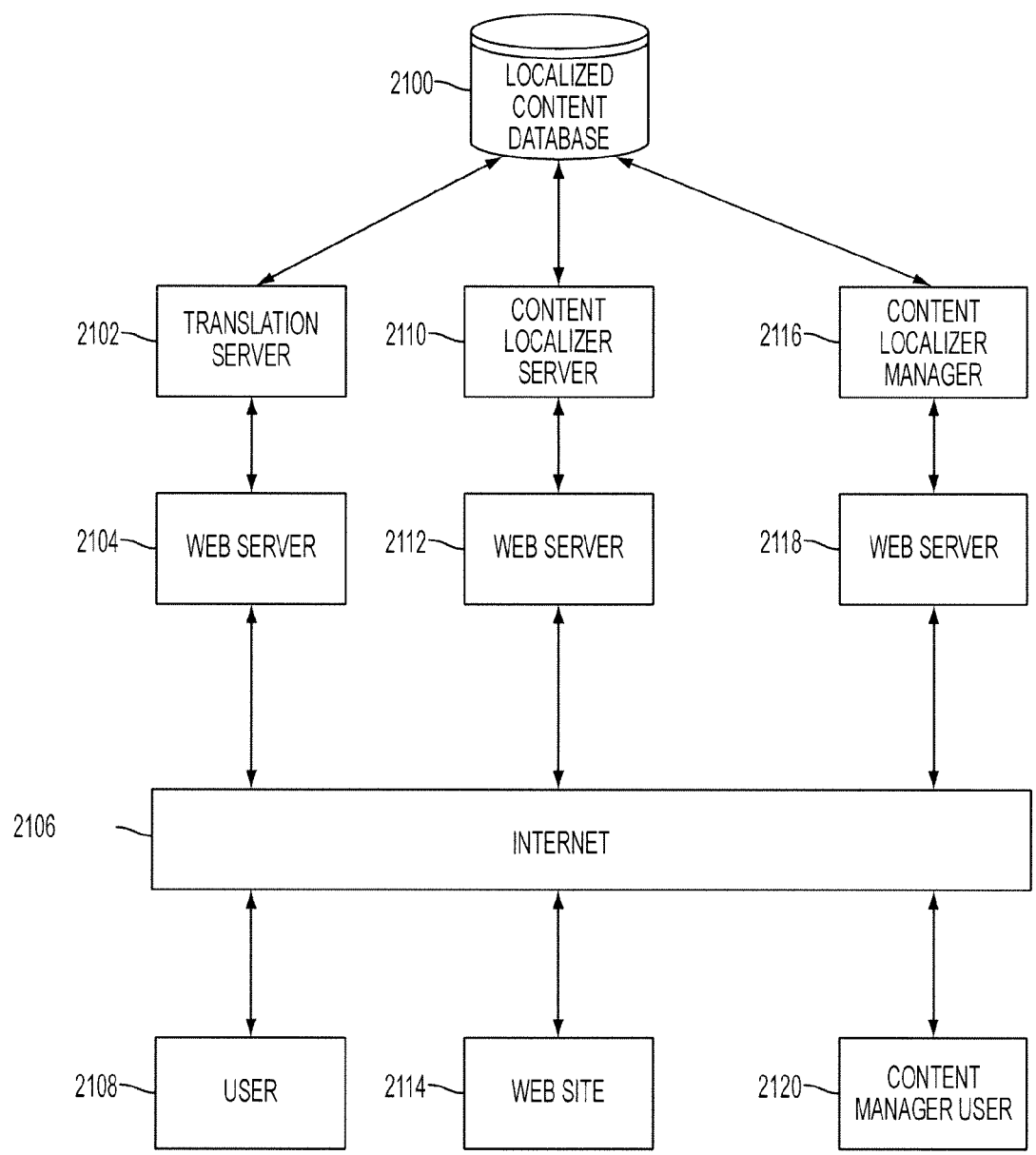
FIG. 21 is a block diagram illustrating an exemplary system architecture of the Content Localizer, according to one embodiment of the present teaching.

FIG. 21 is a block diagram illustrating an exemplary system architecture of the Content Localizer, in one embodiment of the present teaching. FIG. 21 shows a web site 2114 representing a web site in a first language such as English, corresponding to the web site 414 of FIG. 4, which is connected to the Internet 2106 via a web connection. FIG. 21 also shows a Translation Server 2102, corresponding to the Translation Server 400 of FIG. 4, a Content Localizer Server 2110, and a Content Localizer Manager 2116. FIG. 21 further shows a localized content database 2100 for storing localized content and the associated conditions for use by the Translation Server 2102, the Content Localizer Server 2110, and the Content Localizer Manager 2116.

FIG. 21 also shows a user 2108 that utilizes a web connection to the Internet 2106 to browse and navigate the web pages served by the web site 2114 in a first language and by the Translation Server 2102 in a second language. Also shown in FIG. 21 is a content manager user 2120, who utilizes the Content Localizer Manager 2116 to specify localized content with identifiers and associated conditions. The Translation Server 2102, the Content Localizer Server 2110 and the Content Localizer Manager 2116 are each connected to web servers 2104, 2112, and 2118, respectively, which are the conduits through which all web actions of the above tools are channeled.

In some embodiments, the computer systems for Translation Server 2102, Content Localizer Server 2110, Content Localizer Manager 2116, and web servers 2104, 2112 and 2118, are one or more Personal Computers (PCs) (e.g., IBM or compatible PC workstations running the Microsoft Windows 95/98/2000/2008/ME/CE/NT/XP/VISTA/7 operating system, Unix, Linux, Macintosh computers running the Mac OS operating system, ANDROID, or equivalent), Personal Digital Assistants (PDAs), tablets, smart phones, game consoles or any other information processing devices. In some embodiments, the computer systems of Translation Server 2102, Content Localizer Server 2110, Content Localizer Manager 2116, and web servers 2104, 2112 and 2118, are server systems (e.g., SUN Ultra workstations running the SunOS operating system or IBM RS/6000 workstations and servers running the AIX operating system).

The Content Localizer Manager 2116 may be utilized by users whose role involves managing the content on the web site 2114 to define localized content for some target markets. The Content Localizer Manager 2116 allows a user to upload or specify localized content and associate such content with an identifier and a variety of conditions that need to be satisfied before the localized content is to be displayed. The localized content together with its identifier and associated conditions are stored in the localized content database 2100. In some embodiments, localized content can include text, one or more graphics, flash files, videos, a chunk of HTML or JavaScript code, etc.

The identifier may be used to determine where on the site the localized content is to be placed. Different versions of localized content can be associated with the same identifier, but may have different conditions. This allows different versions of the content to be displayed on the same area of the site depending on which conditions are met. A default localized content may also be specified, which may be used when none of the pre-defined conditions are met.

Examples of conditions to be satisfied in order for the content to be displayed may include:

Publication date and time, which restricts display of content to only on or after the publication date and time Expiration date and time, which restricts display of content to only before the expiration date and time Local Time, which restricts display of content to only at some specific time of the day, such as in the evening Browser, Operating System or Device, which restricts display of content to users in an environment involving specified user agents (e.g., a browser), operating systems (e.g., Windows) or devices (e.g., a smart phone)

Language, which restricts display of content to users viewing the site in a specific language, such as French User's Location, which restricts display of content to users being recognized as coming from a specific location, e.g., a specified country, region, city or postal code, detected based on, e.g., the user's IP address or geo-location information Referrer domain, which restricts display of content to users coming from a specific set referring site domains, such as "www.terra.com", a well-known portal in Spanish Referrer TLD (Top Level Domain), which restricts display of content to users coming from a specific set of referring site TLDs, such as "mx" in "google.com.mx" for GOOGLE Mexico Referrer sub-domain, which restricts display of content to users coming from a specific set of referring site sub-domains, such as "espanol" in "espanol.yahoo.com"

Referrer keyword or parameter, which restricts display of content to users who used specific keywords or parameters in the referring site URL, such as the search term "lavadora" (Spanish for "washer") in the Google referring URL www.google.com/search?hl=en&q=lavadora URL or content viewed, which restricts display of content to users that view specific URLs within the site, or that view a page that has specific content, such as a specific page title User behavior, which restricts display of content to users that exhibit a specific behavior while visiting the site, such as a user browsing for video cameras on a retailer's site Search keywords, which restricts display of content to users who perform on-site searches using specific search keywords Stored cookie, which restricts display of content to users who have a cookie that specify that they have previously visited the site, or other related sites, and may have specific preferences or have exhibited specific behavior in the past while on the site Accept-language header, which restricts display of content to users with a specific set of values in the user agent "Accept-language" header, such as "Accept-Language: es-ve" for a user whose default user agent language and country is Spanish-Venezuela Browser default language, which restricts display of content to users with a specific set of values in the user agent default language User's demographic information User's online activities history information Localized content can be defined to support testing of two or more different versions of localized content associated with the same identifier and the same conditions. In this case, the Content Localizer Server 2110 may apply the different versions of the localized content among users that meet the associated conditions. In some embodiments, round robin approach may be applied and in other embodiments, the selection of a particular version for a particular user may be made randomly or based on some conditions. In other embodiments, the selection may be based on a specified allocation algorithm. Special requirements such as session persistence may be factored in so that once a user is assigned a specific version of the localized content, that version is continuously applied to the same user by, e.g., saving the information in a Content Localizer cookie, so that on subsequent visits the user is shown the same localized content.

Once localized content is defined via the Content Localizer Manager 2116 and stored in the localized content database 2100, the Content Localizer Server 2110 is responsible for serving the appropriate localized content whenever the conditions are met.

Figure 22:
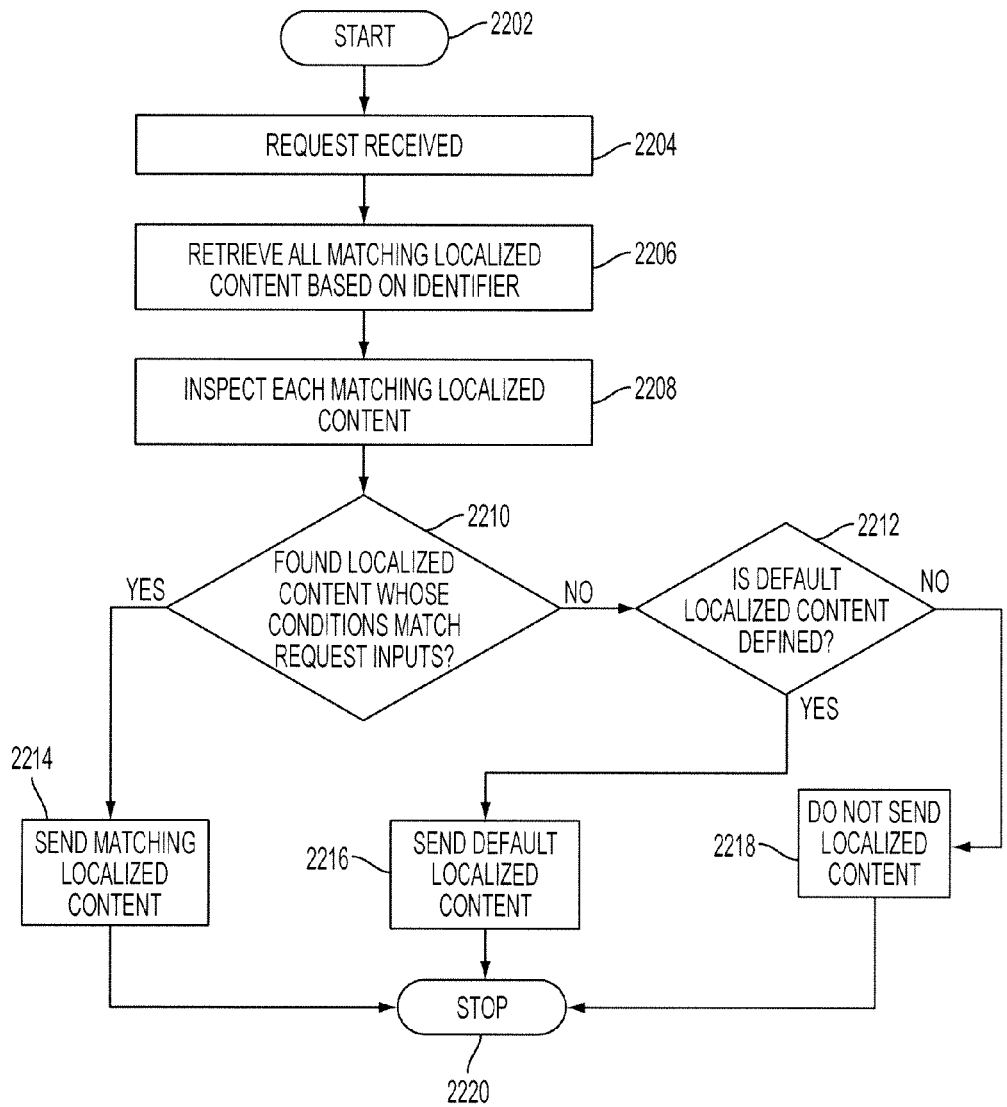
FIG. 22 is an operational flow diagram depicting an exemplary process of the Content Localizer Server for generating localized content, according to one embodiment of the present teaching.

FIG. 22 is an operational flow diagram depicting an exemplary process of the Content Localizer Server 2110 for generating localized content, in one embodiment of the present teaching. The operational flow diagram of FIG. 22 begins with step 2202 and flows directly to step 2204. In step 2204, the Content Localizer Server 2110 may receive a request, such as an HTTP request, from a user agent (e.g., a browser) for localized content matching a specific identifier. As described later in FIG. 25, the request may include the identifier and some or all of the following information, which is used as inputs to determine which localized content satisfies the conditions for display:

Request URL
Referrer URL
User Agent "Accept-language" header
User Agent default language
User's IP address
User's geo-location information
Language the user is viewing the site in
One or more cookies associated with the user In step 2206, the Content Localizer Server 2110 may retrieve all localized content and associated conditions from the database 2100 that match the identifier sent in the request. In step 2208, the Content Localizer Server 2110 may inspect each of the retrieved localized contents and conditions. In step 2210, the Content Localizer Server 2110 may determine whether the conditions specified in the retrieved localized content match those of the inputs included in the request.

If it is affirmative, then control flows to step 2214. Otherwise, control flows to step 2212. In step 2214, the Content Localizer Server 2110 may send the matching localized content as response to the request. In step 2212, the Content Localizer Server 2110 may check whether a default localized content is defined for the identifier. If it is affirmative, then control flows to step 2216. Otherwise, control flows to step 2218. In step 2216, the Content Localizer Server 2110 may send the default localized content as response to the request. In step 2218, the Content Localizer Server 2110 may not send localized content as response to the request. In step 2220, the control flow of FIG. 22 stops.

Figure 23A:
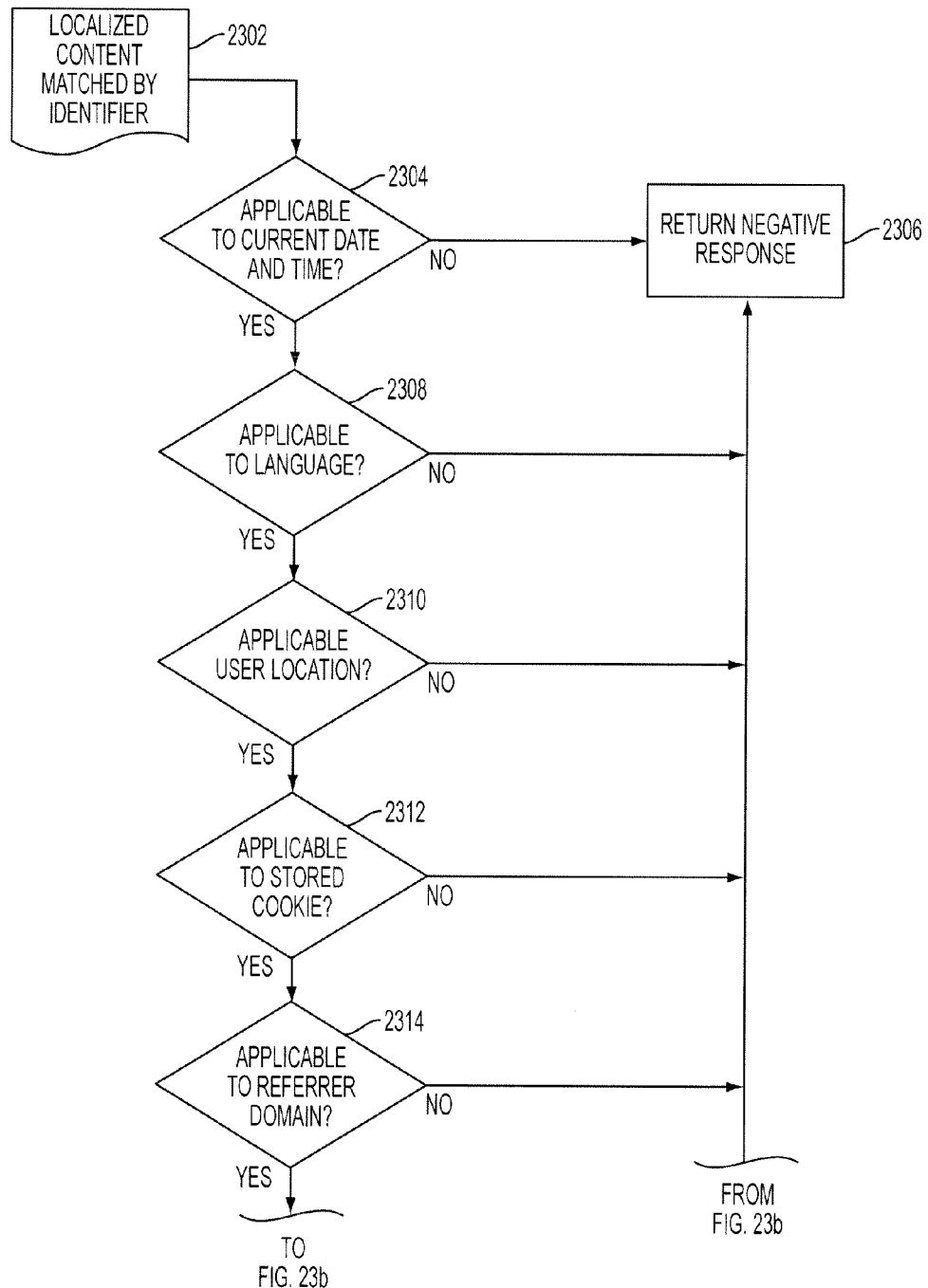
FIG. 23 is an operational flow diagram depicting an exemplary process of the Content Localizer Server for analyzing the request inputs against the conditions associated with a localized content to determine whether the conditions are met, according to one embodiment of the present teaching.
Figure 23B:
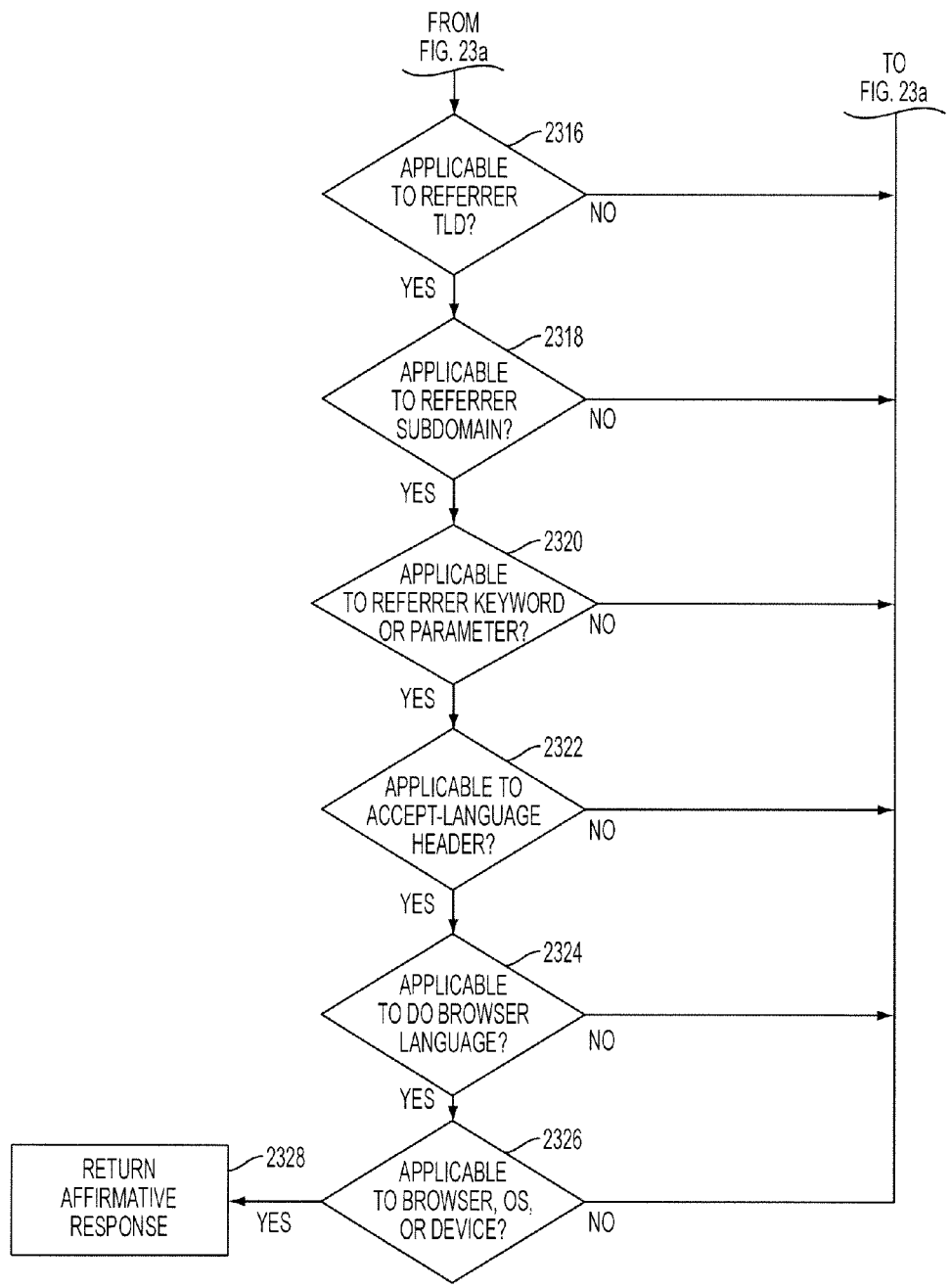

FIG. 23 is an operational flow diagram depicting an exemplary process of the Content Localizer Server 2110 for analyzing the request inputs against the conditions associated with a localized content to determine whether the conditions are met, in one embodiment of the present teaching. If the conditions are met, the process returns an affirmative response, such as true or yes, to signal that the localized content is to be displayed to the user. Otherwise it returns a negative response, such as no or false, to signal that the localized content is not to be displayed. The operational flow diagram of FIG. 23 specifies in detail the process used to arrive at the determination described in step 2210 of FIG. 22.

The operational flow diagram of FIG. 23 begins with step 2302 when a retrieved localized content (already matched by its identifier) and its associated conditions is inspected, and flows directly to step 2304. In step 2304, the publication date and time, expiration date and time, and local time conditions specified in the localized content may be checked against the date and time of the request, and a determination may be made whether these conditions are applicable to the request. If these conditions are not specified or they are applicable, then control flows to step 2308. Otherwise control flows to step 2306. In step 2306 a negative response is returned.

In step 2308, the language condition specified in the localized content may be checked against the language in which the user is viewing the site, and a determination may be made whether this condition is applicable to the request. If this condition is not specified or the user is viewing the site in a language specified in this condition, then control flows to step 2310. Otherwise control flows to step 2306. In step 2310, the user location condition specified in the localized content may be checked against the actual location of the user (which may be determined by the user's IP address, geo-location information or a pre-stored cookie with location information), and a determination may be made whether this condition is applicable to the request. If this condition is not specified or the user is in a location specified in this condition, then control flows to step 2312. Otherwise control flows to step 2306. In step 2312, the stored cookie condition specified in the localized content may be checked against the cookies present in the request, and a determination may be made whether this condition is applicable to the request. If this condition is not specified or the user has a cookie specified in this condition, then control flows to step 2314. Otherwise control flows to step 2306.

In step 2314, the referrer domain condition specified in the localized content may be checked against the domain of the referring site in the request, and a determination may be made whether this condition is applicable to the request. If this condition is not specified or the user comes from a referring site domain specified in this condition, then control flows to step 2316. Otherwise control flows to step 2306. In step 2316, the referrer TLD condition specified in the localized content may be checked against the TLD of the referring site in the request, and a determination may be made whether this condition is applicable to the request. If this condition is not specified or the user comes from a referring site TLD specified in this condition, then control flows to step 2318. Otherwise control flows to step 2306. In step 2318, the referrer sub-domain condition specified in the localized content may be checked against the sub-domain of the referring site in the request, and a determination may be made whether this condition is applicable to the request. If this condition is not specified or the user comes from a referring site sub-domain specified in this condition, then control flows to step 2320. Otherwise control flows to step 2306. In step 2320, the referrer keyword or parameter condition specified in the localized content may be checked against the URL of the referring site in the request, and a determination may be made whether this condition is applicable to the request. If this condition is not specified or URL of the referring site contains a keyword or parameter specified in this condition, then control flows to step 2322. Otherwise control flows to step 2306.

In step 2322, the Accept-language header condition specified in the localized content may be checked against the Accept-language header sent in the request, and a determination may be made whether this condition is applicable to the request. If this condition is not specified or the Accept-language header contains a value specified in this condition, then control flows to step 2324. Otherwise control flows to step 2306. In step 2324, the user agent default language condition specified in the localized content may be checked against the user agent default language sent in the request, and a determination may be made whether this condition is applicable to the request. If this condition is not specified or the user agent default language contains a value specified in this condition, then control flows to step 2326. Otherwise control flows to step 2306. In step 2326, the user agent, operating system or device condition specified in the localized content may be checked against the user agent, operating system or device information sent in the request, and a determination may be made whether this condition is applicable to the request. If this condition is not specified or the user agent, operating system or device contain a value specified in this condition, then control flows to step 2328. Otherwise control flows to step 2306. In step 2328 an affirmative response is returned.

The Translation Server 2102 may work in conjunction with the Content Localizer Server 2110 to generate the localized content. Each area of a page on the web site 2114 that contains localized content can be identified via the use of the localized content identifier. This identifier is matched with the identifier defined for the content via the Content Localizer Manager 2116 and stored in the localized content database 2100.

For example, below is the HTML of a page containing information about a SONY 46" television that contains a special offer:

```
<html>
<body>
<h1>Sony - BRAVIA XBR 46" Class / 1080p / 240Hz / LCD HDTV</h1>
<p>The Sony BRAVIA XBR 46" flat-panel LCD HDTV provides an ideal centerpiece for your multimedia home theater system. </p>
<p>Special Offer</p>
<p id="offer">Buy a Sony BRAVIA XBR before the end of the month and get free shipping!</p>
</body>
</html>
```

The above page is on a web site 2114 that is based in the US and the special offer is targeted to users within the US. However, the web site 2114 can also be translated to Spanish to serve Spanish speaking communities in the USA and abroad. To be effective in marketing, it is beneficial to localize the product offer to users, e.g., coming from Mexico or Spain who are viewing the site in Spanish. To do so, in some embodiments, the special offer may be localized by defining two different versions of the localized offers via the Content Localizer Manager 2116, as shown in the example below:

Localized Offer 1:
 Identifier: special-offer-100
 Content: Buy a SONY BRAVIA XBR before the end of the month and get a free mounting bracket!
 Conditions: Show only to users viewing site in Spanish and coming from Mexico
Localized Offer 2:
 Identifier: special-offer-100
 Content: Buy a SONY BRAVIA XBR before the end of the month and get a free Sony MP3 player!
 Conditions: Show only to users viewing site in Spanish and coming from Spain In this illustrated example, both localized offers share the same identifier ("special-offer-100"), but the actual content of the offer and the conditions differ. In this example, the Content Localizer Server 2110 replaces the US version of the offer (i.e., "Buy a SONY BRAVIA XBR before the end of the month and get free shipping!") with the Mexican version of the offer (i.e., "Buy a SONY BRAVIA XBR before the end of the month and get a free mounting bracket!") when a user from Mexico is viewing the site in Spanish. Or if a user from Spain is viewing the site in Spanish, then Content Localizer Server replaces the US offer with the Spain offer (i.e., "Buy a SONY BRAVIA XBR before the end of the month and get a free SONY MP3 player!").

In order to be able to place localized content on a page, the area of a page that contains the content to be localized may need to be identified. The Content Localizer Server 2110 may be designed to support different ways to achieve that. In some embodiments, this can be done by wrapping a span or div tag, or another tag, around the content to be localized, which references the identifier assigned to the localized content via the Content Localizer Manager 2116.

The example below shows the use of a span tag that wraps the text of the offer to be localized. The span tag contains an "id" attribute whose value ("special-offer-100") is the identifier assigned to the offer via the Content Localizer Manager, allowing it to be matched with the corresponding localized content stored in the localized content database 2100.

```
<html>
<body>
<h1>SONY - BRAVIA XBR 46" Class / 1080p / 240Hz / LCD HDTV</h1>
<p>The SONY BRAVIA XBR 46" flat-panel LCD HDTV provides an ideal centerpiece for your multimedia home theater system.</p>
<p>Special Offer</p>
<span id="localize:special-offer-100">
<p id="offer">Buy a Sony BRAVIA XBR before the end of the month and get free shipping!
</p>
</span>
</body>
</html>
```

In other embodiments, the area of the page may also be identified via an exemplary Directive Tag called "mp_trans_localize." Below is an example of its use for the above special offer:

```
<!-- mp_trans_localize_start id="special-offer-100" -->
<p id="offer">Buy a SONY BRAVIA XBR before the end of the month and get a free mounting bracket! </p>
<!-- mp_trans_localize_end -->
```

In some embodiments, other means, instead of span, div or Directive Tags, may be used to identify the content to be localized on a page. In one embodiment, the localized content can be associated with existing text, or an existing graphic, flash or video file, on a page via the Content Localizer Manager 2116 and the localized version of the content can be replacement text or a replacement graphic, flash or video file, or even a different type of content that fits in the same area.

In another embodiment, the content to be localized on a page may be identified via a Document Object Model (DOM) traversal syntax, such as XPath. In this case, the tags that enclose the content to be localized are defined via their location within the DOM tree, and there is no need to use span, div or Directive Tags. Below is an example of how the XPath syntax can be used to define the location of the area containing the offer to be localized for the above example product page:

/html/body/p[id="offer"]

The above XPath can be associated with the identifier "special-offer-100" without the need to insert span, div or directive tags containing the identifier in the product page And in another embodiment of the present teaching, content to be localized on a page can be identified by pattern matching the content in the page against pre-defined patterns of content within the page, using a pattern matching syntax, such as regular expressions. Below is an example of how a regular expression can be used to define the location of the area containing the offer to be localized for the above example product page:

<p id="offer">(.+)</p>

To facilitate these different embodiments disclosed herein, the Content Localizer Manager 2116 may provide a user interface to allow a user to select an area of a page to be customized. Once an area is selected, the Content Localizer Manager 2116 may then identify the actual HTML code that produces the content within the area and generate a DOM traversal path or a pattern match expression that identifies the area within the page.

When areas of the page to be localized are identified, the Translation Server 2102 may be made capable of recognizing these areas at the time that it parses the page during the process of page conversion from one language to another.

In one embodiment of the present teaching, the Content Localizer Server 2110 is a separate application whose primary function is to serve localized content. In this case, when the Translation Server 2102 recognizes an area to be localized at page conversion time the Translation Server 2102 replaces the content to be localized with HTML code, and/or JavaScript code, and/or other code that is executed on the user agent and generates an HTTP request to the Content Localizer Server 2110 that includes the identifier of the localized content and other request inputs listed in the description of FIG. 22. The Content Localizer Server 2110 then returns the appropriate localized content which may include additional JavaScript or other code executed on the user agent (e.g., a browser) to dynamically insert the localized content in the page.

Figure 24:
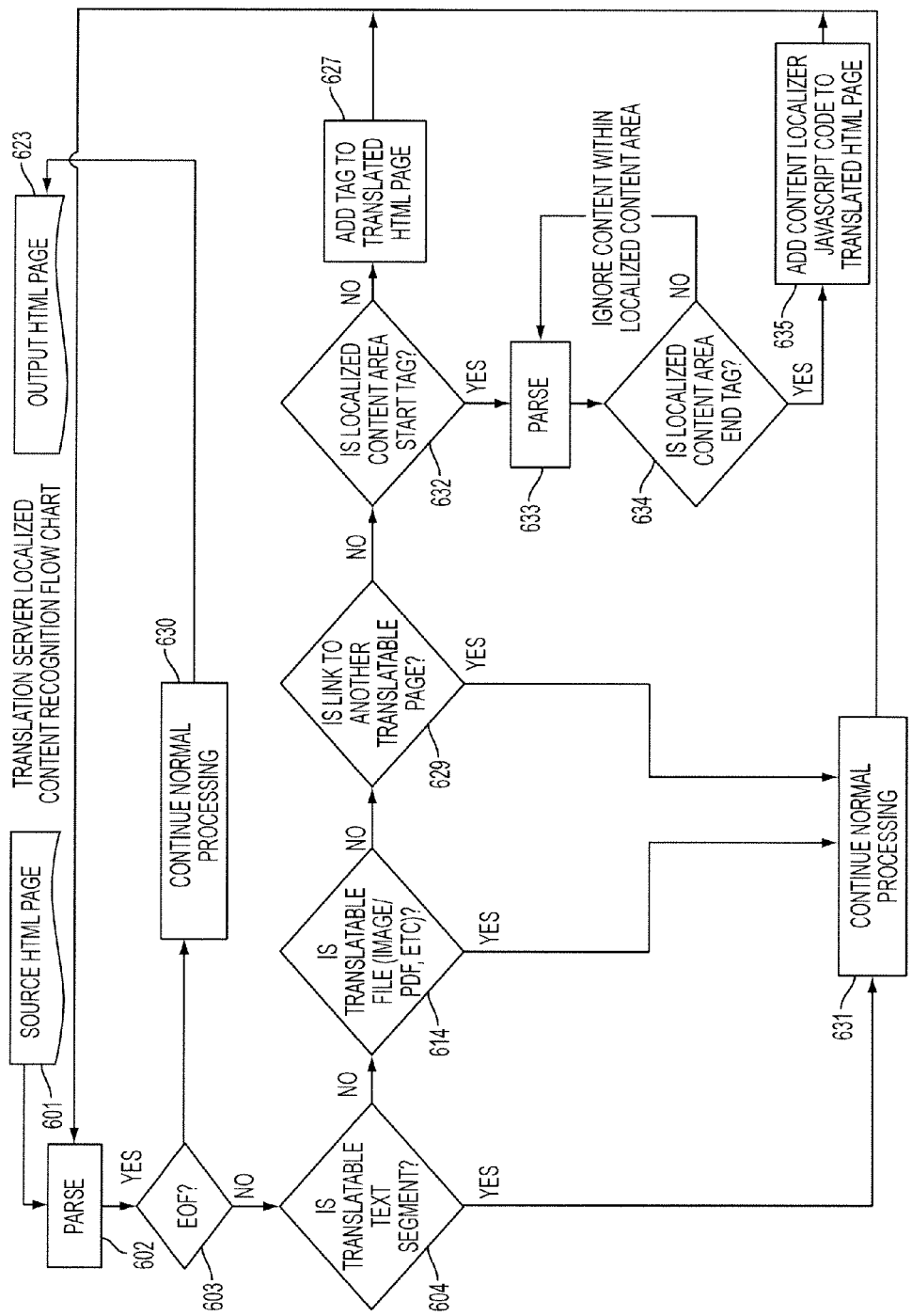
FIG. 24 is an operational flow diagram depicting an exemplary process of the Translation Server for recognizing the areas of the page to be localized, according to one embodiment of the present teaching.

FIG. 24 is an operational flow diagram depicting an exemplary process of the Translation Server 2102 for recognizing the areas of the page to be localized. FIG. 24 describes a Translation Server alternate process flow of FIG. 6 for recognizing areas to be localized in a page. The operational flow diagram of FIG. 24 begins with step 601 and flows directly to step 602. Steps 601, 602, 603, 604, 614, 623, 627 and 629 may be identical to the same numbered steps described in FIG. 6. Steps 630 and 631 represent the normal process flow described in FIG. 6 when the determination of steps 603, 604, 614 and 629 is affirmative. The alternate process flow begins in step 632 after the determination of steps 604, 614 and 629 are negative, meaning the current component is not a translatable text segment, or a translatable file, or a link to a translatable page. In step 632, it may be determined whether the current component being parsed is a tag or another element that defines the start of an area to be localized, such as the <span id="localize:special-offer-100"> tag of the above example.

If it is affirmative, then control flows to step 633. Otherwise, control flows to step 627. Step 627 is identical to the same numbered step described in FIG. 6. In step 633, the content following the start area tag may be parsed. In step 634, it may be determined whether the component being parsed is the localized content area end tag. If it is affirmative, then control flows to step 635. Otherwise, control flows to back to step 633 for further parsing and the component is ignored (i.e., all content parsed within the start and end tags is ignored and it is not output to the translated page). In step 635, the JavaScript code or other code to be executed on the user agent (e.g., a browser) to generate the request to the Content Localizer Server 2110 may be added to the translated HTML page. This code may include sending in the request the identifier and all other information necessary for the Content Localizer Server 2110 to determine which localized content to serve.

FIG. 25 is a block diagram depicting an exemplary process of the Content Localizer Server 2110 request and the response, in one embodiment of the present teaching. In step 1, the JavaScript code or other code added by the Translation Server 2102 in step 635 of FIG. 24 may be executed on the user agent (e.g., a browser) of the user 2108 to generate a request to the Content Localizer Server 2110. In step 2, the user agent may send the request to the Content Localizer Server. Step 2 shows that the request may include the localized content identifier, and may also include the following additional information: (a) the user's IP address and/or geo-location information, (b) various HTTP request headers, and (c) specific URL parameters. In step 3, the Content Localizer Server 2110 may utilize the information included in the request to generate localized content, as described in FIG. 22 and FIG. 23. In step 4, the Content Localizer Server 2110 response may be sent back to the user.

In another embodiment of the present teaching, the Content Localizer Server 2110 may be part of the functionality of the Translation Server 2102. In this case, the Translation Server 2102 may perform the process flows described in FIGS. 22 and 23 so that when the conditions are met, the Translation Server 2102 may replace the content to be localized with the localized content in each page at the same time it is converting the page to another language.

For simplicity purposes, the content to be localized in the above example is a string of text. However, as previously mentioned, the content to be localized can be anything within a page, including text, one or more graphics, flash files, videos, a chunk of HTML code, JavaScript code, CSS code, XML, etc. When uploading or entering localized content via the Content Localizer Manager 2116, it is possible to specify the dimensions of the area the content occupies on the page, which is typically done in pixels. In that case, the Content Localizer Server 2110 may restrict the output of the localized content to the specified dimensions. It is also possible to specify the dimensions of the area the content occupies on the page using the span, div tag, Directive Tag, or other tag, that wraps the content to be localized. For example:

```
<!-- mp_trans_localize_start id="special-offer-100" width="900" height="200" -->
<p id="offer">Buy a SONY BRAVIA XBR before the end of the month and get a free mounting bracket! </p>
<!-- mp_trans_localize_end -->
```

The localized content may be uploaded or entered in the native language of the web site 2114, or in the language of the target audience. If the content is specified in the native language of the web site 2114, then the content will automatically be entered into the translation workflow of the WebCATT tool 408, so it can be translated into the language of the target audience. This is useful when the localized content is generated by users in the native country of the web site 2114, which is the US in this example. The localized content may also be specified in the language of the target audience, in which case there is no need for the content to be translated. This is useful when the localized content is generated by users who reside in the country of the target audience. In our example, a user in Mexico whose responsibility includes managing the local content shown to users in Mexico, may directly upload or enter the localized offer for Mexico in Spanish in the Content Localizer Manager 2116.

The present teaching is also useful for a web site 2114 that has product assortment requirements for different local markets, such as manufacturer restrictions on products that can only be sold in certain countries. In this case, the Content Localizer Server 2110 can accept a periodic data feed with product assortment information for the targeted local markets. This feed may include a list of the all products offered, where each product is flagged with any applicable restrictions, such as shipping restrictions. The Content Localizer Server 2110 and the Translation Server 2102 can then use the information from the product feed to perform product specific localizations, which may include:

- Place a product specific message to inform the user 416 of the restrictions, such as the message: "This product cannot be shipped to Mexico"
- Disable a specific function on the page, such as graying out or removing an "Add to Cart" button when displaying product information for a product that cannot be shipped to a particular region
- Remove all information for a product that cannot be offered for sale in a particular region from a product listing, a product category landing page, or a product search results page for a user 416 in that particular region The Translation Server 2102 and the Content Localizer Server 2110 can store a Content Localizer cookie in the user's user agent (e.g., a browser) that contains information that identify the user for localization purposes and includes information on the referring URL, user geo-location data, the conditions that were satisfied by the user and other user preferences and behavior information.

The present teaching may be realized in hardware, software, firmware, or any combination thereof. A system according to one embodiment of the present teaching can be realized in a centralized fashion in one computer system or in a distributed fashion where different elements are spread across several interconnected computer systems. Any kind of computer system—or other apparatus adapted for carrying out the methods described herein—is suited. A typical combination of hardware, software, and firmware could be a general-purpose computer system with a computer program that, when being loaded and executed, controls the computer system such that it carries out the methods described herein.

An embodiment of the present teaching can also be embedded in a computer program product, which comprises all the features enabling the implementation of the methods described herein, and which—when loaded in a computer system—is able to carry out these methods. Computer program means or computer program as used in the present teaching indicates any expression, in any language, code or notation, of a set of instructions intended to cause a system having an information processing capability to perform a particular function either directly or after either or both of the following a) conversion to another language, code or, notation; and b) reproduction in a different material form.

A computer system may include, inter alia, one or more computers and at least a computer readable medium, allowing a computer system, to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer readable medium may include, for example, volatile storage such as RAM, buffers, cache memory, and network circuits. Furthermore, the computer readable medium may comprise computer readable information in a transitory state medium such as a network link and/or a network interface, including a wired network or a wireless network that allow a computer system to read such computer readable information.

Figure 16:
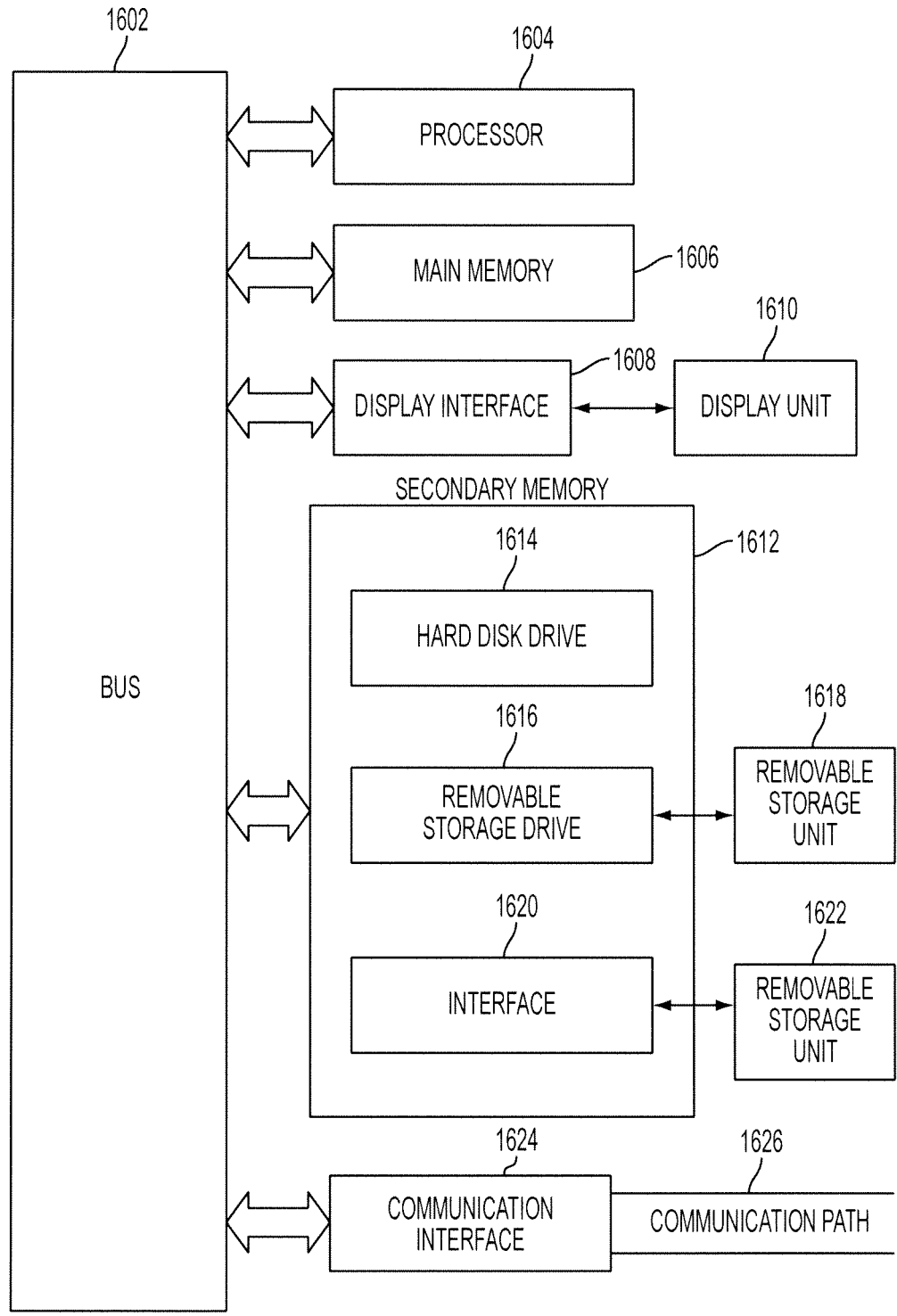
FIG. 16 is a block diagram showing a computer system useful for implementing the present teaching.

FIG. 16 is a block diagram of an exemplary computer system useful for implementing the different aspects of the present teaching, such as translation server, preference selector, content localizer, URL translation and optimization, E-mail translation server, human machine cooperated translation, WebCATT, TransScope, TransSync, etc. The computer system includes one or more processors, such as processor 1604. The processor 1604 is connected to a communication infrastructure 1602 (e.g., a communications bus, cross-over bar, or network). Various software embodiments are described in terms of this exemplary computer system. After reading this description, it will become apparent to a person of ordinary skill in the relevant art(s) how to implement the teaching using other computer systems and/or computer architectures.

The computer system can include a display interface 1608 that forwards graphics, text, and other data from the communication infrastructure 1602 (or from a frame buffer not shown) for display on the display unit 1610. The computer system also includes a main memory 1606, preferably random access memory (RAM), and may also include a secondary memory 1612. The secondary memory 1612 may include, for example, a hard disk drive 1614 and/or a removable storage drive 1616, representing a floppy disk drive, a magnetic tape drive, an optical disk drive, etc. The removable storage drive 1616 reads from and/or writes to a removable storage unit 1618 in a manner well known to those having ordinary skill in the art. Removable storage unit 1618, represents a floppy disk, magnetic tape, optical disk, etc. which is read by and written to by removable storage drive 1616. As will be appreciated, the removable storage unit 1618 includes a computer usable storage medium having stored therein computer software and/or data.

In alternative embodiments, the secondary memory 1612 may include other similar means for allowing computer programs or other instructions to be loaded into the computer system. Such means may include, for example, a removable storage unit 1622 and an interface 1620. Examples of such may include a program cartridge and cartridge interface (such as that found in video game devices), a removable memory chip (such as an EPROM, or PROM) and associated socket, and other removable storage units 1622 and interfaces 1620 which allow software and data to be transferred from the removable storage unit 1622 to the computer system.

The computer system may also include a communications interface 1624. Communications interface 1624 allows software and data to be transferred between the computer system and external devices. Examples of communications interface 1624 may include a modem, a network interface (such as an Ethernet card), a communications port, a PCM-CIA slot and card, etc. Software and data transferred via communications interface 1624 are in the form of signals which may be, for example, electronic, electromagnetic, optical, or other signals capable of being received by communications interface 1624. These signals are provided to communications interface 1624 via a communications path (i.e., channel) 1626. This channel 1626 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 1606 and secondary memory 1612, removable storage drive 1616, a hard disk installed in hard disk drive 1614, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network, that allow a computer to read such computer readable information.

Computer programs (also called computer control logic) are stored in main memory 1606 and/or secondary memory 1612. Computer programs may also be received via communications interface 1624. Such computer programs, when executed, enable the computer system to perform the features of the present teaching as discussed herein. In particular, the computer programs, when executed, enable the processor 1604 to perform the features of the computer system. Accordingly, such computer programs represent controllers of the computer system.

Although specific embodiments of the teaching have been disclosed, those having ordinary skill in the art will understand that changes can be made to the specific embodiments without departing from the spirit and scope of the teaching. The scope of the teaching is not to be restricted, therefore, to the specific embodiments.

Other concepts relate to unique software for implementing the different aspects of the present teaching, such as translation server, preference selector, content localizer, URL translation and optimization, E-mail translation server, human machine cooperated translation, WebCATT, TransScope, TransSync, etc. A software product, in accord with this concept, includes at least one machine-readable medium and information carried by the medium. The information carried by the medium may be executable program code data regarding web content translation and operational parameters. When such information carried by the medium is read by a machine, it causes the machine to perform programmed functions. In one example, a translation server located connected with the Internet executes instructions recorded on a medium and is capable of receiving a request for content translation, to obtain content in a first language from a publicly accessible source, analyzing the content in the first language, performing necessary translation based on the analysis, and forwarding, via a network, the translated content in a second language to a party that requesting it.

The hardware elements, operating systems and programming languages of such translation servers are conventional in nature, and it is presumed that those skilled in the art are adequately familiar therewith. Of course, the server functions may be implemented in a distributed fashion on a number of similar or even different platforms, to distribute the processing load. Hence, aspects of the methods of receiving web content translation requests through a common communication port in a server or network device from a variety of client applications, as outlined above, may be embodied in programming.

Program aspects of the technology may be thought of as "products" or "articles of manufacture" typically in the form of executable code and/or associated data that is carried on or embodied in a type of machine readable medium. Tangible non-transitory "storage" type media include any or all of the memory of the computers, processors or the like, or associated modules thereof, such as various semiconductor memories, tape drives, disk drives and the like, which may provide storage at any time for the software programming.

All or portions of the software may at times be communicated through the Internet or various other telecommunication networks. Such communications, for example, may enable loading of the software from one computer or processor into another, for example, from a management server or host computer of the network operator or carrier into the platform of the message server or other device implementing a message server or similar functionality. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the data aggregator, the customer communication system, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the message server implementation described above is embodied in a hardware device, it can also be implemented as a software only solution—e.g., requiring installation on an existing server. In addition, a message server or a bind pooling mechanism as disclosed herein can also be implemented as a firmware, firmware/software combination, firmware/hardware combination, or hardware/firmware/software combination.

We claim:

1. A method implemented on a computer having at least one processor, storage, and communication platform for facilitating selection of a preferred language associated with a website, comprising the steps of:

receiving, via the communication platform, information relating to a referrer URL of a referrer website from which a user requests and accesses an original website in a first language, wherein the referrer URL indicates a webpage containing a link the user clicked on to access the original website;

analyzing automatically the received information to estimate a preferred language that the user likely prefers to view content from the original website, the preferred language being estimated based on a keyword included in the referrer URL;

displaying a selector, with one or more selectable languages determined based on the estimated preferred language, that allows the user to select a second language from the one or more selectable languages; and in response to the user's selection, directly redirecting the user to a translated website in the second language that corresponds to the original website.

2. The method according to claim 1, wherein the information further includes at least one of a language a user agent prefers, a default language of the user agent, the user's IP address, the user's geo-location information, and a cookie associated with the user.

3. The method of claim 1, wherein the selector is displayed only when the preferred language is different from the first language.

4. The method of claim 1, wherein the preferred language is estimated based on a number of other users that use the referrer URL in a predetermined amount of time.

5. A method implemented on a computer having at least one processor, storage, and communication platform for facilitating selection of a preferred language associated with a website, comprising the steps of:

receiving, via the communication platform, information relating to a referrer URL of a referrer website from which a user requests and accesses an original website in a first language, wherein the referrer URL indicates a webpage containing a link the user clicked on to access the original website;

analyzing the received information to determine a preferred language that the user likely prefers to view content from the original website, the preferred language being determined based on a keyword included in the referrer URL;

displaying a selector, with one or more selectable languages determined based on the preferred language that allows the user to select a second language from the one or more selectable languages;

storing the user's selected second language in association with the user;

receiving, via the communication platform, a request from the user to visit the original website; and automatically redirecting the user to a translated website in the second language that corresponds to the original website.

6. The method of claim 5, wherein the information is received via an HTTP request.

7. The method of claim 5, wherein the information further includes at least one of:
the user agent "Accept-language" header,
the user agent language,
the user's IP address,
the user's geo-location information, and
a cookie.

8. The method of claim 5, wherein the analysis to determine the preferred language is additionally based on a predefined set of information including at least one of:
one or more domain names,
at least one language,
one or more countries and their corresponding currencies,
a set of referrer domains associated with the preferred language,
a set of referrer top level domains associated with the preferred language,
a set of referrer subdomains associated with the preferred language,
one or more sets of referrer parameters associated with the preferred language,
a set of geographical areas associated with the preferred language, and
a set of affinity languages associated with the preferred language.

9. The method of claim 5, wherein the selector is displayed only when the preferred language is different from the first language.

10. A non-transitory machine-readable medium having information recorded thereon for facilitating selection of a preferred language associated with a website, wherein the information, when read by the machine, causes the machine to perform the following:

receiving information relating to a referrer URL of a referrer website from which a user requests and accesses an original website in a first language;

analyzing automatically the received information to estimate a preferred language that the user likely prefers to view content from the original website, the preferred language being estimated based on a keyword included in the referrer URL;

displaying a selector, with one or more selectable languages determined based on the estimated preferred language, that allows the user to select a second language from the one or more selectable languages; and in response to the user's selection, directly redirecting the user to a translated website in the second language that corresponds to the original website.

* * * * *